(12) United States Patent
Kelch et al.

(10) Patent No.: US 11,372,264 B2
(45) Date of Patent: Jun. 28, 2022

(54) PROGRESSIVE SPECTACLE LENS WITH A VARIABLE REFRACTIVE INDEX, AND METHOD FOR DESIGNING AND PRODUCING SAME

(71) Applicant: Carl Zeiss Vision International GmbH, Aalen (DE)

(72) Inventors: Gerhard Kelch, Aalen (DE); Christoph Menke, Oberkochen (DE); Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 64 days.

(21) Appl. No.: 16/932,814

(22) Filed: Jul. 19, 2020

(65) Prior Publication Data

US 2020/0348538 A1     Nov. 5, 2020

Related U.S. Application Data

(63) Continuation of application No. PCT/EP2018/069806, filed on Jul. 20, 2018, which is
(Continued)

(51) Int. Cl.
*G02C 7/02* (2006.01)
*G02C 7/06* (2006.01)

(52) U.S. Cl.
CPC ............. *G02C 7/027* (2013.01); *G02C 7/022* (2013.01); *G02C 7/024* (2013.01); *G02C 7/028* (2013.01);
(Continued)

(58) Field of Classification Search
CPC ........ G02C 7/027; G02C 7/022; G02C 7/024; G02C 7/028; G02C 7/065; G02C 7/068; G02C 2202/12
See application file for complete search history.

(56) References Cited

U.S. PATENT DOCUMENTS

| 4,762,408 A | 8/1988 | Shinohara |
| 5,042,936 A | 8/1991 | Guilino et al. |

(Continued)

FOREIGN PATENT DOCUMENTS

| CN | 102741735 A | 10/2012 |
| DE | 102008041869 A1 | 3/2010 |

(Continued)

OTHER PUBLICATIONS

Diepes et al. "Optik und Technik der Brille" ["Optics and Technology of Spectacles"], Optische Fachveröffentlichung GmbH, 2nd edition, Heidelberg, Germany, 2005, p. 256, see paragraph [0202] of the instant specification for relevance.
(Continued)

*Primary Examiner* — James R Greece
(74) *Attorney, Agent, or Firm* — Tautz & Schuhmacher LLC; Georg Hasselmann

(57) ABSTRACT

A progressive spectacle lens has a front surface, a rear surface, and a spatially varying refractive index. The progressive spectacle lens can have: (a) a refractive index that changes only in a first and second spatial dimension and is constant in a third spatial dimension, and the distribution of the refractive index in the first spatial dimension and the second spatial dimension is neither punctually nor axially symmetric; (b) a refractive index that changes in a first, a second, and third spatial dimension, and the distribution of the refractive index in the first spatial dimension and the second spatial dimension is neither punctually nor axially symmetric on all planes perpendicular to the third spatial dimension; or (c) a refractive index that changes in a first, second, and third spatial dimension, and the distribution of the refractive index is not punctually or axially symmetric at all.

33 Claims, 64 Drawing Sheets

Related U.S. Application Data a continuation of application No. PCT/EP2018/000026, filed on Jan. 19, 2018.

(52) U.S. Cl.
CPC ............ *G02C 7/065* (2013.01); *G02C 7/068* (2013.01); *G02C 2202/12* (2013.01)

(56) References Cited

U.S. PATENT DOCUMENTS

| | | |
|---|---|---|
| 5,148,205 A | 9/1992 | Guilino et al. |
| 6,089,713 A | 7/2000 | Hof et al. |
| 8,186,829 B2 | 5/2012 | De Rossi et al. |
| 8,366,269 B2 | 2/2013 | Kratzer et al. |
| 8,425,035 B2 | 4/2013 | von Blanckenhagen |
| 8,591,026 B2 | 11/2013 | Conte et al. |
| 8,757,800 B2 | 6/2014 | Esser et al. |
| 10,831,041 B2 | 11/2020 | Altheimer et al. |
| 10,845,619 B2 | 11/2020 | Mappes et al. |
| 2004/0008319 A1 | 1/2004 | Lai et al. |
| 2008/0198325 A1 | 8/2008 | Bonnin et al. |
| 2010/0238400 A1 | 9/2010 | Volk |
| 2012/0262668 A1 | 10/2012 | McCarty et al. |
| 2019/0250430 A1 | 8/2019 | Mappes et al. |

FOREIGN PATENT DOCUMENTS

| | | | |
|---|---|---|---|
| DE | 102015205721 A1 | 10/2016 | |
| EP | 318035 A1 | 5/1989 | |
| EP | 347917 A1 | 12/1989 | |
| EP | 2177943 A1 * | 4/2010 | ............ G02C 7/028 |
| EP | 2177943 A1 | 4/2010 | |
| EP | 857993 B2 | 8/2013 | |
| EP | 2115527 B1 | 4/2014 | |
| EP | 2383603 B1 | 9/2014 | |
| EP | 2878989 A1 | 6/2015 | |
| EP | 3273292 A1 | 1/2018 | |
| EP | 3312661 A1 | 4/2018 | |
| GB | 2294553 A | 5/1996 | |
| WO | 8904986 A1 | 6/1989 | |
| WO | 9913361 A1 | 3/1999 | |
| WO | 0155752 A1 | 8/2001 | |
| WO | 2006111625 A1 | 10/2006 | |
| WO | 2010109154 A1 | 9/2010 | |
| WO | 2011093929 A1 | 8/2011 | |

OTHER PUBLICATIONS

Augustin "Augenheilkunde [Ophthalmology]," 3rd, completely reworked and extended edition, Springer, Berlin 2007, p. 1272, see paragraph [0047] of the instant specification for relevance.
"Ophthalmic optics—Spectacle lenses—Vocabulary (ISO 13666:2012)," German and English version EN ISO 13666:2012, Oct. 2013.
"Optics and optical instruments—Focimeters—Part 1, General purpose instruments," ISO 8598-1, 2014.
"Ophthalmic optics—Terms and definitions related to free-form technology," German and English version DIN SPEC 58194, Dec. 2015.
"Ophthalmic optics—Spectacle lenses—Fundamental requirements for uncut finished lenses," DIN EN ISO 14889, Apr. 2018.
Diepes et al. "Optik und Technik der Brille" ["Optics and Technology of Spectacles"], Optische Fachveröffentlichung GmbH, Heidelberg, Germany, 2002, p. 482, see paragraph [0047] of the instant specification for relevance.
Koeppen: "Konzeption und Entwicklung von Gleitsichtglaesern [Conception and design of progressive lenses]," DOZ, pp. 42-46, and English-language translation thereof, Oct. 1995.
Meister: "The Optics of Free-Form Progressive Lenses," Opticianry Study Center, pp. 131 to 134, Oct. 2008.
Shitanoki et al. "Application of Graded-Index for Astigmatism Reduction in Progressive Addition Lens," Appl. Phys. Express 2, 2009.
International Search Report issued in PCT/EP2018/069806, to which this application claims priority, dated Feb. 11, 2019, and English-language translation thereof.
Written opinion issued in PCT/EP2018/069806, to which this application claims priority, dated Jul. 25, 2019, and English-language translation thereof.
International Preliminary Examination Report issued in PCT/EP2018/069806, to which this application claims priority, dated Jul. 21, 2020.

\* cited by examiner

Related Art

Related Art

Related Art

Related Art

Related Art

Related Art

| | X | 0 | 2 | 4 | 6 | 8 | 10 | 12 | 14 | 16 | 18 | 20 |
|---|---|---|---|---|---|---|---|---|---|---|---|---|
| Y | | | | | | | | | | | | |
| 26 | | 3.1912 | 3.2086 | 3.2609 | 3.3481 | 3.4702 | 3.6269 | 3.8176 | 4.0419 | 4.2982 | 4.5852 | 4.9013 |
| 24 | | 2.7257 | 2.7430 | 2.7952 | 2.8822 | 3.0040 | 3.1602 | 3.3502 | 3.5732 | 3.8284 | 4.1145 | 4.4305 |
| 22 | | 2.2971 | 2.3144 | 2.3665 | 2.4535 | 2.5754 | 2.7316 | 2.9216 | 3.1446 | 3.4000 | 3.6870 | 4.0048 |
| 20 | | 1.9050 | 1.9223 | 1.9746 | 2.0618 | 2.1840 | 2.3408 | 2.5315 | 2.7555 | 3.0123 | 3.3015 | 3.6226 |
| 18 | | 1.5490 | 1.5665 | 1.6190 | 1.7068 | 1.8297 | 1.9874 | 2.1794 | 2.4052 | 2.6646 | 2.9572 | 3.2829 |
| 16 | | 1.2290 | 1.2467 | 1.2997 | 1.3881 | 1.5121 | 1.6712 | 1.8651 | 2.0935 | 2.3563 | 2.6533 | 2.9845 |
| 14 | | 0.9451 | 0.9630 | 1.0166 | 1.1061 | 1.2313 | 1.3922 | 1.5886 | 1.8202 | 2.0871 | 2.3893 | 2.7269 |
| 12 | | 0.6977 | 0.7158 | 0.7701 | 0.8608 | 0.9877 | 1.1508 | 1.3500 | 1.5854 | 1.8570 | 2.1649 | 2.5096 |
| 10 | | 0.4869 | 0.5053 | 0.5605 | 0.6524 | 0.7813 | 0.9469 | 1.1495 | 1.3891 | 1.6658 | 1.9800 | 2.3320 |
| 8 | | 0.3133 | 0.3320 | 0.3880 | 0.4815 | 0.6125 | 0.7810 | 0.9873 | 1.2314 | 1.5136 | 1.8343 | 2.1940 |
| 6 | | 0.1773 | 0.1963 | 0.2533 | 0.3484 | 0.4817 | 0.6533 | 0.8635 | 1.1123 | 1.4003 | 1.7277 | 2.0952 |
| 4 | | 0.0794 | 0.0987 | 0.1567 | 0.2535 | 0.3893 | 0.5641 | 0.7783 | 1.0321 | 1.3259 | 1.6602 | 2.0355 |
| 2 | | 0.0201 | 0.0398 | 0.0988 | 0.1974 | 0.3357 | 0.5139 | 0.7322 | 0.9911 | 1.2908 | 1.6320 | 2.0152 |
| 0 | | 0.0001 | 0.0201 | 0.0803 | 0.1807 | 0.3216 | 0.5031 | 0.7257 | 0.9896 | 1.2953 | 1.6434 | 2.0345 |
| -2 | | 0.0200 | 0.0404 | 0.1016 | 0.2039 | 0.3474 | 0.5324 | 0.7593 | 1.0282 | 1.3399 | 1.6948 | 2.0939 |
| -4 | | 0.0806 | 0.1013 | 0.1637 | 0.2678 | 0.4140 | 0.6025 | 0.8336 | 1.1076 | 1.4252 | 1.7870 | 2.1939 |
| -6 | | 0.1826 | 0.2037 | 0.2672 | 0.3732 | 0.5221 | 0.7140 | 0.9494 | 1.2284 | 1.5519 | 1.9206 | 2.3353 |
| -8 | | 0.3268 | 0.3483 | 0.4129 | 0.5209 | 0.6725 | 0.8679 | 1.1075 | 1.3916 | 1.7210 | 2.0965 | 2.5189 |
| -10 | | 0.5140 | 0.5359 | 0.6018 | 0.7117 | 0.8659 | 1.0648 | 1.3086 | 1.5979 | 1.9332 | 2.3155 | 2.7457 |
| -12 | | 0.7452 | 0.7675 | 0.8345 | 0.9464 | 1.1032 | 1.3055 | 1.5536 | 1.8481 | 2.1895 | 2.5788 | 3.0168 |
| -14 | | 1.0211 | 1.0438 | 1.1120 | 1.2258 | 1.3853 | 1.5909 | 1.8434 | 2.1431 | 2.4909 | 2.8875 | 3.3338 |
| -16 | | 1.3430 | 1.3661 | 1.4355 | 1.5512 | 1.7132 | 2.0000 | 2.1792 | 2.4846 | 2.8391 | 3.2435 | 3.6986 |
| -18 | | 1.7122 | 1.7357 | 1.8062 | 1.9237 | 2.0884 | 2.3011 | 2.5627 | 2.8740 | 3.2358 | 3.6488 | 4.1138 |
| -20 | | 2.1301 | 2.1539 | 2.2253 | 2.3447 | 2.5122 | 2.7287 | 2.9952 | 3.3129 | 3.6825 | 4.1051 | 4.5814 |
| -22 | | 2.5976 | 2.6217 | 2.6941 | 2.8152 | 2.9854 | 3.2058 | 3.4775 | 3.8019 | 4.1801 | 4.6133 | 5.1027 |
| -24 | | 3.1159 | 3.1402 | 3.2136 | 3.3363 | 3.5091 | 3.7333 | 4.0103 | 4.3416 | 4.7290 | 5.1742 | 5.6786 |
| -26 | | 3.6862 | 3.7108 | 3.7850 | 3.9093 | 4.0844 | 4.3120 | 4.5940 | 4.9322 | 5.3295 | 5.7887 | 6.3117 |

FIG. 6A

| X\Y | 0 | 2 | 4 | 6 | 8 | 10 | 12 | 14 | 16 | 18 | 20 |
|---|---|---|---|---|---|---|---|---|---|---|---|
| 26 | | 4.4873 | 4.5072 | 4.5668 | 4.6660 | 4.8044 | 4.9815 | 5.1967 | 5.4492 | 5.7380 | 6.0623 | 6.4212 |
| 24 | | 3.8230 | 3.8430 | 3.9031 | 4.0031 | 4.1426 | 4.3213 | 4.5387 | 4.7939 | 5.0863 | 5.4149 | 5.7790 |
| 22 | | 3.2067 | 3.2269 | 3.2875 | 3.3883 | 3.5291 | 3.7096 | 3.9293 | 4.1877 | 4.4839 | 4.8173 | 5.1870 |
| 20 | | 2.6430 | 2.6634 | 2.7245 | 2.8262 | 2.9684 | 3.1508 | 3.3730 | 3.6345 | 3.9348 | 4.2731 | 4.6488 |
| 18 | | 2.1350 | 2.1555 | 2.2172 | 2.3198 | 2.4634 | 2.6477 | 2.8725 | 3.1372 | 3.4415 | 3.7847 | 4.1662 |
| 16 | | 1.6841 | 1.7048 | 1.7670 | 1.8707 | 2.0156 | 2.2018 | 2.4290 | 2.6969 | 3.0050 | 3.3529 | 3.7400 |
| 14 | | 1.2905 | 1.3114 | 1.3742 | 1.4787 | 1.6251 | 1.8131 | 2.0426 | 2.3134 | 2.6251 | 2.9773 | 3.3696 |
| 12 | | 0.9533 | 0.9744 | 1.0376 | 1.1431 | 1.2907 | 1.4804 | 1.7121 | 1.9856 | 2.3006 | 2.6567 | 3.0537 |
| 10 | | 0.6708 | 0.6920 | 0.7558 | 0.8621 | 1.0109 | 1.2022 | 1.4358 | 1.7117 | 2.0297 | 2.3893 | 2.7904 |
| 8 | | 0.4408 | 0.4622 | 0.5265 | 0.6335 | 0.7834 | 0.9761 | 1.2115 | 1.4896 | 1.8101 | 2.1728 | 2.5775 |
| 6 | | 0.2611 | 0.2827 | 0.3473 | 0.4550 | 0.6059 | 0.7999 | 1.0369 | 1.3168 | 1.6396 | 2.0050 | 2.4128 |
| 4 | | 0.1292 | 0.1509 | 0.2159 | 0.3243 | 0.4760 | 0.6711 | 0.9095 | 1.1911 | 1.5158 | 1.8835 | 2.2941 |
| 2 | | 0.0429 | 0.0646 | 0.1300 | 0.2389 | 0.3915 | 0.5876 | 0.8272 | 1.1103 | 1.4367 | 1.8065 | 2.2193 |
| 0 | | 0.0000 | 0.0219 | 0.0876 | 0.1970 | 0.3503 | 0.5473 | 0.7880 | 1.0724 | 1.4004 | 1.7719 | 2.1869 |
| -2 | | -0.0012 | 0.0208 | 0.0868 | 0.1967 | 0.3506 | 0.5485 | 0.7902 | 1.0758 | 1.4052 | 1.7783 | 2.1952 |
| -4 | | 0.0377 | 0.0598 | 0.1261 | 0.2365 | 0.3910 | 0.5896 | 0.8323 | 1.1190 | 1.4497 | 1.8244 | 2.2431 |
| -6 | | 0.1154 | 0.1376 | 0.2041 | 0.3149 | 0.4700 | 0.6694 | 0.9131 | 1.2009 | 1.5329 | 1.9091 | 2.3295 |
| -8 | | 0.2307 | 0.2530 | 0.3197 | 0.4310 | 0.5867 | 0.7868 | 1.0314 | 1.3203 | 1.6536 | 2.0314 | 2.4537 |
| -10 | | 0.3826 | 0.4049 | 0.4720 | 0.5836 | 0.7399 | 0.9409 | 1.1864 | 1.4765 | 1.8112 | 2.1906 | 2.6149 |
| -12 | | 0.5702 | 0.5926 | 0.6599 | 0.7720 | 0.9290 | 1.1307 | 1.3773 | 1.6686 | 2.0049 | 2.3861 | 2.8127 |
| -14 | | 0.7927 | 0.8153 | 0.8828 | 0.9954 | 1.1531 | 1.3557 | 1.6034 | 1.8962 | 2.2341 | 2.6175 | 3.0464 |
| -16 | | 1.0495 | 1.0721 | 1.1400 | 1.2532 | 1.4116 | 2.0000 | 1.8642 | 2.1586 | 2.4985 | 2.8842 | 3.3159 |
| -18 | | 1.3398 | 1.3626 | 1.4308 | 1.5446 | 1.7039 | 1.9088 | 2.1592 | 2.4555 | 2.7977 | 3.1861 | 3.6210 |
| -20 | | 1.6631 | 1.6860 | 1.7547 | 1.8692 | 2.0295 | 2.2358 | 2.4881 | 2.7865 | 3.1314 | 3.5230 | 3.9617 |
| -22 | | 2.0188 | 2.0419 | 2.1111 | 2.2264 | 2.3880 | 2.5959 | 2.8503 | 3.1514 | 3.4994 | 3.8948 | 4.3380 |
| -24 | | 2.4062 | 2.4295 | 2.4993 | 2.6157 | 2.7788 | 2.9887 | 3.2457 | 3.5499 | 3.9018 | 4.3018 | 4.7502 |
| -26 | | 2.8247 | 2.8482 | 2.9188 | 3.0364 | 3.2014 | 3.4137 | 3.6737 | 3.9818 | 4.3383 | 4.7437 | 5.1985 |

FIG. 6B

Related Art

Related Art

Related Art

| Y \ X | 0 | 2 | 4 | 6 | 8 | 10 | 12 | 14 | 16 | 18 | 20 |
|---|---|---|---|---|---|---|---|---|---|---|---|
| 20 | 1.6118 | 1.6289 | 1.6802 | 1.7658 | 1.8860 | 2.0408 | 2.2305 | 2.4552 | 2.7153 | 3.0110 | 3.3427 |
| 18 | 1.2747 | 1.2916 | 1.3427 | 1.4280 | 1.5476 | 1.7018 | 1.8907 | 2.1145 | 2.3736 | 2.6683 | 2.9988 |
| 16 | 0.9732 | 0.9900 | 1.0409 | 1.1258 | 1.2450 | 1.3986 | 1.5868 | 1.8098 | 2.0681 | 2.3618 | 2.6914 |
| 14 | 0.7068 | 0.7236 | 0.7743 | 0.8590 | 0.9778 | 1.1308 | 1.3184 | 1.5407 | 1.7982 | 2.0911 | 2.4198 |
| 12 | 0.4753 | 0.4921 | 0.5426 | 0.6270 | 0.7455 | 0.8981 | 1.0852 | 1.3069 | 1.5636 | 1.8557 | 2.1837 |
| 10 | 0.2783 | 0.2951 | 0.3455 | 0.4297 | 0.5478 | 0.7001 | 0.8867 | 1.1079 | 1.3641 | 1.6556 | 1.9831 |
| 8 | 0.1155 | 0.1323 | 0.1826 | 0.2666 | 0.3845 | 0.5365 | 0.7228 | 0.9436 | 1.1994 | 1.4908 | 1.8182 |
| 6 | -0.0132 | 0.0035 | 0.0537 | 0.1375 | 0.2552 | 0.4070 | 0.5931 | 0.8139 | 1.0697 | 1.3612 | 1.6889 |
| 4 | -0.1082 | -0.0916 | -0.0414 | 0.0424 | 0.1601 | 0.3119 | 0.4982 | 0.7192 | 0.9754 | 1.2676 | 1.5960 |
| 2 | -0.1697 | -0.1530 | -0.1028 | -0.0187 | 0.0992 | 0.2515 | 0.4383 | 0.6602 | 0.9175 | 1.2109 | 1.5406 |
| 0 | -0.1978 | -0.1810 | -0.1303 | -0.0457 | 0.0731 | 0.2263 | 0.4144 | 0.6379 | 0.8971 | 1.1922 | 1.5238 |
| -2 | -0.1922 | -0.1749 | -0.1231 | -0.0370 | 0.0835 | 0.2386 | 0.4288 | 0.6545 | 0.9162 | 1.2138 | 1.5477 |
| -4 | -0.1520 | -0.1341 | -0.0804 | 0.0086 | 0.1322 | 0.2901 | 0.4832 | 0.7120 | 0.9767 | 1.2773 | 1.6141 |
| -6 | -0.0759 | -0.0572 | -0.0013 | 0.0912 | 0.2189 | 0.3810 | 0.5782 | 0.8108 | 1.0790 | 1.3830 | 1.7229 |
| -8 | 0.0375 | 0.0569 | 0.1151 | 0.2113 | 0.3437 | 0.5113 | 0.7137 | 0.9509 | 1.2231 | 1.5308 | 1.8743 |
| -10 | 0.1896 | 0.2098 | 0.2703 | 0.3702 | 0.5077 | 0.6810 | 0.8894 | 1.1319 | 1.4091 | 1.7212 | 2.0688 |
| -12 | 0.3821 | 0.4031 | 0.4658 | 0.5695 | 0.7118 | 0.8910 | 1.1054 | 1.3540 | 1.6368 | 1.9543 | 2.3068 |
| -14 | 0.6165 | 0.6382 | 0.7033 | 0.8106 | 0.9578 | 1.1425 | 1.3630 | 1.6179 | 1.9070 | 2.2303 | 2.5881 |
| -16 | 0.8944 | 0.9169 | 0.9842 | 1.0951 | 1.2468 | 1.4368 | 1.6633 | 1.9245 | 2.2200 | 2.5494 | 2.9128 |
| -18 | 1.2174 | 1.2405 | 1.3096 | 1.4235 | 1.5794 | 1.7748 | 2.0071 | 2.2745 | 2.5761 | 2.9118 | 3.2814 |
| -20 | 1.5870 | 1.6104 | 1.6805 | 1.7965 | 1.9562 | 2.1568 | 2.3952 | 2.6684 | 2.9759 | 3.3178 | 3.6942 |

FIG. 12A

Related Art

| Y \ X | 0 | 2 | 4 | 6 | 8 | 10 | 12 | 14 | 16 | 18 | 20 |
|---|---|---|---|---|---|---|---|---|---|---|---|
| 20 | 2.7057 | 2.7241 | 2.7791 | 2.8707 | 2.9986 | 3.1625 | 3.3620 | 3.5972 | 3.8676 | 4.1738 | 4.5159 |
| 18 | 2.2603 | 2.2790 | 2.3348 | 2.4277 | 2.5570 | 2.7221 | 2.9226 | 3.1579 | 3.4278 | 3.7324 | 4.0722 |
| 16 | 1.8478 | 1.8670 | 1.9243 | 2.0192 | 2.1511 | 2.3189 | 2.5217 | 2.7586 | 3.0295 | 3.3341 | 3.6728 |
| 14 | 1.4648 | 1.4847 | 1.5441 | 1.6421 | 1.7777 | 1.9495 | 2.1560 | 2.3960 | 2.6690 | 2.9748 | 3.3137 |
| 12 | 1.1096 | 1.1303 | 1.1923 | 1.2943 | 1.4348 | 1.6117 | 1.8232 | 2.0676 | 2.3440 | 2.6522 | 2.9922 |
| 10 | 0.7816 | 0.8034 | 0.8684 | 0.9753 | 1.1216 | 1.3047 | 1.5222 | 1.7721 | 2.0531 | 2.3648 | 2.7073 |
| 8 | 0.4826 | 0.5055 | 0.5740 | 0.6862 | 0.8391 | 1.0291 | 1.2533 | 1.5096 | 1.7961 | 2.1123 | 2.4581 |
| 6 | 0.2157 | 0.2399 | 0.3119 | 0.4298 | 0.5896 | 0.7868 | 1.0182 | 1.2813 | 1.5740 | 1.8951 | 2.2447 |
| 4 | -0.0145 | 0.0108 | 0.0864 | 0.2098 | 0.3764 | 0.5809 | 0.8194 | 1.0893 | 1.3882 | 1.7145 | 2.0681 |
| 2 | -0.2030 | -0.1765 | -0.0976 | 0.0311 | 0.2041 | 0.4155 | 0.6606 | 0.9367 | 1.2413 | 1.5725 | 1.9298 |
| 0 | -0.3444 | -0.3169 | -0.2349 | -0.1016 | 0.0772 | 0.2945 | 0.5454 | 0.8266 | 1.1357 | 1.4707 | 1.8310 |
| -2 | -0.4341 | -0.4057 | -0.3214 | -0.1846 | -0.0015 | 0.2204 | 0.4756 | 0.7605 | 1.0725 | 1.4098 | 1.7718 |
| -4 | -0.4691 | -0.4403 | -0.3548 | -0.2163 | -0.0310 | 0.1935 | 0.4512 | 0.7382 | 1.0516 | 1.3896 | 1.7520 |
| -6 | -0.4494 | -0.4206 | -0.3351 | -0.1967 | -0.0113 | 0.2136 | 0.4720 | 0.7593 | 1.0725 | 1.4099 | 1.7715 |
| -8 | -0.3768 | -0.3482 | -0.2638 | -0.1269 | 0.0567 | 0.2802 | 0.5373 | 0.8232 | 1.1348 | 1.4704 | 1.8299 |
| -10 | -0.2544 | -0.2263 | -0.1435 | -0.0092 | 0.1713 | 0.3919 | 0.6460 | 0.9288 | 1.2374 | 1.5703 | 1.9267 |
| -12 | -0.0859 | -0.0586 | 0.0222 | 0.1531 | 0.3297 | 0.5460 | 0.7959 | 1.0744 | 1.3790 | 1.7083 | 2.0612 |
| -14 | 0.1244 | 0.1508 | 0.2290 | 0.3560 | 0.5280 | 0.7396 | 0.9847 | 1.2583 | 1.5585 | 1.8838 | 2.2330 |
| -16 | 0.3729 | 0.3983 | 0.4734 | 0.5960 | 0.7631 | 0.9699 | 1.2101 | 1.4791 | 1.7747 | 2.0961 | 2.4419 |
| -18 | 0.6566 | 0.6808 | 0.7528 | 0.8709 | 1.0330 | 1.2350 | 1.4708 | 1.7355 | 2.0273 | 2.3452 | 2.6885 |
| -20 | 0.9729 | 0.9962 | 1.0655 | 1.1796 | 1.3370 | 1.5344 | 1.7661 | 2.0274 | 2.3165 | 2.6323 | 2.9735 |

FIG. 12B

Related Art

Related Art

Related Art

Related Art

Related Art

| X\Y | -24 | -22 | -20 | -18 | -16 | -14 | -12 | -10 | -8 | -6 | -4 | -2 | 0 |
|---|---|---|---|---|---|---|---|---|---|---|---|---|---|
| 24 | | | | | | | | | | | | | |
| 22 | | | | | | | | | | | | | 2.9314 |
| 20 | | | | | | | | | | 2.6737 | 2.5794 | 2.5195 | 2.4941 |
| 18 | | | | | | | | 2.5634 | 2.8026 | 2.2720 | 2.1782 | 2.1187 | 2.0933 |
| 16 | | | | | | 2.6252 | 2.7611 | 2.1966 | 2.4004 | 1.9066 | 1.9131 | 1.7538 | 1.7285 |
| 14 | | | | | 2.5584 | 2.2925 | 2.3934 | 1.8557 | 2.0344 | 1.5769 | 1.4838 | 1.4247 | 1.3995 |
| 12 | | | | 2.5605 | 2.2604 | 1.9955 | 2.0617 | 1.5702 | 1.7042 | 1.2825 | 1.1897 | 1.1309 | 1.1058 |
| 10 | | | 2.6319 | 2.2970 | 1.9977 | 1.7337 | 1.7655 | 1.3098 | 1.4093 | 1.0230 | 0.9306 | 0.8719 | 0.8459 |
| 8 | | | 2.4028 | 2.0585 | 1.7700 | 1.5067 | 1.5045 | 1.0840 | 1.1494 | 0.7981 | 0.7060 | 0.6475 | 0.6224 |
| 6 | | 2.5791 | 2.2089 | 1.8751 | 1.5771 | 1.3143 | 1.2782 | 0.8926 | 0.9240 | 0.6073 | 0.5155 | 0.4572 | 0.4321 |
| 4 | | 2.4204 | 2.0503 | 1.7167 | 1.4188 | 1.1562 | 1.0853 | 0.7351 | 0.7329 | 0.4505 | 0.3590 | 0.3008 | 0.2757 |
| 2 | | 2.2975 | 1.9271 | 1.5932 | 1.2951 | 1.0324 | 0.9285 | 0.6115 | 0.5758 | 0.3274 | 0.2360 | 0.1778 | 0.1528 |
| 0 | | 2.2105 | 1.8394 | 1.5048 | 1.2052 | 0.9430 | 0.8047 | 0.5217 | 0.4525 | 0.2376 | 0.1463 | 0.0882 | 0.0632 |
| -2 | | 2.1600 | 1.7877 | 1.4520 | 1.1524 | 0.8885 | 0.7150 | 0.4659 | 0.3526 | 0.1812 | 0.0897 | 0.0316 | 0.0067 |
| -4 | 2.5695 | 2.1475 | 1.7737 | 1.4367 | 1.1358 | 0.8705 | 0.6598 | 0.4457 | 0.3065 | 0.1591 | 0.0668 | 0.0083 | -0.0168 |
| -6 | | 2.1745 | 1.7993 | 1.4607 | 1.1582 | 0.8913 | 0.6407 | 0.4527 | 0.2853 | 0.1723 | 0.0785 | 0.0187 | -0.0070 |
| -8 | | 2.2424 | 1.8555 | 1.5251 | 1.2205 | 0.9513 | 0.6595 | 0.5178 | 0.3004 | 0.2222 | 0.1257 | 0.0640 | 0.0373 |
| -10 | | 2.3521 | 1.9732 | 1.6305 | 1.3236 | 1.0517 | 0.7172 | 0.6121 | 0.3529 | 0.3096 | 0.2099 | 0.1455 | 0.1174 |
| -12 | | | 2.1235 | 1.7783 | 1.4683 | 1.1931 | 0.8145 | 0.7453 | 0.4438 | 0.4358 | 0.3320 | 0.2644 | 0.2348 |
| -14 | | | 2.3169 | 1.9586 | 1.6552 | 1.3763 | 0.9525 | 0.9214 | 0.5742 | 0.6018 | 0.4933 | 0.4222 | 0.3908 |
| -16 | | | | 2.2018 | 1.8845 | 1.6016 | 1.1318 | 1.1377 | 0.7449 | 0.8083 | 0.6950 | 0.6203 | 0.5872 |
| -18 | | | | | 2.1555 | 1.8691 | 1.3527 | 1.3956 | 0.9564 | 1.0561 | 0.9383 | 0.8602 | 0.8256 |
| -20 | | | | | | 2.1791 | 1.6155 | 1.6955 | 1.2092 | 1.3459 | 1.2243 | 1.1436 | 1.1078 |
| -22 | | | | | | | 1.9205 | 2.0378 | 1.5038 | 1.6788 | 1.5542 | 1.4718 | 1.4353 |
| -24 | | | | | | | 2.2684 | | 1.8409 | 2.0559 | 1.9292 | 1.8457 | 1.8089 |
| | | | | | | | | | 2.2219 | | | | 2.2290 |

FIG. 18A-1

Related Art

| X\Y | 0 | 2 | 4 | 6 | 8 | 10 | 12 | 14 | 16 | 18 | 20 | 22 | 24 |
|---|---|---|---|---|---|---|---|---|---|---|---|---|---|
| 24 | 2.9314 | | | | | | | | | | | | |
| 22 | 2.4941 | 2.5030 | 2.5454 | 2.6243 | 2.7368 | | | | | | | | |
| 20 | 2.0933 | 2.1022 | 2.1454 | 2.2229 | 2.3349 | 2.4814 | 2.6627 | | | | | | |
| 18 | 1.7285 | 1.7375 | 1.7805 | 1.8577 | 1.9591 | 2.1150 | 2.2956 | 2.5110 | | | | | |
| 16 | 1.3995 | 1.4085 | 1.4513 | 1.5281 | 1.6390 | 1.7843 | 1.9641 | 2.1787 | 2.4283 | | | | |
| 14 | 1.1058 | 1.1145 | 1.1572 | 1.2337 | 1.3442 | 1.4889 | 1.6680 | 1.8817 | 2.1305 | 2.4150 | | | |
| 12 | 0.8459 | 0.8555 | 0.8979 | 0.9740 | 1.0841 | 1.2282 | 1.4067 | 1.6198 | 1.8580 | 2.1518 | 2.4719 | | |
| 10 | 0.6224 | 0.6309 | 0.6731 | 0.7489 | 0.8586 | 1.0022 | 1.1802 | 1.3928 | 1.6406 | 1.9242 | 2.2441 | | |
| 8 | 0.4321 | 0.4405 | 0.4824 | 0.5580 | 0.6673 | 0.8105 | 0.9881 | 1.2005 | 1.4484 | 1.7322 | 2.0526 | 2.4101 | |
| 6 | 0.2757 | 0.2839 | 0.3256 | 0.4010 | 0.5100 | 0.6530 | 0.8305 | 1.0432 | 1.2916 | 1.5762 | 1.8976 | 2.2563 | |
| 4 | 0.1528 | 0.1609 | 0.2025 | 0.2777 | 0.3856 | 0.5297 | 0.7077 | 0.9123 | 1.1710 | 1.4572 | 1.7804 | 2.1410 | |
| 2 | 0.0632 | 0.0714 | 0.1128 | 0.1880 | 0.2972 | 0.4411 | 0.6204 | 0.8358 | 1.0878 | 1.3766 | 1.7024 | 2.0655 | |
| 0 | 0.0067 | 0.0150 | 0.0565 | 0.1318 | 0.2419 | 0.3876 | 0.5693 | 0.7877 | 1.0430 | 1.3354 | 1.6547 | 2.0312 | 2.4355 |
| -2 | -0.0168 | -0.0083 | 0.0337 | 0.1103 | 0.2224 | 0.3710 | 0.5562 | 0.7785 | 1.0378 | 1.3342 | 1.6675 | 2.0377 | |
| -4 | -0.0070 | 0.0017 | 0.0452 | 0.1243 | 0.2400 | 0.3925 | 0.5823 | 0.8091 | 1.0727 | 1.3732 | 1.7105 | 2.0847 | |
| -6 | 0.0373 | 0.0464 | 0.0919 | 0.1745 | 0.2947 | 0.4524 | 0.5473 | 0.8790 | 1.1473 | 1.4523 | 1.7939 | 2.1723 | |
| -8 | 0.1174 | 0.1269 | 0.1748 | 0.2614 | 0.3867 | 0.5500 | 0.7507 | 0.9879 | 1.2613 | 1.5710 | 1.9174 | 2.3006 | |
| -10 | 0.2348 | 0.2445 | 0.2947 | 0.3854 | 0.5159 | 0.6852 | 0.8920 | 1.1352 | 1.4141 | 1.7293 | 2.0810 | | |
| -12 | 0.3908 | 0.4007 | 0.4530 | 0.5474 | 0.6828 | 0.8580 | 1.0712 | 1.3205 | 1.6057 | 1.9269 | 2.2848 | | |
| -14 | 0.5872 | 0.5972 | 0.5512 | 0.7487 | 0.8887 | 1.0695 | 1.2889 | 1.5449 | 1.8367 | 2.1645 | | | |
| -16 | 0.8256 | 0.8357 | 0.8910 | 0.9910 | 1.1348 | 1.3207 | 1.5452 | 1.8088 | 2.1076 | | | | |
| -18 | 1.1078 | 1.1179 | 1.1740 | 1.2757 | 1.4225 | 1.6127 | 1.8437 | 2.1129 | | | | | |
| -20 | 1.4353 | 1.4453 | 1.5017 | 1.6043 | 1.7531 | 1.9467 | 2.1826 | | | | | | |
| -22 | 1.8089 | 1.8188 | 1.8753 | 1.9783 | 2.1283 | | | | | | | | |
| -24 | 2.2290 | | | | | | | | | | | | |

Related Art

FIG. 18A-2

| Y\X | -24 | -22 | -20 | -18 | -16 | -14 | -12 | -10 | -8 | -6 | -4 | -2 | 0 |
|---|---|---|---|---|---|---|---|---|---|---|---|---|---|
| 24 | | | | | | | | | | | | | 3.1026 |
| 22 | | | | | | | | | 2.8724 | 2.7320 | 2.6330 | 2.5738 | 2.5534 |
| 20 | | | | | | | 2.7827 | 2.5634 | 2.3882 | 2.2544 | 2.1599 | 2.1033 | 2.0839 |
| 18 | | | | | | 2.6118 | 2.3574 | 2.1477 | 1.9794 | 1.8501 | 1.7581 | 1.7028 | 1.6838 |
| 16 | | | | | 2.5386 | 2.2475 | 2.0029 | 1.7995 | 1.6345 | 1.5053 | 1.4143 | 1.3585 | 1.3395 |
| 14 | | | | 2.5589 | 2.2289 | 1.9474 | 1.7083 | 1.5071 | 1.3416 | 1.2111 | 1.1165 | 1.0590 | 1.0393 |
| 12 | | | 2.6704 | 2.2981 | 1.9774 | 1.7012 | 1.4537 | 1.2609 | 1.0914 | 0.9552 | 0.8573 | 0.7958 | 0.7762 |
| 10 | | | 2.4540 | 2.0905 | 1.7756 | 1.5013 | 1.2622 | 1.0551 | 0.8797 | 0.7381 | 0.6338 | 0.5698 | 0.5481 |
| 8 | | 2.6982 | 2.2875 | 1.9300 | 1.6175 | 1.3426 | 1.1001 | 0.8874 | 0.7051 | 0.5566 | 0.4455 | 0.3787 | 0.3558 |
| 6 | | 2.5712 | 2.1661 | 1.8117 | 1.4996 | 1.2227 | 0.9760 | 0.7574 | 0.5683 | 0.4131 | 0.2985 | 0.2263 | 0.2021 |
| 4 | | 2.4881 | 2.0854 | 1.7331 | 1.4200 | 1.1405 | 0.8895 | 0.6656 | 0.4705 | 0.3096 | 0.1895 | 0.1154 | 0.0902 |
| 2 | | 2.4452 | 2.0457 | 1.6921 | 1.3775 | 1.0952 | 0.8406 | 0.6122 | 0.4125 | 0.2477 | 0.1244 | 0.0483 | 0.0225 |
| 0 | 2.8981 | 2.4431 | 2.0421 | 1.6871 | 1.3705 | 1.0858 | 0.8284 | 0.5971 | 0.3948 | 0.2278 | 0.1030 | 0.0260 | 0.0000 |
| -2 | | 2.4768 | 2.0735 | 1.7162 | 1.3975 | 1.1107 | 0.8515 | 0.6189 | 0.4160 | 0.2489 | 0.1242 | 0.0475 | 0.0218 |
| -4 | | 2.5457 | 2.1385 | 1.7779 | 1.4565 | 1.1679 | 0.9078 | 0.6755 | 0.4738 | 0.3083 | 0.1853 | 0.1098 | 0.0850 |
| -6 | | 2.6487 | 2.2358 | 1.8706 | 1.5459 | 1.2554 | 0.9950 | 0.7638 | 0.5646 | 0.4020 | 0.2816 | 0.2033 | 0.1847 |
| -8 | | 2.7847 | 2.3644 | 1.9930 | 1.6640 | 1.3710 | 1.1103 | 0.8807 | 0.6842 | 0.5251 | 0.4081 | 0.3373 | 0.3154 |
| -10 | | | 2.5236 | 2.1444 | 1.8096 | 1.5131 | 1.2512 | 1.0227 | 0.8290 | 0.6733 | 0.5597 | 0.4917 | 0.4714 |
| -12 | | | 2.7138 | 2.3248 | 1.9821 | 1.6803 | 1.4159 | 1.1873 | 0.9955 | 0.8429 | 7325.0000 | 0.6672 | 0.6484 |
| -14 | | | | 2.5353 | 2.1822 | 1.8725 | 1.6032 | 1.3729 | 1.1818 | 1.0314 | 0.9238 | 0.8607 | 0.8431 |
| -16 | | | | | 2.4118 | 2.0911 | 1.8140 | 1.5793 | 1.3870 | 1.2375 | 1.1317 | 1.0702 | 1.0535 |
| -18 | | | | | | 2.0000 | 2.0507 | 1.8086 | 1.6122 | 1.4514 | 1.3558 | 1.2951 | 1.2788 |
| -20 | | | | | | | 2.3168 | 2.0542 | 1.8606 | 1.7054 | 1.5978 | 1.5364 | 1.5204 |
| -22 | | | | | | | | | 2.1364 | 1.9740 | 1.8618 | 1.7982 | 1.7820 |
| -24 | | | | | | | | | | | | | 2.0697 |

FIG. 18B-1

| X\Y | 0 | 2 | 4 | 6 | 8 | 10 | 12 | 14 | 16 | 18 | 20 | 22 | 24 |
|---|---|---|---|---|---|---|---|---|---|---|---|---|---|
| 24 | 3.1026 | | | | | | | | | | | | |
| 22 | 2.5534 | 2.5715 | 2.6284 | 2.7245 | 2.8513 | | | | | | | | |
| 20 | 2.0839 | 2.1013 | 2.1557 | 2.2475 | 2.3778 | 2.5486 | 2.7623 | | | | | | |
| 18 | 1.6838 | 1.7010 | 1.7542 | 1.8436 | 1.9697 | 2.1337 | 2.3379 | 2.5866 | | | | | |
| 16 | 1.3395 | 1.3570 | 1.4107 | 1.5003 | 1.6254 | 1.7853 | 1.9843 | 2.2224 | 2.5050 | | | | |
| 14 | 1.0393 | 1.0576 | 1.1134 | 1.2056 | 1.3329 | 1.4945 | 1.6904 | 1.9229 | 2.1960 | 2.5158 | | | |
| 12 | 0.7762 | 0.7958 | 0.8547 | 0.9513 | 1.0833 | 1.2487 | 1.4453 | 1.6771 | 1.9445 | 2.2548 | 2.6151 | | |
| 10 | 0.5481 | 0.5590 | 0.6316 | 0.7336 | 0.8718 | 1.0431 | 1.2450 | 1.4772 | 1.7426 | 2.0468 | 2.3977 | | |
| 8 | 0.3558 | 0.3781 | 0.4444 | 0.5521 | 0.6971 | 0.8751 | 1.0826 | 1.3182 | 1.5840 | 1.8854 | 2.2300 | 2.6266 | |
| 6 | 0.2021 | 0.2256 | 0.2954 | 0.4083 | 0.5598 | 0.7444 | 0.9576 | 1.1972 | 1.4649 | 1.7656 | 2.1058 | 2.4974 | |
| 4 | 0.0902 | 0.1147 | 0.1873 | 0.3047 | 0.4616 | 0.6518 | 0.8599 | 1.1134 | 1.3834 | 1.6848 | 2.0246 | 2.4114 | |
| 2 | 0.0225 | 0.0478 | 0.1225 | 0.2431 | 0.4039 | 0.5982 | 0.8199 | 1.0664 | 1.3387 | 1.6414 | 1.9812 | 2.3652 | |
| 0 | 0.0000 | 0.0258 | 0.1019 | 0.2244 | 0.3873 | 0.5837 | 0.8075 | 1.0559 | 1.3300 | 1.6343 | 1.9750 | 2.3559 | 2.7981 |
| -2 | 0.0218 | 0.0481 | 0.1245 | 0.2475 | 0.4107 | 0.6073 | 0.8314 | 1.0805 | 1.3560 | 1.6618 | 2.0041 | 2.3905 | |
| -4 | 0.0850 | 0.1116 | 0.1879 | 0.3099 | 0.4718 | 0.6668 | 0.8899 | 1.1388 | 1.4150 | 1.7224 | 2.0668 | 2.4559 | |
| -6 | 0.1847 | 0.2116 | 0.2872 | 0.4074 | 0.5668 | 0.7592 | 0.9802 | 1.2284 | 1.5051 | 1.8142 | 2.1616 | 2.5549 | |
| -8 | 0.3154 | 0.3426 | 0.4172 | 0.5353 | 0.6916 | 0.8810 | 1.0999 | 1.3472 | 1.6248 | 1.9364 | 2.2881 | 2.6872 | |
| -10 | 0.4714 | 0.4990 | 0.5727 | 0.6886 | 0.8422 | 1.0291 | 1.2454 | 1.4937 | 1.7731 | 2.0888 | 2.4457 | | |
| -12 | 0.6484 | 0.6763 | 0.7490 | 0.8633 | 1.0151 | 1.2007 | 1.4178 | 1.6667 | 1.9499 | 2.2719 | 2.6382 | | |
| -14 | 0.8431 | 0.8710 | 0.9430 | 1.0554 | 1.2078 | 1.3940 | 1.6132 | 1.8562 | 2.1560 | 2.4872 | | | |
| -16 | 1.0535 | 1.0814 | 1.1531 | 1.2668 | 1.4196 | 1.6088 | 1.8331 | 2.0935 | 2.3935 | | | | |
| -18 | 1.2788 | 1.3070 | 1.3794 | 1.4948 | 1.6513 | 1.8465 | 2.0796 | 2.3516 | | | | | |
| -20 | 1.5204 | 1.5495 | 1.6238 | 1.7432 | 1.9060 | 2.1107 | 2.3553 | | | | | | |
| -22 | 1.7820 | 1.8128 | 1.8908 | 2.0161 | 2.1882 | | | | | | | | |
| -24 | 2.0697 | | | | | | | | | | | | |

FIG. 18B-2

Related Art

Related Art

Related Art

Related Art

| X | -24 | -22 | -20 | -18 | -16 | -14 | -12 | -10 | -8 | -6 | -4 | -2 | 0 |
|---|---|---|---|---|---|---|---|---|---|---|---|---|---|
| Y |   |   |   |   |   |   |   |   |   |   |   |   |   |
| 24 |   |   |   |   |   |   |   |   |   |   |   |   | 2.4507 |
| 22 |   |   |   |   |   |   |   |   | 2.4904 | 2.3300 | 2.2065 | 2.1177 | 2.0639 |
| 20 |   |   |   |   |   |   | 2.5760 | 2.3389 | 2.1403 | 1.9801 | 1.8568 | 1.7682 | 1.7146 |
| 18 |   |   |   |   |   | 2.5368 | 2.2619 | 2.0251 | 1.8267 | 1.6667 | 1.5435 | 1.4550 | 1.4016 |
| 16 |   |   |   |   | 2.5709 | 2.2587 | 1.9840 | 1.7475 | 1.5493 | 1.3894 | 1.2662 | 1.1778 | 1.1244 |
| 14 |   |   |   | 2.6774 | 2.3288 | 2.0168 | 1.7423 | 1.5060 | 1.3079 | 1.1148 | 1.0248 | 0.9363 | 0.8830 |
| 12 |   |   | 2.8548 | 2.4708 | 2.1228 | 1.8111 | 1.5369 | 1.3006 | 1.1025 | 0.9425 | 0.8192 | 0.7307 | 0.6774 |
| 10 |   |   | 2.6824 | 2.2994 | 1.9522 | 1.6412 | 1.3672 | 1.1310 | 0.9328 | 0.7727 | 0.6494 | 0.5609 | 0.5075 |
| 8 |   | 2.9614 | 2.5437 | 2.1620 | 1.8159 | 1.5058 | 1.2325 | 0.9965 | 0.7984 | 0.6384 | 0.5150 | 0.4265 | 0.3732 |
| 6 |   | 2.8533 | 2.4373 | 2.0571 | 1.7125 | 1.4038 | 1.1316 | 0.8966 | 0.6991 | 0.5395 | 0.4162 | 0.3276 | 0.2742 |
| 4 |   | 2.7783 | 2.3640 | 1.9855 | 1.6426 | 1.3356 | 1.0653 | 0.8320 | 0.6362 | 0.4778 | 0.3553 | 0.2672 | 0.2138 |
| 2 |   | 2.7382 | 2.3251 | 1.9482 | 1.6070 | 1.3019 | 1.0340 | 0.8036 | 0.6107 | 0.4551 | 0.3349 | 0.2482 | 0.1949 |
| 0 | 3.1780 | 2.7295 | 2.3176 | 1.9420 | 1.6025 | 1.2998 | 1.0347 | 0.8080 | 0.6192 | 0.4677 | 0.3510 | 0.2665 | 0.2133 |
| -2 |   | 2.7482 | 2.3374 | 1.9632 | 1.6257 | 1.3255 | 1.0639 | 0.8414 | 0.6573 | 0.5108 | 0.3984 | 0.3165 | 0.2633 |
| -4 |   | 2.7906 | 2.3808 | 2.0083 | 1.6730 | 1.3759 | 1.1181 | 0.9000 | 0.7211 | 0.5799 | 0.4722 | 0.3930 | 0.3399 |
| -6 |   | 2.8554 | 2.4468 | 2.0761 | 1.7435 | 1.4498 | 1.1961 | 0.9828 | 0.8090 | 0.6732 | 0.5700 | 0.4932 | 0.4401 |
| -8 |   | 2.9428 | 2.5356 | 2.1671 | 1.8374 | 1.5473 | 1.2980 | 1.0896 | 0.9210 | 0.7900 | 0.6906 | 0.6158 | 0.5624 |
| -10 |   |   | 2.6475 | 2.2813 | 1.9547 | 1.6685 | 1.4238 | 1.2205 | 1.0567 | 0.9296 | 0.8328 | 0.7590 | 0.7054 |
| -12 |   |   | 2.7825 | 2.4189 | 2.0955 | 1.8133 | 1.5733 | 1.3751 | 1.2157 | 1.0911 | 0.9953 | 0.9216 | 0.8676 |
| -14 |   |   |   | 2.5791 | 2.2591 | 1.9808 | 1.7453 | 1.5518 | 1.3959 | 1.2728 | 1.1769 | 1.1026 | 1.0481 |
| -16 |   |   |   |   | 2.4446 | 2.1699 | 1.9383 | 1.7482 | 1.5948 | 1.4724 | 1.3762 | 1.3013 | 1.2464 |
| -18 |   |   |   |   |   | 2.3804 | 2.1517 | 1.9638 | 1.8115 | 1.6895 | 1.5931 | 1.5178 | 1.4625 |
| -20 |   |   |   |   |   |   | 2.3861 | 2.1995 | 2.0477 | 1.9257 | 1.8290 | 1.7535 | 1.6978 |
| -22 |   |   |   |   |   |   |   |   | 2.3050 | 2.1828 | 2.0856 | 2.0069 | 1.9536 |
| -24 |   |   |   |   |   |   |   |   |   |   |   |   | 2.2315 |

FIG. 24A-1

Related Art

FIG. 24A-2

| Y\X | 0 | 2 | 4 | 6 | 8 | 10 | 12 | 14 | 16 | 18 | 20 | 22 | 24 |
|---|---|---|---|---|---|---|---|---|---|---|---|---|---|
| 24 | 2.9314 | | | | | | | | | | | | |
| 22 | 2.4941 | 2.5030 | 2.5454 | 2.6243 | 2.7368 | | | | | | | | |
| 20 | 2.0933 | 2.1022 | 2.1454 | 2.2229 | 2.3349 | 2.4814 | 2.6627 | | | | | | |
| 18 | 1.7286 | 1.7375 | 1.7805 | 1.8577 | 1.9691 | 2.1150 | 2.2956 | 2.5110 | | | | | |
| 16 | 1.3996 | 1.4085 | 1.4513 | 1.5281 | 1.6390 | 1.7843 | 1.9641 | 2.1787 | 2.4283 | | | | |
| 14 | 1.1058 | 1.1146 | 1.1572 | 1.2337 | 1.3442 | 1.4889 | 1.6680 | 1.8817 | 2.1306 | 2.4150 | | | |
| 12 | 0.4869 | 0.8555 | 0.8979 | 0.9740 | 1.0841 | 1.2282 | 1.4067 | 1.6198 | 1.8680 | 2.1518 | 2.4719 | | |
| 10 | 0.6224 | 0.6309 | 0.6731 | 0.7489 | 0.8586 | 1.0022 | 1.1802 | 1.3928 | 1.6406 | 1.9242 | 2.2441 | 2.4101 | |
| 8 | 0.4321 | 0.4405 | 0.4824 | 0.5580 | 0.6673 | 0.8105 | 0.9881 | 1.2006 | 1.4484 | 1.7322 | 2.0526 | 2.2563 | |
| 6 | 0.2757 | 0.2839 | 0.3256 | 0.4010 | 0.5100 | 0.6530 | 0.8305 | 1.0432 | 1.2916 | 1.5762 | 1.8976 | 2.1410 | |
| 4 | 0.1528 | 0.1609 | 0.2025 | 0.2777 | 0.3866 | 0.5297 | 0.7077 | 0.9213 | 1.1710 | 1.4572 | 1.7804 | 2.2563 | |
| 2 | 0.0632 | 0.0714 | 0.1128 | 0.1880 | 0.2972 | 0.4411 | 0.6204 | 0.8358 | 1.0878 | 1.3766 | 1.7024 | 2.0655 | |
| 0 | 0.0067 | 0.0150 | 0.0565 | 0.1318 | 0.2419 | 0.3876 | 0.5693 | 0.7877 | 1.0430 | 1.3354 | 1.6647 | 2.0312 | 2.4355 |
| -2 | -0.0168 | -0.0083 | 0.0337 | 0.1103 | 0.2224 | 0.3710 | 0.5562 | 0.7785 | 1.0378 | 1.3342 | 1.6675 | 2.0377 | |
| -4 | -0.0070 | 0.0017 | 0.0452 | 0.1243 | 0.2400 | 0.3926 | 0.5823 | 0.8091 | 1.0727 | 1.3732 | 1.7105 | 2.0847 | |
| -6 | 0.0373 | 0.0464 | 0.0919 | 0.1745 | 0.2947 | 0.4524 | 0.6473 | 0.8790 | 1.1473 | 1.4523 | 1.7939 | 2.1723 | |
| -8 | 0.1174 | 0.1269 | 0.1748 | 0.2614 | 0.3867 | 0.5500 | 0.7507 | 0.9879 | 1.2613 | 1.5710 | 1.9174 | 2.3006 | |
| -10 | 0.2348 | 0.2445 | 0.2947 | 0.3854 | 0.5159 | 0.6852 | 0.8920 | 1.1352 | 1.4141 | 1.7293 | 2.0810 | | |
| -12 | 0.3908 | 0.4007 | 0.4530 | 0.5474 | 0.6828 | 0.8580 | 1.0712 | 1.3206 | 1.6057 | 1.9269 | 2.2848 | | |
| -14 | 0.5872 | 0.5972 | 0.6512 | 0.7487 | 0.8887 | 1.0695 | 1.2889 | 1.5449 | 1.8367 | 2.1646 | | | |
| -16 | 0.8256 | 0.8357 | 0.8910 | 0.9910 | 1.1348 | 1.3207 | 1.5462 | 1.8088 | 2.1076 | | | | |
| -18 | 1.1078 | 1.1179 | 1.1740 | 1.2757 | 1.4225 | 1.6127 | 1.8437 | 2.1129 | | | | | |
| -20 | 1.4353 | 1.4453 | 1.5017 | 1.6043 | 1.7531 | 1.9467 | 2.1826 | | | | | | |
| -22 | 1.8089 | 1.8188 | 1.8753 | 1.9783 | 2.1283 | | | | | | | | |
| -24 | 2.2290 | | | | | | | | | | | | |

Related Art

| Y\X | -24 | -22 | -20 | -18 | -16 | -14 | -12 | -10 | -8 | -6 | -4 | -2 | 0 |
|---|---|---|---|---|---|---|---|---|---|---|---|---|---|
| 24 | | | | | | | | | | | | | 2.5418 |
| 22 | | | | | | | | | 2.6138 | 2.4396 | 2.3044 | 2.2082 | 2.1509 |
| 20 | | | | | | | 2.7263 | 2.4728 | 2.2583 | 2.0831 | 1.9471 | 1.8504 | 1.7929 |
| 18 | | | | | 2.7486 | 2.7003 | 2.4068 | 2.1520 | 1.9364 | 1.7603 | 1.6236 | 1.5265 | 1.4688 |
| 16 | | | | 2.8690 | 2.4979 | 2.4155 | 2.1207 | 1.8648 | 1.6483 | 1.4714 | 1.3341 | 1.2366 | 1.1786 |
| 14 | | | 3.0574 | 2.6513 | 2.2803 | 2.1639 | 1.8681 | 1.6114 | 1.3940 | 1.2164 | 1.0786 | 0.9807 | 0.9223 |
| 12 | | 3.1491 | 2.8705 | 2.4658 | 2.0956 | 1.9459 | 1.6495 | 1.3920 | 1.1739 | 0.9956 | 0.8573 | 0.7588 | 0.7000 |
| 10 | | 3.0196 | 2.7145 | 2.3119 | 1.9432 | 1.7614 | 1.4647 | 1.2067 | 0.9880 | 0.8092 | 0.6702 | 0.5712 | 0.5118 |
| 8 | | 2.9178 | 2.5887 | 2.1890 | 1.8226 | 1.6100 | 1.3137 | 1.0555 | 0.8365 | 0.6572 | 0.5177 | 0.4180 | 0.3578 |
| 6 | | 2.8413 | 2.4911 | 2.0949 | 1.7314 | 1.4911 | 1.1959 | 0.9383 | 0.7194 | 0.5399 | 0.4000 | 0.2995 | 0.2382 |
| 4 | | 2.7897 | 2.4191 | 2.0268 | 1.6665 | 1.4023 | 1.1090 | 0.8530 | 0.6353 | 0.4565 | 0.3167 | 0.2158 | 0.1533 |
| 2 | | 2.7605 | 2.3716 | 1.9837 | 1.6272 | 1.3402 | 1.0498 | 0.7968 | 0.5818 | 0.4054 | 0.2671 | 0.1665 | 0.1030 |
| 0 | | 2.7550 | 2.3480 | 1.9648 | 1.6130 | 1.3044 | 1.0179 | 0.7690 | 0.5583 | 0.3856 | 0.2500 | 0.1504 | 0.0858 |
| -2 | 3.2340 | 2.7724 | 2.3475 | 1.9698 | 1.6236 | 1.2949 | 1.0133 | 0.7697 | 0.5642 | 0.3961 | 0.2640 | 0.1658 | 0.1002 |
| -4 | | 2.8132 | 2.3701 | 1.9982 | 1.6586 | 1.3115 | 1.0360 | 0.7986 | 0.5989 | 0.4361 | 0.3078 | 0.2112 | 0.1445 |
| -6 | | | 2.4159 | 2.0500 | 1.7174 | 1.3535 | 1.0851 | 0.8545 | 0.6611 | 0.5038 | 0.3794 | 0.2845 | 0.2168 |
| -8 | | | 2.4851 | 2.1252 | 1.7996 | 1.4199 | 1.1592 | 0.9359 | 0.7491 | 0.5973 | 0.4767 | 0.3834 | 0.3150 |
| -10 | | | 2.5780 | 2.2238 | 1.9047 | 1.5097 | 1.2569 | 1.0413 | 0.8614 | 0.7147 | 0.5976 | 0.5057 | 0.4370 |
| -12 | | | | 2.3468 | 2.0338 | 1.6221 | 1.3771 | 1.1694 | 0.9963 | 0.8544 | 0.7401 | 0.6495 | 0.5810 |
| -14 | | | | | 2.1881 | 1.7579 | 1.5203 | 1.3201 | 1.1534 | 1.0158 | 0.9040 | 0.8148 | 0.7471 |
| -16 | | | | | | 1.9184 | 1.6874 | 1.4937 | 1.3323 | 1.1985 | 1.0892 | 1.0019 | 0.9358 |
| -18 | | | | | | 2.1047 | 1.8793 | 1.6906 | 1.5335 | 1.4030 | 1.2963 | 1.2114 | 1.1475 |
| -20 | | | | | | | 2.0970 | 1.9121 | 1.7582 | 1.6305 | 1.5264 | 1.4440 | 1.3829 |
| -22 | | | | | | | | | 2.0077 | 1.8822 | 1.7804 | 1.7006 | 1.6424 |
| -24 | | | | | | | | | | | | | 1.9266 |

FIG. 24B-1

| Y \ X | 0 | 2 | 4 | 6 | 8 | 10 | 12 | 14 | 16 | 18 | 20 | 22 | 24 |
|---|---|---|---|---|---|---|---|---|---|---|---|---|---|
| 24 | 2.5418 | | | | | | | | | | | | |
| 22 | 2.1509 | 2.1324 | 2.1523 | 2.2104 | 2.3064 | | | | | | | | |
| 20 | 1.7929 | 1.7743 | 1.7942 | 1.8524 | 1.9485 | 2.0821 | 2.2528 | | | | | | |
| 18 | 1.4688 | 1.4501 | 1.4700 | 1.5282 | 1.6243 | 1.7578 | 1.9281 | 2.1348 | | | | | |
| 16 | 1.1786 | 1.1598 | 1.1796 | 1.2377 | 1.3336 | 1.4666 | 1.6364 | 1.8422 | 2.0834 | | | | |
| 14 | 0.9223 | 0.9032 | 0.9229 | 0.9807 | 1.0761 | 1.2085 | 1.3772 | 1.5816 | 1.8210 | 2.0948 | | | |
| 12 | 0.7000 | 0.6805 | 0.6997 | 0.7570 | 0.8516 | 0.9829 | 1.1501 | 1.3525 | 1.5895 | 1.8604 | 2.1646 | | |
| 10 | 0.5118 | 0.4915 | 0.5100 | 0.5663 | 0.6599 | 0.7896 | 0.9546 | 1.1542 | 1.3879 | 1.6552 | 1.9556 | | |
| 8 | 0.3578 | 0.3366 | 0.3539 | 0.4088 | 0.5004 | 0.6277 | 0.7896 | 0.9854 | 1.2150 | 1.4780 | 1.7741 | 2.1029 | |
| 6 | 0.2382 | 0.2158 | 0.2314 | 0.2841 | 0.3728 | 0.4964 | 0.6539 | 0.8448 | 1.0693 | 1.3273 | 1.6188 | 1.9433 | |
| 4 | 0.1533 | 0.1290 | 0.1421 | 0.1913 | 0.2755 | 0.3940 | 0.5459 | 0.7311 | 0.9499 | 1.2026 | 1.4892 | 1.8094 | |
| 2 | 0.1030 | 0.0760 | 0.0848 | 0.1287 | 0.2068 | 0.3189 | 0.4645 | 0.6435 | 0.8565 | 1.1039 | 1.3859 | 1.7018 | |
| 0 | 0.0858 | 0.0554 | 0.0588 | 0.0960 | 0.1668 | 0.2714 | 0.4100 | 0.5827 | 0.7900 | 1.0322 | 1.3095 | 1.6213 | 1.9669 |
| -2 | 0.1002 | 0.0661 | 0.0635 | 0.0931 | 0.1557 | 0.2521 | 0.3832 | 0.5494 | 0.7511 | 0.9883 | 1.2612 | 1.5692 | |
| -4 | 0.1445 | 0.1067 | 0.0980 | 0.1198 | 0.1738 | 0.2617 | 0.3850 | 0.5446 | 0.7407 | 0.9732 | 1.2419 | 1.5464 | |
| -6 | 0.2168 | 0.1756 | 0.1613 | 0.1758 | 0.2214 | 0.3006 | 0.4162 | 0.5693 | 0.7599 | 0.9877 | 1.2525 | 1.5537 | |
| -8 | 0.3150 | 0.2711 | 0.2522 | 0.2603 | 0.2983 | 0.3696 | 0.4778 | 0.6245 | 0.8097 | 1.0329 | 1.2938 | 1.5919 | |
| -10 | 0.4370 | 0.3913 | 0.3693 | 0.3727 | 0.4045 | 0.4690 | 0.5706 | 0.7114 | 0.8912 | 1.1098 | 1.3667 | | |
| -12 | 0.5810 | 0.5348 | 0.5115 | 0.5123 | 0.5400 | 0.5993 | 0.6954 | 0.8308 | 1.0054 | 1.2191 | 1.4717 | | |
| -14 | 0.7471 | 0.7015 | 0.6785 | 0.6786 | 0.7041 | 0.7601 | 0.8519 | 0.9823 | 1.1517 | 1.3603 | | | |
| -16 | 0.9358 | 0.8917 | 0.8700 | 0.8708 | 0.8961 | 0.9507 | 1.0394 | 1.1653 | 1.3294 | | | | |
| -18 | 1.1475 | 1.1055 | 1.0858 | 1.0886 | 1.1154 | 1.1701 | 1.2570 | 1.3788 | | | | | |
| -20 | 1.3829 | 1.3435 | 1.3264 | 1.3318 | 1.3612 | 1.4172 | 1.5029 | | | | | | |
| -22 | 1.6424 | 1.6060 | 1.5920 | 1.6006 | 1.6328 | | | | | | | | |
| -24 | 1.9266 | | | | | | | | | | | | |

FIG. 24B-2

| Y \ X | -24 | -22 | -20 | -18 | -16 | -14 | -12 | -10 | -8 | -6 | -4 | -2 | 0 |
|---|---|---|---|---|---|---|---|---|---|---|---|---|---|
| 24 | | | | | | | | | | | | | 1.3906 |
| 22 | | | | | | | | | 0.9735 | 0.9034 | 0.8778 | 0.8960 | 0.9572 |
| 20 | | | | | | | | 0.7095 | 0.5955 | 0.5260 | 0.5004 | 0.5178 | 0.5776 |
| 18 | | | | | | | 0.8685 | 0.3814 | 0.2686 | 0.1997 | 0.1740 | 0.1906 | 0.2489 |
| 16 | | | | | | 0.7390 | 0.5382 | 0.1022 | -0.0093 | -0.0778 | -0.1039 | -0.0882 | -0.0314 |
| 14 | | | | | 0.6951 | 0.4551 | 0.2571 | -0.1299 | -0.2406 | -0.3089 | -0.3354 | -0.3207 | -0.2653 |
| 12 | | | | 0.7298 | 0.4551 | 0.2187 | 0.0232 | -0.3172 | -0.4273 | -0.4956 | -0.5227 | -0.5090 | -0.4550 |
| 10 | | | 0.8340 | 0.5310 | 0.2612 | 0.0281 | -0.1653 | -0.4613 | -0.5712 | -0.6398 | -0.6675 | -0.6547 | -0.6019 |
| 8 | | 0.8659 | 0.6726 | 0.3763 | 0.1112 | -0.1188 | -0.3103 | -0.5635 | -0.6732 | -0.7421 | -0.7705 | -0.7586 | -0.7068 |
| 6 | | 0.7755 | 0.5525 | 0.2630 | 0.0029 | -0.2237 | -0.4133 | -0.6248 | -0.7342 | -0.8034 | -0.8322 | -0.8210 | -0.7701 |
| 4 | | 0.7202 | 0.4708 | 0.1886 | -0.0660 | -0.2888 | -0.4760 | -0.6477 | -0.7558 | -0.8244 | -0.8531 | -0.8422 | -0.7920 |
| 2 | | 0.6968 | 0.4241 | 0.1493 | -0.0993 | -0.3174 | -0.5012 | -0.6354 | -0.7401 | -0.8062 | -0.8335 | -0.8220 | -0.7723 |
| 0 | 1.0002 | 0.7042 | 0.4088 | 0.1413 | -0.1011 | -0.3139 | -0.4929 | -0.5888 | -0.6882 | -0.7499 | -0.7741 | -0.7612 | -0.7119 |
| -2 | | 0.7420 | 0.4237 | 0.1632 | -0.0725 | -0.2791 | -0.4522 | -0.5077 | -0.6003 | -0.6561 | -0.6761 | -0.6612 | -0.6119 |
| -4 | | 0.8100 | 0.4686 | 0.2154 | -0.0132 | -0.2126 | -0.3784 | -0.3919 | -0.4766 | -0.5255 | -0.5405 | -0.5231 | -0.4737 |
| -6 | | 0.9082 | 0.5437 | 0.2980 | 0.0774 | -0.1137 | -0.2709 | -0.2414 | -0.3176 | -0.3592 | -0.3688 | -0.3485 | -0.2984 |
| -8 | | 1.0372 | 0.6490 | 0.4114 | 0.1998 | 0.0181 | -0.1296 | -0.0569 | -0.1243 | -0.1584 | -0.1626 | -0.1390 | -0.0878 |
| -10 | | | 0.7854 | 0.5563 | 0.3543 | 0.1829 | 0.0454 | 0.1612 | 0.1025 | 0.0754 | 0.0764 | 0.1034 | 0.1566 |
| -12 | | | 0.9534 | 0.7332 | 0.5412 | 0.3805 | 0.2536 | 0.4123 | 0.3618 | 0.3409 | 0.3467 | 0.3772 | 0.4331 |
| -14 | | | 1.1536 | 0.9428 | 0.7611 | 0.6111 | 0.4948 | 0.6958 | 0.6529 | 0.6376 | 0.6476 | 0.6818 | 0.7431 |
| -16 | | | | 1.1858 | 1.0145 | 0.8750 | 0.7689 | 1.0115 | 0.9754 | 0.9652 | 0.9794 | 1.0176 | 1.0809 |
| -18 | | | | | 1.3024 | 1.1173 | 1.0763 | 1.3592 | 1.3290 | 1.3236 | 1.3422 | 1.3845 | 1.4518 |
| -20 | | | | | | 1.5052 | 1.4170 | 1.7388 | 1.8136 | 1.7128 | 1.7356 | 1.7821 | 1.8531 |
| -22 | | | | | | | 1.7904 | | 2.1292 | 2.1326 | 2.1595 | 2.2098 | 2.2842 |
| -24 | | | | | | | | | | | | | 2.7441 |

| X\Y | 0 | 2 | 4 | 6 | 8 | 10 | 12 | 14 | 16 | 18 | 20 | 22 | 24 |
|---|---|---|---|---|---|---|---|---|---|---|---|---|---|
| 24 | | | | | | | | | | | | | |
| 22 | 1.3906 | | | | | | | | | | | | |
| 20 | 0.9572 | 1.0603 | 1.2044 | 1.3880 | 1.6097 | | | | | | | | |
| 18 | 0.5776 | 0.6788 | 0.8206 | 1.0022 | 1.2222 | 1.4790 | 1.7702 | | | | | | |
| 16 | 0.2489 | 0.3481 | 0.4877 | 0.6669 | 0.8850 | 1.1404 | 1.4313 | 1.7558 | | | | | |
| 14 | -0.0314 | 0.0659 | 0.2032 | 0.3801 | 0.5960 | 0.8498 | 1.1400 | 1.4649 | 1.8223 | | | | |
| 12 | -0.2653 | -0.1699 | -0.0346 | 0.1401 | 0.3539 | 0.6060 | 0.8951 | 1.2201 | 1.5787 | 1.9678 | | | |
| 10 | -0.4550 | -0.3611 | -0.2277 | -0.0549 | 0.1571 | 0.4077 | 0.6958 | 1.0205 | 1.3796 | 1.7701 | 2.1889 | | |
| 8 | -0.6019 | -0.5095 | -0.3776 | -0.2063 | 0.0043 | 0.2535 | 0.5406 | 0.8648 | 1.2239 | 1.6150 | 2.0352 | | |
| 6 | -0.7068 | -0.6155 | -0.4848 | -0.3148 | -0.1056 | 0.1421 | 0.4279 | 0.7510 | 1.1095 | 1.5005 | 1.9213 | 2.3689 | |
| 4 | -0.7701 | -0.6798 | -0.5500 | -0.3810 | -0.1736 | 0.0720 | 0.3557 | 0.6769 | 1.0341 | 1.4244 | 1.8451 | 2.2930 | |
| 2 | -0.7920 | -0.7027 | -0.5741 | -0.4067 | -0.2015 | 0.0413 | 0.3220 | 0.6408 | 0.9960 | 1.3849 | 1.8047 | 2.2522 | |
| 0 | -0.7723 | -0.6846 | -0.5584 | -0.3940 | -0.1921 | 0.0475 | 0.3251 | 0.6411 | 0.9939 | 1.3808 | 1.7989 | 2.2452 | |
| -2 | -0.7119 | -0.6262 | -0.5035 | -0.3434 | -0.1456 | 0.0903 | 0.3646 | 0.6776 | 1.0276 | 1.4118 | 1.8275 | 2.2714 | 2.7393 |
| -4 | -0.6119 | -0.5284 | -0.4097 | -0.2545 | -0.0613 | 0.1705 | 0.4410 | 0.7505 | 1.0971 | 1.4781 | 1.8903 | 2.3306 | |
| -6 | -0.4737 | -0.3921 | -0.2771 | -0.1267 | 0.0616 | 0.2886 | 0.5548 | 0.8601 | 1.2028 | 1.5798 | 1.9876 | 2.4226 | |
| -8 | -0.2984 | -0.2183 | -0.1063 | 0.0400 | 0.2234 | 0.4452 | 0.7061 | 1.0067 | 1.3449 | 1.7169 | 2.1990 | 2.5471 | |
| -10 | -0.0878 | -0.0082 | 0.1018 | 0.2448 | 0.4237 | 0.6402 | 0.8955 | 1.1906 | 1.5233 | 1.8893 | 2.2842 | 2.7034 | |
| -12 | 0.1566 | 0.2368 | 0.3460 | 0.4868 | 0.6620 | 0.8734 | 1.1230 | 1.4120 | 1.7383 | 2.0969 | 2.4828 | | |
| -14 | 0.4331 | 0.5154 | 0.6254 | 0.7653 | 0.9377 | 1.1448 | 1.3887 | 1.6712 | 1.9899 | 2.3393 | 2.7141 | | |
| -16 | 0.7431 | 0.8268 | 0.9388 | 1.0790 | 1.2498 | 1.4533 | 1.6916 | 1.9668 | 2.2762 | 2.6144 | | | |
| -18 | 1.0809 | 1.1701 | 1.2849 | 1.4264 | 1.5964 | 1.7969 | 2.0296 | 2.2961 | 2.5942 | | | | |
| -20 | 1.4518 | 1.5445 | 1.6623 | 1.8057 | 1.9756 | 2.1732 | 2.3998 | 2.6563 | | | | | |
| -22 | 1.8531 | 1.9491 | 2.0696 | 2.2145 | 2.3841 | 2.5786 | | | | | | | |
| -24 | 2.2842 | 2.3827 | 2.5051 | 2.6507 | 2.8189 | | | | | | | | |
|  | 2.7441 | | | | | | | | | | | | |

US 11,372,264 B2

PROGRESSIVE SPECTACLE LENS WITH A VARIABLE REFRACTIVE INDEX, AND METHOD FOR DESIGNING AND PRODUCING SAME

CROSS REFERENCE TO RELATED APPLICATIONS

This application is a continuation application of international patent application PCT/EP2018/069806, filed Jul. 20, 2018, designating the United States and claiming priority from international patent application PCT/EP2018/000026, filed Jan. 18, 2018, and designating the United States, and the entire content of both applications is incorporated herein by reference.

TECHNICAL FIELD

The disclosure relates to a product comprising a progressive power spectacle lens or a representation, situated on a data medium, of the progressive power spectacle lens having a front surface, a back surface, and a spatially varying refractive index, a computer-implemented method for designing a progressive power spectacle lens having a front surface, a back surface, and a spatially varying refractive index, and a method for producing a progressive power spectacle lens having a front surface, a back surface, and a spatially varying refractive index, as well as a computer program for executing the method, and a computer-readable medium for storing the computer program.

BACKGROUND

In spectacle lens optics, progressive power spectacle lenses have been known and prevalent for decades. Like multifocal spectacle lenses (generally bifocal and trifocal spectacle lenses), these provide additional optical power for a presbyopic user in the lower portion of the lens for the purposes of observing close objects, e.g., when reading. This additional optical power is required because the lens of the eye loses its property of being able to focus on near objects more and more with increasing age. Compared to these multifocal lenses, progressive power lenses offer the advantage of providing a continuous increase in the optical power from the distance portion to the near portion such that sharp vision is ensured not only in the distance and nearby, but also at all intermediate distances.

Pursuant to section 14.1.1 of DIN EN ISO 13666:2013-10, the distance portion is that portion of a multifocal or progressive power spectacle lens that has the dioptric power for distance vision. Accordingly, the near portion pursuant to section 14.1.3 of this standard is that portion of a multifocal or progressive power spectacle lens that has the dioptric power for near vision.

Until now, progressive power spectacle lenses have usually been produced from a material with a uniform constant refractive index. This means that the dioptric power of the spectacle lens is only set by appropriate shaping of the two surfaces, adjoining the air (front or object-side surface and back or eye-side surface according to the definitions provided in sections 5.8 and 5.9 of DIN EN ISO 13666:2013-10), of the spectacle lens. Pursuant to the definition in section 9.3 of DIN EN ISO 13666:2013-10, dioptric power is the collective term for the focusing and the prismatic power of a spectacle lens.

In order to produce the continuous increase of the focusing power in a progressive power spectacle lens made of a material with a uniform constant refractive index, a corresponding continuous change in the surface curvature must be present on at least one of the two spectacle lens surfaces, as also reflected in section 8.3.5 of the DIN EN ISO 13666:2013-10 standard, which defines the term "progressive power spectacle lens" as "spectacle lens with at least one progressive surface and an increasing (positive) power as the spectacle wearer looks down." Pursuant to section 7.7, a progressive surface is a surface, which is non-rotationally symmetrical, with a continuous change of curvature over part or all of the progressive surface, generally intended to provide increasing addition or degression power.

For a predetermined prescription, a progressive power spectacle lens that leads to a specific design taking account of conditions of use, thickness stipulations, etc. and using a material with a constant refractive index can be optimized according to the related art described above. The term design here denotes the distribution of the residual spherical and astigmatic aberrations for the spectacle wearer over the entire lens.

For this progressive power spectacle lens, it is possible to determine a principal line of sight, which represents the totality of all visual points through one of the two surfaces, e.g., the front surface or the back surface, in particular the progressive surface, as the gaze of the eye moves to object points straight ahead of the spectacle wearer from the distance region to the near region and for which small residual astigmatic aberrations can be achieved particularly in the intermediate portion. The intermediate portion is the entire transition region between the distance portion (region for distance vision; see 14.1.1 in DIN EN ISO 13666:2013-10: part of a multifocal or progressive power spectacle lens that has the dioptric power for distance vision) and the near portion (region for near vision; see 14.1.3 DIN EN ISO 13666:2013-10: part of a multifocal or progressive power spectacle lens that has the dioptric power for near vision). In 14.1.2 of DIN EN ISO 13666:2013-10, the intermediate portion is defined as the portion of a trifocal spectacle lens that has the dioptric power for vision at a distance that lies between the distance region and the near region.

However, owing to Minkwitz's law, the residual astigmatic aberrations will increase in the horizontal direction alongside the principal line of sight (owing to the increase in power in the vertical direction).

WO 89/04986 A1 initially proceeds from progressive power spectacle lenses (this document uses the expression "progressive spectacle lenses") of the type set forth at the outset. From page 1, 2nd and 3rd section of the document, it is possible to gather that "the manufacturing process and, more particularly, polishing" of progressive surfaces of progressive power spectacle lenses are "difficult" on account of the surface form of the latter that "deviates very strongly from the spherical form" and that the manufactured surface deviates strongly from the calculated intended form. "Moreover, it is not possible—at least with one progressive surface—to keep the imaging aberrations and, more particularly, the astigmatism and distortion small over the entire lens."

On page 2, WO 89/04986 A1 it is explained further that although spectacle lenses with a changing refractive index are known, the realization of progressive spectacle lenses by replacing the complicated surface form of the progressive surface by a varying refractive index has failed in the past, presumably due to the expected similarly complicated refractive index function thereof.

WO 89/04986 A1 claims to achieve "a simplified manufacture in the case of comparable imaging properties if [ . . . ] a refractive index of the lens material that changes at least along the principal line of sight in the intermediate portion at least partly contributes to the increase in the optical power." However, this is realized under the goal of "decreasing the differences in the radii of curvature between distance portion and near portion such that, firstly, the processing of a blank with spherical boundary surfaces for the purposes of manufacturing a progressive surface is reduced" and "secondly, the polishing procedure, which substantially corresponds to that of a spherical lens in the progressive spectacle lenses according to the related art, is simplified and the result of the polishing process is improved." This is because the use of large-area polishing tools, the polishing surfaces of which had approximately the size of the progressive surface to be polished, was usual at the time of the filing date of WO 89/04986 A1.

Further, on page 5, line 15ff., the document explains: "If the astigmatism is additionally also reduced along the principal meridian as a result of the variation in the refractive index, this means that the restriction when forming the spectacle lens of the surface astigmatism having to be small along the principal meridian or the principal line of sight is dispensed with, and so the spectacle lens [ . . . ] is not subject to Minkwitz's theorem and the spectacle lens can be formed substantially more cost-effectively under other aspects."

The declared object of this document is that of obtaining polishable surfaces in a simple manner by virtue of the refractive index variation having a correspondingly complicated form. The penultimate paragraph on page 6 expressly explains: "In the extreme case, it is even possible here for both surfaces of the progressive spectacle lens to be spherical surfaces. However, it is naturally also possible to use rotationally symmetric aspherical surfaces." On the other hand, the document mentions no restrictions in respect of the complexity of the refractive index function which, according to the last sentence on page 6, can be "described by means of spline functions, for example in the case of a one-dimensional function n(y) [ . . . ]."

The document discloses two exemplary embodiments. In the second exemplary embodiment "both the front surface and the eye-side surface are spherical surfaces [ . . . ]" (see ibid., page 11, last sentence). In the first exemplary embodiment, the front surface has a principal meridian in the form of a circle (see ibid., page 10, lines 6-13) and, perpendicular thereto, it has the form of conic sections (see ibid., page 11, lines 6-14). The back side is spherical in the first exemplary embodiment.

In respect of the first exemplary embodiment, the document expressly refers [ . . . ] "to the fact that the correction of imaging aberrations has not been taken into account during the optimization and that, nevertheless, lenses with very good imaging properties in the lateral regions have emerged. A further improvement in the imaging properties in the regions laterally to the principal meridian is obtained by further optimization of the index function".

WO 99/13361 A1 describes a so-called "MIV" lens object, which is intended to have all functional features of progressive power lenses, specifically a distance portion, a near portion and a progressive zone, but whose edge regions should be free from astigmatic aberrations. This document describes that such a lens object may comprise a spherical front surface and a spherical back surface. The lens object should comprise a progressive zone with a refractive index that continuously increases from the distance portion to the near portion. However, as a rule, it is not possible to realize all desired additions in such an embodiment. Therefore, the document explains: "If desired, the range of additions can be bridged, in case that is impossible by the sole variable refractive index, also by manufacturing the lenses with a variable refractive index material rough block, as described above, and forming variable geometry curves as the traditional progressive lenses, thus obtaining the result of having far higher performances in comparison to the latter, because the lens, having different refractive indexes in the different areas, provides the desired addition by using much less differentiated curves between the far sight and the near sight with a reduction of the aberration area and an increase of the useful sight area."

US 2010/0238400 A1, from which the disclosure proceeds, describes progressive power spectacle lenses consisting of a plurality of layers in each case. At least one of the layers may have a varying refractive index, which is described with respect to two meridians that extend orthogonal to one another. Moreover, at least one of the surfaces of one of the layers may have a progressive surface form. It describes that the refractive index profile in the horizontal direction can be used for the full correction of the by the geometry of the surfaces.

Yuki shitanoki et al.: "Application of Graded-Index for Astigmatism Reduction in Progressive Addition Lens", Applied Physics Express, Vol. 2, Mar. 1, 2009, page 032401, describes, by the comparison of two progressive power spectacle lenses molded with the aid of the same mold shell, the fact that the astigmatism in the case of a progressive power spectacle lens with a refractive index gradient can be reduced compared with a progressive power spectacle lens without a refractive index gradient.

Particularly with regard to the distinguishability of the subject matter of the present disclosure from the multilayer spectacle lenses described in US 2010/0238400 A1, a statement is provided herewith that spectacle lenses are regularly subject to one or more finishing processes. In particular, functional layers are applied to one or both sides. Such functional layers are layers which equip the spectacle lenses with predetermined properties, which are advantageous to the spectacle wearer and which the spectacle lenses would not have purely on the basis of the properties of the base or carrier material, onto which the functional layers are applied where necessary, and the forming. In addition to optical properties, such as an antireflection coating, silvering, light polarization, coloring, self-tinting etc., such advantageous properties also include mechanical properties, such as hardening, reduction of the adherence of dirt or reduction in steaming up, etc., and/or electrical properties such as shielding from electromagnetic radiation, conduction of electrical current, etc., and/or other physical or chemical properties. Examples of functional coatings are gathered e.g., from the documents WO 10/109154 A1, WO 01/55752 A1, and DE 10 2008 041 869 A1. These functional layers have no influence, or a negligible influence, on the dioptric properties of the spectacle lens discussed within the scope of the present disclosure. The layers described in US 2010/0238400 A1, by contrast, have a non-negligible influence on the dioptric power of the progressive power spectacle lens.

EP 2 177 943 A1 describes a method for calculation by optimization of an optical system, for example an ophthalmic lens, according to at least one criterion from a list of criteria that influence a subject's visual impression. The document proposes minimizing a cost function taking account of target values and criterion values. A general formula for such a cost function is specified. The following two examples, inter alia, are specified:

Paragraph [0016]: In one embodiment, the optical working system to be optimized comprises at least two optical surfaces and the modified parameters are at least the coefficients of the equations of two optical surfaces of the optical working system.

Paragraph [0018]: In one embodiment, in which the optical system to be optimized comprises at least two optical surfaces, the modification of the optical working system is carried out in such a way that at least the index of the optical working system is modified. It is possible to manufacture a lens from an inhomogeneous material in which a gradient is present in the refractive index (this is known as a GRIN lens). By way of example, the distribution of the optimized index can be axial or radial and/or depend on the wavelength.

SUMMARY

Now, the object of the disclosure is considered that of providing a progressive power spectacle lens that has further improved optical properties for the spectacle wearer compared to the progressive power spectacle lenses known from the related art and of providing a method that can be used to design and produce a progressive power spectacle lens with further improved optical imaging properties.

This object is achieved by means of a product and a method as disclosed herein.

Exemplary embodiments and developments are discussed in detail below.

While WO 89/04986 A1 proposes a reduction in the complexity of the required surface geometry by introducing a complicated but, counter to earlier assumptions, technically realizable refractive index distribution so as to simplify the manufacturing thereof (see ibid., page 2, fourth paragraph, last line; page 4, first paragraph, last sentence; page 5, first paragraph; page 5, second paragraph; page 5, last paragraph, last sentence; page 6, penultimate paragraph) and thus reduce the large deviations, which impair the optical properties, of the manufactured surface from the calculated surface (see ibid., page 1, 3rd paragraph), the inventors have recognized that this procedure does not necessarily lead to progressive power spectacle lenses with optical properties that are improved for the spectacle wearer. The inventors have recognized that the interplay of the degree of complexity of the geometry of the progressive surface and the degree of the complexity of the refractive index distribution is decisive. Deviating from the solution described in WO 89/04986 A1, the inventors therefore propose a product comprising a progressive power spectacle lens or a representation of the progressive power spectacle lens, the representation being situated on a data medium, or a data medium with a virtual representation of the progressive power spectacle lens. The progressive power spectacle lens comprises a front surface and a back surface and a spatially varying refractive index. The front surface or the back surface or the front and back surfaces is/are embodied as a progressive surface. The progressive power spectacle lens is distinguished according to the disclosure by virtue of the fact that the front surface embodied as a progressive surface is embodied as a freeform surface or that the back surface embodied as a progressive surface is embodied as a freeform surface or that both surfaces embodied as progressive surfaces are embodied as freeform surfaces. Thus, this also includes the case where even though both surfaces, i.e., front and back surface, are embodied as progressive surfaces, only one of the two surfaces is present as a freeform surface.

Within the scope of the present disclosure, the expression "a representation of a progressive power spectacle lens, the representation being situated on a data medium" is understood to mean, for example, a representation of the progressive power spectacle lens stored in a memory of a computer.

The representation of the progressive power spectacle lens comprises, in particular, a description of the geometric form and of the medium of the progressive power spectacle lens. By way of example, such a representation may comprise a mathematical description of the front surface, the back surface, the arrangement of these surfaces with respect to one another (including the thickness) and the edge delimitation of the progressive power spectacle lens, and the refractive index distribution of the medium of which the progressive power spectacle lens should consist. Said representation of the geometric form of the spectacle lens could also include the position of specific structural reference points, centration points and markings for aligning the lens (permanent marking); in this respect, see section 14.1.24 of DIN EN ISO 13666:2012). The representation can be present in encoded form or even in encrypted form. Here, medium means the material/materials or the substance used to manufacture the progressive power spectacle lens. The progressive power spectacle lens may also consist of a plurality of layers, for example also of an extremely thin glass with a thickness of between 10 μm and 500 μm and plastic applied thereon.

The representation, in particular the description of the geometric form of the progressive power spectacle lens and of the medium from which the progressive power spectacle lens is formed, the description being explained in detail above, can also be transformable by a transformation into manufacturing data for producing a progressive power spectacle lens. The representation can alternatively or additionally comprise the transformed manufacturing data for producing the progressive power spectacle lens.

In the context of the present disclosure, manufacturing data are understood to mean the data that can be loaded (i) into the drive device of the manufacturing machine or (ii) into the drive device or the drive devices of the manufacturing machines, in order to manufacture the progressive power spectacle lens with the geometric form according to the disclosure and the medium.

In the context of the present disclosure, virtual representation is understood to mean a description of the geometric form and of the medium, in particular the refractive index profile thereof, of the progressive power spectacle lens. By way of example, such a representation may comprise a mathematical description of the front surface, the back surface, the arrangement of these surfaces with respect to one another (including the thickness) and the edge of the progressive power spectacle lens, and the refractive index distribution of the medium of which the progressive power spectacle lens should consist. The representation can be present in encoded form or even in encrypted form. Here, medium means the material/materials or the substance used to manufacture the progressive power spectacle lens.

Pursuant to section 5.8 of DIN EN ISO 13666:2013-10, the front surface or object-side surface of a spectacle lens is that surface of a spectacle lens which is intended to face away from the eye in the spectacles. Accordingly, pursuant to section 5.9 of this standard, the back surface is the eye-side surface, i.e., the surface of a spectacle lens which is intended to face the eye in the spectacles.

Pursuant to section 7.7 of DIN EN ISO 13666:2013-10, a progressive surface is a surface, which is non-rotationally symmetrical, with a continuous change of curvature over part or all of the surface, generally intended to provide increasing addition or degression power. A continuous change excludes jump-like changes. Generally means, particularly within the scope of the disclosure, that the addition or the degression power can be provided, although this need not be the case. In particular, the spatially varying refractive index can at least partly assume this task within the scope of the present disclosure. According to this definition, any freeform surface is a progressive surface, but the converse does not hold true.

In a broad sense, a freeform surface is understood to mean a complex surface which, in particular, can be represented exclusively by means of (in particular piecewise) polynomial functions (in particular polynomial splines, such as, bicubic splines, higher-order splines of fourth order or higher, Zernike polynomials, Forbes surfaces, Chebyshev polynomials, Fourier series, polynomial non-uniform rational B-splines (NURBS)). These should be distinguished from simple surfaces such as, spherical surfaces, rotationally symmetrical aspherical surfaces, cylindrical surfaces, toric surfaces or else the surfaces described in WO 89/04986 A1, which are described as circles, at least along the principal meridian (cf. ibid., page 12, lines 6-13). Expressed differently, freeform surfaces cannot be represented in the form of conventional regular bodies such as, for example, spherical surfaces, aspherical surfaces, cylindrical surfaces, toric surfaces or else the surfaces described in WO 89/04986 A1 (see, e.g., www.computerwoche.de/a/die-natur-kennt-auch-nur-freiformflaechen, 1176029, retrieved on Jan. 18, 2018; www.megacad.de/kennenlernen/megacad-schulungen/schulungsinhalte/schulung-freiformflaechen.html, retrieved on Jan. 18, 2018), but for example can be represented exclusively by means of (in particular piecewise) polynomial functions (in particular polynomial splines such as, for example, bicubic splines, higher-order splines of fourth order or higher, Zernike polynomials, Forbes surfaces, Chebyshev polynomials, Fourier series, polynomial non-uniform rational B-splines (NURBS)). Accordingly, freeform surfaces are surfaces that do not correspond to regular geometry (see, e.g., www.infograph.de/de/nurbs, retrieved on Jan. 18, 2018; books.google.de/ books?id=QpugBwAAQBAJ&pg=PA101&lpg=PA101& dq=regelgeometrie+ definition&source=bl&ots=CJjmQwghvo&sig=M vsG-vOsqbAVEygCaW-JQhfJ99jw&hl=de&sa=X&ved=0ahUKEwicD5y-HYAhXDXCwKHUaQCBw4ChDoAQgsMAI#v= onepage&q=regelgeometrie %20definition &f=false, retrieved on Jan. 18, 2018) or that are not describable by means of forms of analytic geometry (see, e.g., books-.google.de/ books?id=LPzBgAAQBAJ&pg=PA26&lpg=PA26&dq= regelgeometrie+ definition&source=bl&ots=e1upL5jinn&sig=hUNim u8deH5x80vCiYsa242ddn8&hl=de&sa=X&ved= 0ahUKEwi_jcD5y-HYAhXDXCwKHUaQCBw4ChDoAQgvMAM#v= onepage&q=regelgeometrie%20definition&f=false, retrieved on Jan. 18, 2018).

The object described at the outset is achieved in its entirety by the exemplary embodiments, labeled below as variants, of a progressive power spectacle lens.

According to the disclosure, provision is made for the freeform surface to be a freeform surface in the narrower sense, corresponding to section 2.1.2 of the DIN SPEC 58194, dated December 2015, specifically a spectacle lens surface manufactured using freeform technology, which is described mathematically within the limits of differential geometry and which is neither point symmetric nor axially symmetric.

Moreover, in one advantageous exemplary embodiment, the freeform surface can have not only no point symmetry and no axial symmetry, but also no rotational symmetry and no symmetry with respect to a plane of symmetry. Even though it is expedient to remove all restrictions in respect to the surface geometry, in view of currently usual requirements on the optical properties of progressive power spectacle lenses, it is sufficient to only admit freeform surfaces with a high degree of complexity as progressive surfaces. If, moreover, the same degree of complexity is admitted for the refractive index distribution over the progressive power spectacle lens, to be precise in at least two or preferably three spatial dimensions, these progressive power spectacle lenses will meet the requirements of the spectacle wearers in respect of their optical properties to the greatest possible extent.

The disclosure is characterized, then, by one of the following alternatives:
(a) The refractive index varies only in a first spatial dimension and in a second spatial dimension and is constant in a third spatial dimension, wherein a distribution of the refractive index in the first spatial dimension and the second spatial dimension has neither point symmetry nor axial symmetry.
(b) The refractive index changes in a first spatial dimension and in a second spatial dimension and in a third spatial dimension. A distribution of the refractive index in the first spatial dimension and the second spatial dimension in all planes perpendicular to the third spatial dimension has neither a point symmetry nor an axial symmetry.
(c) The refractive index changes in a first spatial dimension and in a second spatial dimension and in a third spatial dimension. A distribution of the refractive index has no point symmetry and no axial symmetry at all.

In one typical exemplary embodiment of the disclosure, the third spatial dimension in case (a) or (b) extends in a direction which differs by not more than 5° from the zero viewing direction during use as intended or differs by not more than 10° from the zero viewing direction during use as intended or differs by not more than 20° from the zero viewing direction during use as intended or differs by not more than 5° from the principal viewing direction during use as intended or differs by not more than 10° from the principal viewing direction during use as intended or differs by not more than 20° from the principal viewing direction during use as intended or differs by not more than 5° from the direction of the normal vector of the front surface in the geometric center of the progressive power spectacle lens or differs by not more than 10° from the direction of the normal vector of the front surface in the geometric center of the progressive power spectacle lens or differs by not more than 20° from the direction of the normal vector of the front surface in the geometric center of the progressive power spectacle lens or differs by not more than 5° from the direction of the normal vector at the prismatic measurement point or differs by not more than 10° from the direction of the normal vector at the prismatic measurement point or differs by not more than 20° from the direction of the normal vector at the prismatic measurement point or differs by not more than 5° from the direction of the normal vector at the centration point or differs by not more than 10° from the direction of the normal vector at the centration point or differs by not more than 20° from the direction of the normal vector at the centration point.

The prismatic measurement point is a point on the front surface which is specified by the manufacturer according to DIN EN ISO 13666:2013-10-14.2.12 (in the case of a progressive power spectacle lens or a progressive power spectacle lens blank) and at which the prismatic powers of the finished lens must be determined. The definition of the centration point is found in section 5.20 in DIN EN ISO 13666:2013-10.

In a further exemplary embodiment of the disclosure, it is provided that
(i) the front surface embodied as a freeform surface is fashioned such that the maximum of the absolute value of the mean curvature of the front surface is in the intermediate corridor, and/or
(ii) the back surface embodied as a freeform surface is fashioned such that the minimum of the absolute value of the mean curvature of the back surface is in the intermediate corridor, or
(iii) the back surface has a spherical, rotationally symmetrically aspheric or toric surface geometry and the front surface embodied as a freeform surface is fashioned such that the maximum of the absolute value of the mean curvature of the front surface is in the intermediate corridor, or
(iv) the front surface has a spherical, rotationally symmetrically aspheric or toric surface geometry and the back surface embodied as a freeform surface is fashioned such that the minimum of the absolute value of the mean curvature of the back surface is in the intermediate corridor, or
(v) the back surface is not embodied as a freeform surface and the front surface embodied as a freeform surface is fashioned such that the maximum of the absolute value of the mean curvature of the front surface is in the intermediate corridor, or
(vi) the front surface is not embodied as a freeform surface and the back surface embodied as a freeform surface is fashioned such that the minimum of the absolute value of the mean curvature of the back surface is in the intermediate corridor.

Here, pursuant to DIN EN ISO 13666:2013-10, section 14.1.25, the intermediate corridor is the region of a progressive power spectacle lens providing clear vision for ranges intermediate between distance and near.

Such surfaces can be manufactured with very high accuracy using the currently available production processes. Advantages during the manufacturing emerge, in particular, when this surface geometry is chosen for the front surface. The abrasion due to polishing when currently conventional polishing tools, whose at least approximately spherical polishing surface corresponds to approximately a third of the spectacle lens surface to be polished, are used can be kept sufficiently homogeneous over the spectacle lens surface to be polished such that the deviation from the calculated spectacle lens geometry is comparatively small. Consequently, the deviation of the actual optical properties from the calculated optical properties of the spectacle lens is very small.

A further variant of the disclosure is characterized in that the progressive power spectacle lens according to the disclosure is formed in such a way that it has more advantageous optical properties described below for the progressive power spectacle wearer in relation to a comparison progressive power spectacle lens, which has no spatial refractive index variation but an identical distribution of the spherical equivalent.

A statement that a spectacle lens is designed for a predetermined arrangement in front of an eye of a spectacle lens wearer and for one or more predetermined object distances, at which the spectacle lens wearer should perceive an object in focus, is provided for explanatory purposes. The spectacle lens is worthless or the optical quality is very restricted for the spectacle wearer in the case of an arrangement deviating therefrom in front of the eye of the spectacle wearer and for other object distances. This applies even more to progressive power spectacle lenses. Accordingly, a progressive power spectacle lens is only characterized by way of the knowledge of the predetermined arrangement in front of the eye of the spectacle wearer. Expressed differently, the knowledge of the arrangement of the spectacle lens in terms of location and alignment in space in relation to the eye is necessary but also sufficient to characterize the spectacle lens in one-to-one fashion in terms of the optical power thereof for the spectacle wearer. Moreover, an optician is only able to insert the spectacle lens into a spectacle frame with the correct positioning if they are aware of the arrangement of the spectacle lens in terms of location and alignment in relation to the eye of the spectacle wearer. A representation of the predetermined arrangement of the progressive power spectacle lens in front of an eye of a progressive power spectacle wearer, for whom the progressive power spectacle lens is intended, is therefore an inseparable component of the product or of the commercial ware of a "progressive power spectacle lens".

For the purposes of ensuring an arrangement with the correct position and orientation in the progressive power spectacle lens by the optician, the manufacturer attaches permanently present markings. From DIN EN ISO 13666: 2013-10, section 14.1.24, it is possible to gather that these are referred to as markings for alignment or permanent markings and that these were attached by the manufacturer to establish the horizontal orientation of the spectacle lens [ . . . ] or to re-establish other reference points. Pursuant to section 6.1 of DIN EN ISO 14889:2009, the manufacturer of uncut finished spectacle lenses must facilitate an identification by statements on the individual packaging or in an accompanying document. In particular, there should be correction values for use situations, the near addition power, the type designation or the brand name and the necessary information to measure the addition power. The underlying object distance model used by the manufacturer of the progressive power spectacle lens emerges from the type designation or the brand name. The object distance for the distance or near region is possibly also an ordering parameter that can or must be specified by the optician. According to 3.1 of this standard, the manufacturer should be understood to be a natural person or legal entity who commercially distributes the uncut finished spectacle lens.

In this variant according to the disclosure, the product further comprises a representation, situated on a data medium, of a predetermined arrangement of the progressive power spectacle lens in front of an eye of a progressive power spectacle wearer, for whom the progressive power spectacle lens is intended. As already explained, the progressive power spectacle lens embodied according to the disclosure (not only) in this variant has a distribution of a spherical equivalent for the predetermined arrangement of the progressive power spectacle lens in front of the eye of the progressive power spectacle wearer, for whom the progressive power spectacle lens is intended. Further, the progressive power spectacle lens embodied according to the disclosure comprises an intermediate corridor with a width. The progressive power spectacle lens designed according to this variant according to the disclosure has a refractive index that varies spatially in such a way that the width of the intermediate corridor of the progressive power spectacle lens, at least in a section (e.g., in a horizontal section or in the region of the intermediate corridor in which the increase in power is between 25% and 75% of the addition, or over the entire length; the width of the intermediate corridor at the beginning and at the end of the intermediate corridor sometimes also depends on the configuration of the distance or near portion) or over the entire length of the intermediate corridor, is greater than the width of the intermediate corridor of a comparison progressive power spectacle lens for the same prescription and in the case of the same object distance model with the same distribution of the spherical equivalent in the case of the same arrangement of the comparison progressive power spectacle lens in front of the eye of the progressive power spectacle wearer, but with a spatially non-varying refractive index.

Here, the term "spherical equivalent" is defined as the arithmetic mean of the focusing power, as emerges, for example, from Albert J. Augustin: Augenheilkunde. 3rd, completely reworked and extended edition. Springer, Berlin et al. 2007, ISBN 978-3-540-30454-8, p. 1272 or Heinz Diepes, Ralf Blendowske: Optik and Technik der Brille. 1st edition, Optische Fachveroffentlichung GmbH, Heidelberg 2002, ISBN 3-922269-34-6, page 482:

spherical equivalent=sphere+½×cylinder.

Pursuant to section 9.2 of DIN EN ISO 13666:2013-10, focal power is the collective term for the spherical and astigmatic powers of a spectacle lens. In the equation, the spherical power is abbreviated by "sphere;" the astigmatic power is represented by "cylinder." The term mean spherical power is also used for the term spherical equivalent.

Pursuant to DIN EN ISO 13666:2013-10, section 14.1.25, the intermediate corridor—as already explained above—is the region of a progressive power spectacle lens providing clear vision for ranges intermediate between distance and near. The principal line of sight, which represents the totality of all visual points through one of the two delimiting surfaces, i.e. the front surface or the back surface, of the progressive power spectacle lens during the gazing movement of the eye on object points straight in front of the spectacle wearer from distance to near, extends through the center of the intermediate corridor. The principal line of sight is regularly assumed on the front surface. Expressed differently, the principal line of sight denotes that line on the front surface of a spectacle lens that interconnects the principal visual points through the progressive power lens for distance and near vision and on which the intersection points of the visual rays for intermediate distances lie in the "straight-ahead" direction (Note: the use of the back surface as a reference surface on which the principal line of sight lies is rather unusual). Regularly, the principal line of sight is a line extending approximately perpendicular in the distance and near portion and a line extending in twisted fashion in the intermediate corridor, i.e., the portion of the progressive power spectacle lens that has the dioptric power for vision at ranges intermediate between distance and near. By way of example, the length of the intermediate corridor can arise from the positions of the distance and near design reference points or from the positions of the distance and near reference points. Pursuant to 5.13 of DIN EN ISO 13666:2013-10, the distance design reference point is that point, stipulated by the manufacturer, on the front surface of a finished lens or on the finished surface of a lens blank, at which the design specifications for the distance portion apply. Accordingly, pursuant to 5.14 of this standard, the near design reference point is that point, stipulated by the manufacturer, on the front surface of a finished lens or on the finished surface of a lens blank, at which the design specifications for the near portion apply. Pursuant to 5.15, the distance reference point or the major reference point is that point on the front surface of a spectacle lens at which the dioptric power for the distance portion must be achieved and, pursuant to 5.17, the near visual point is the assumed position of the visual point on a lens, which is used for near vision under given conditions.

In principle, the properties of the progressive power spectacle lens can be set and determined one-to-one in relation to a comparison progressive power spectacle lens on the basis of the specifications provided above. A simple criterion arises if the assumption is made that the at least one section is a variant of the group:

horizontal section,
section at half addition (more particularly on the principal line of sight),
horizontal section at half addition (more particularly on the principal line of sight),
horizontal section at half addition (more particularly on the principal line of sight) and horizontal section at 25% of the addition (more particularly on the principal line of sight),
horizontal section at half addition (more particularly on the principal line of sight) and horizontal section at 75% of the addition (more particularly on the principal line of sight),
horizontal section at half addition (more particularly on the principal line of sight) and horizontal section at 25% of the addition (more particularly on the principal line of sight) and horizontal section at 75% of the addition (more particularly on the principal line of sight).

In section 14.2.1, DIN EN ISO 13666:2013-10 defines the addition power as a difference between the vertex power of the near portion and the vertex power of the distance portion, measured under specified conditions. This standard specifies that corresponding measuring methods are contained in the decisive standard for spectacle lenses. As the decisive standard, DIN EN ISO 13666:2013-10 refers to DIN EN ISO 8598-1:2012: "Optics and optical instruments—Focimeters—Part 1: General purpose instruments." In DIN EN ISO 13666:2013-10, section 9.7, the vertex power is defined as follows. A distinction is made between the back vertex power, defined as the reciprocal of the paraxial back vertex focal length measured in meters, and the front vertex power, defined as the reciprocal of the paraxial front vertex focal length measured in meters. It is noted that, according to ophthalmic convention, the back vertex power is specified as the "power" of a spectacle lens but the front vertex power is also required for certain purposes, e.g., in the measurement of addition power in some multifocal and progressive power spectacle lenses.

A further variant of defining the properties of the progressive power spectacle lens by way of a comparison with the properties of a comparison progressive power spectacle lens with properties that are predeterminable one-to-one, namely the same distribution of the spherical equivalent over the lens under the same position of the spectacle lens in front of the eye of the same progressive power spectacle wearer on the basis of the same object distance model, consists of the product further comprising:

a representation, situated on a data medium, of a residual astigmatism distribution for the predetermined arrangement of the progressive power spectacle lens in front of the eye of the progressive power spectacle wearer, for whom the progressive power spectacle lens is intended, and/or a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or a representation, situated on a data medium, of a prescription and an object distance model for the predetermined arrangement of the progressive power spectacle lens in front of the eye of a progressive power spectacle wearer, for whom the progressive power spectacle lens is intended, and/or a representation, situated on a data medium, of a distribution of the spherical equivalent for the predetermined arrangement of the progressive power spectacle lens in front of the eye of the progressive power spectacle wearer, for whom the progressive power spectacle lens is intended.

In this variant of a progressive power spectacle lens according to the disclosure comprising a distance portion and a near portion, the width of the intermediate corridor is defined by the dimension transverse to a longitudinal direction of the intermediate corridor extending between the distance portion and near portion, within which the absolute value of the residual astigmatism lies below a predetermined limit value, which is selected within a range from the group specified below:

the limit value lies in the range between 0.25 dpt and 1.5 dpt, the limit value lies in the range between 0.25 dpt and 1.0 dpt, the limit value lies in the range between 0.25 dpt and 0.75 dpt, the limit value lies in the range between 0.25 dpt and 0.6 dpt, the limit value lies in the range between 0.25 dpt and 0.5 dpt, the limit value is 0.5 dpt.

Residual astigmatism is understood to be the astigmatism (according to absolute value and axis direction) by which the astigmatism or the astigmatic power of the progressive power spectacle lens deviates from the astigmatic power required for a full correction at a respective location on a progressive power spectacle lens surface for a beam intersecting the progressive power spectacle lens at this location for the progressive power spectacle wearer, for whom the progressive power spectacle lens is intended, when the progressive power spectacle wearer wears the progressive power spectacle lens as intended (such that it is arranged in front of the eye of the progressive power spectacle wearer in predetermined fashion). The term "distribution" clarifies that this residual astigmatism can be different locally over the spectacle lens and, as a rule, will actually be different.

Expressed differently, a residual astigmatism is understood to mean the deviation of the astigmatic power (actual astigmatic power) of the progressive power spectacle lens from the "prescribed" astigmatic power in respect of absolute value and axis position. Expressed differently, the residual astigmatism is the difference, depending on the direction of view, between the actual astigmatic power and the intended astigmatic power for the wearer of the progressive power spectacle lens in the use position. In the use position, the position and orientation of the spectacle lens with respect to the eye when used as intended is taken into account. The direction of view-dependence of the astigmatic power can result, in particular, from the direction of view-dependence of the object distance and the direction of view-dependence of the astigmatic power of the eye. The expression "prescribed power" should therefore be understood in the broadest sense as an intended power that the spectacle lens should have on account of its underlying position and orientation in relation to the eye, for the respective direction of view and the distance at which the spectacle wearer should see the object in focus for this direction of view.

For the specific calculation of the residual astigmatism distribution (or other aberration distributions, such as, e.g., the spherical aberration distribution or other aberration distributions of higher order described in, e.g., EP 2 115 527 B1 or actual power distributions, such as, e.g., the actual astigmatic power, the actual spherical power or the actual prismatic power), the vertex distance, the pupillary distance, the pantoscopic tilt of the spectacle lens, the face form angle of the spectacle lens and the spectacle lens size, including, in particular, the thickness and/or the edge (edge profile), too, for example, are regularly taken into account. Furthermore, this is regularly based on an object distance model which describes the position of object points in the spectacle wearer's field of view relative to the centers of rotation of the wearer's eyes.

The residual astigmatism distribution can already be present as a calculated mathematical description (like in case (i)) or it can be ascertained from the prescription and an object distance model (like in case (iii)) or from an already calculated astigmatic power distribution for a full correction (like in case (ii)).

In addition to conventional refraction values, the prescription may also comprise further physiological parameters inherent to the spectacle wearer (i.e., generally those parameters that are inherent to the spectacle wearer) and the use conditions (i.e., generally those parameters that are assignable to the surroundings of the spectacle wearer) under which the prescribed progressive power spectacle lens should be worn. The inherent physiological parameters include, inter alia, the refractive error, the accommodation capability and the (possibly monocular) pupillary distance of the spectacle wearer. The use conditions include information about the seat of the lenses in front of the eye and also data that characterize the object distance model, such as, e.g., whether these should be spectacles for working in front of a screen, which are based on a distance deviating from infinity for the distance direction of view of an object, specifically the screen. Certain standard values are assumed for the case where the individually measured or determined prescription does not contain certain use conditions (e.g., a standard pantoscopic tilt of 9°).

The object distance model is understood to mean an assumption for distances in space at which the spectacle wearer should see objects in focus. An object distance model can be characterized, e.g., by the distribution of the object distances from the front side of the spectacle lens over the different directions of view or for the points of intersection of the rays through the front surface. The object position is generally related to the center of rotation of the eyes in the object distance model, as already explained above.

The model calculation can take account of the fact that the power and axis position of the eye changes in the case of different object distances and directions of view. In particular, the model calculation can take account of Listing's law. By way of example, the model calculation can also take account of the change in the astigmatic power of the eye for near and distance, for example in the way described in DE 10 2015 205 721 A1.

Within the scope of the present disclosure, a full correction describes a correction caused by wearing the progressive power spectacles as intended which, taking account of the visual properties of their eye represented by the prescription, allows the progressive power spectacle wearer to see in focus objects arranged at the distances on which the object distance model is based.

For the sake of completeness, reference is made to the fact that the data medium on which the predetermined representation is situated may also be, for example, a sheet of paper instead of a memory of a computer. This relates, in particular, to the aforementioned case (iii), in which the prescription may also be noted on a sheet of paper.

A further exemplary embodiment of the product according to the disclosure comprises the following constituent parts:

a representation, situated on a data medium, of a predetermined arrangement of the progressive power spectacle lens in front of an eye of a progressive power spectacle wearer, for whom the progressive power spectacle lens is intended, and one or more of the following representations on a data medium:
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended.

The progressive power spectacle lens according to this embodiment has a distribution of a spherical equivalent for the predetermined arrangement of the progressive power spectacle lens in front of the eye of the progressive power spectacle wearer, for whom the progressive power spectacle lens is intended. In this embodiment, the refractive index of the progressive power spectacle lens varies in space in such a way that the maximum value of the residual astigmatism of the progressive power spectacle lens is less than the maximum value of the residual astigmatism of a comparison progressive power spectacle lens, for the same prescription, with the same distribution of the spherical equivalent in the case of the same arrangement of the comparison progressive power spectacle lens in front of the eye of the progressive power spectacle wearer and with the same object distance model, but with a spatially non-varying refractive index.

According to this embodiment of the disclosure, the optical properties of the progressive power spectacle lens perceivable by the spectacle wearer are improved over all conventional progressive power spectacle lenses.

Another variant of the product according to the disclosure comprises the constituent parts specified below:

a representation, situated on a data medium, of a predetermined arrangement of the progressive power spectacle lens in front of an eye of a progressive power spectacle wearer, for whom the progressive power spectacle lens is intended, at least one of the following representations on a data medium:
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended.

The progressive power spectacle lens according to this exemplary embodiment has a distribution of a spherical equivalent for the predetermined arrangement of the progressive power spectacle lens in front of the eye of the progressive power spectacle wearer, for whom the progressive power spectacle lens is intended. The progressive power spectacle lens comprises an intermediate corridor. The refractive index of the progressive power spectacle lens varies in space in such a way that, for a predetermined residual astigmatism value $A_{res,lim}$ from the group
(a) the residual astigmatism value $A_{res,lim}$ lies in the range between 0.25 dpt and 1.5 dpt,
(b) the residual astigmatism value $A_{res,lim}$ lies in the range between 0.25 dpt and 1.0 dpt,
(c) the residual astigmatism value $A_{res,lim}$ lies in the range between 0.25 dpt and 0.75 dpt,
(d) the residual astigmatism value $A_{res,lim}$ lies in the range between 0.25 dpt and 0.6 dpt,
(e) the residual astigmatism value $A_{res,lim}$ lies in the range between 0.25 dpt and 0.5 dpt,
(f) the residual astigmatism value $A_{res,lim}$ is 0.5 dpt on a horizontal section at the narrowest point of the intermediate corridor (e.g., where the isoastigmatism lines for 1 dpt have the smallest distance from one another) or on a horizontal section through the point on the principal line of sight at which the half addition is achieved, the following relationship applies within a region with a horizontal distance of 10 mm on both sides of the principal line of sight:

$$B > c \times \frac{A_{res,lim}}{\mathrm{grad}\ W}$$

where grad W describes the power gradient of the spherical equivalent in the direction of the principal line of sight of the progressive power spectacle lens at the point on the principal line of sight at the narrowest point of the intermediate corridor or in the point on the principal line of sight at which the half addition is achieved, B describes the width of the region in the progressive power spectacle lens in which the residual astigmatism is $A_{res} \leq A_{res,lim}$, where c is a constant selected from the group:
  (g) $1.0 < c$
  (h) $1.1 < c$
  (i) $1.2 < c$
  (j) $1.3 < c$ According to this exemplary embodiment of the disclosure, the optical properties of the progressive power spectacle lens perceivable by the spectacle wearer are improved over all conventional progressive power spectacle lenses.

A further variant of a product according to the disclosure comprises (i) a progressive power spectacle lens or (ii) a representation of the progressive power spectacle lens, the representation being situated on a data medium, or (iii) a data medium with a virtual representation of the progressive power spectacle lens, wherein the progressive power spectacle lens has a front surface and a back surface, and a spatially varying refractive index. Either the front surface or the back surface or both surfaces are embodied as progressive surfaces. The front surface embodied as progressive surface is embodied according to the disclosure as a freeform surface and/or the back surface embodied as a progressive surface is embodied according to the disclosure as a freeform surface.

The progressive power spectacle lens consists of a substrate comprising no individual layers, and a front surface coating, comprising one or more individual layers, on the front surface of the substrate and/or a back surface coating, comprising one or more individual layers, on the back surface of the substrate. Only the substrate has the spatially varying refractive index.

According to the disclosure, a difference between the spherical equivalent measured at each point on the front surface of the progressive power spectacle lens with the front surface coating and/or the back surface coating and the spherical equivalent measured at each corresponding point on the front surface of a comparison progressive power spectacle lens without front surface coating and without back surface coating but with an identical substrate (with identical geometry and identical refractive index) is less than a value from the group specified below:
  (a) the difference value is less than 0.001 dpt
  (b) the difference value is less than 0.002 dpt
  (c) the difference value is less than 0.003 dpt
  (d) the difference value is less than 0.004 dpt.

Naturally, this variant may also have one or more of the features described above.

In an exemplary embodiment of the product described directly above, at least one of the freeform surfaces has no point symmetry and no axial symmetry or at least one of the freeform surfaces has no point symmetry and no axial symmetry and no rotational symmetry and no symmetry with respect to a plane of symmetry.

In a second exemplary embodiment, optionally combined with the first, the refractive index is variable such that:
  (a) the refractive index varies only in a first spatial dimension and in a second spatial dimension and is constant in a third spatial dimension, wherein a distribution of the refractive index in the first spatial dimension and the second spatial dimension has neither point symmetry nor axial symmetry, or
  (b) the refractive index varies in a first spatial dimension and in a second spatial dimension and in a third spatial dimension, wherein a distribution of the refractive index in the first spatial dimension and the second spatial dimension in all planes perpendicular to the third spatial dimension has neither point symmetry nor axial symmetry, or
  (c) the refractive index varies in a first spatial dimension and in a second spatial dimension and in a third spatial dimension, wherein a distribution of the refractive index has no point symmetry and no axial symmetry at all.

The third spatial dimension in case (a) or in case (b) typically extends in a direction which
  differs by not more than 5° from the zero viewing direction during use as intended, or
  differs by not more than 10° from the zero viewing direction during use as intended, or
  differs by not more than 20° from the zero viewing direction during use as intended, or
  differs by not more than 5° from the principal viewing direction during use as intended, or
  differs by not more than 10° from the principal viewing direction during use as intended, or
  differs by not more than 20° from the principal viewing direction during use as intended, or
  differs by not more than 5° from the direction of the normal vector of the front surface in the geometric center of the progressive power spectacle lens, or
  differs by not more than 10° from the direction of the normal vector of the front surface in the geometric center of the progressive power spectacle lens, or
  differs by not more than 20° from the direction of the normal vector of the front surface in the geometric center of the progressive power spectacle lens, or
  differs by not more than 5° from the direction of the normal vector at the prismatic measurement point, or
  differs by not more than 10° from the direction of the normal vector at the prismatic measurement point, or
  differs by not more than 20° from the direction of the normal vector at the prismatic measurement point, or
  differs by not more than 5° from the direction of the normal vector at the centration point, or
  differs by not more than 10° from the direction of the normal vector at the centration point, or
  differs by not more than 20° from the direction of the normal vector at the centration point.

In a further configuration, the progressive power spectacle lens comprises an intermediate corridor. In the progressive power spectacle lens it may be the case that
  (i) the front surface embodied as freeform surface is fashioned such that the mean curvature has a maximum in the intermediate corridor, and/or
  (ii) the back surface embodied as freeform surface is fashioned such that the mean curvature has a minimum in the intermediate corridor, or
  (iii) the back surface has a spherical, rotationally symmetrically aspheric or toric surface geometry and the front surface embodied as a freeform surface is fashioned such that the maximum of the absolute value of the mean curvature of the front surface is in the intermediate corridor, or
  (iv) the front surface has a spherical, rotationally symmetrically aspheric or toric surface geometry and the back surface embodied as a freeform surface is fashioned such that the minimum of the absolute value of the mean curvature of the back surface is in the intermediate corridor, or
  (v) the back surface is not embodied as a freeform surface and the front surface embodied as a freeform surface is fashioned such that the maximum of the absolute value of the mean curvature of the front surface is in the intermediate corridor, or
(vi) the front surface is not embodied as a freeform surface and the back surface embodied as a freeform surface is fashioned such that the minimum of the absolute value of the mean curvature of the back surface is in the intermediate corridor.

The product described above can additionally include: (i) a representation, situated on a data medium, of a predetermined arrangement of the progressive power spectacle lens in front of an eye of a progressive power spectacle wearer, for whom the progressive power spectacle lens is intended, (ii) a data medium with data concerning a predetermined arrangement of the progressive power spectacle lens in front of an eye of a progressive power spectacle wearer, wherein
 the progressive power spectacle lens has a distribution of a spherical equivalent for the predetermined arrangement of the progressive power spectacle lens in front of the eye of the progressive power spectacle wearer, for whom the progressive power spectacle lens is intended, and
 wherein the progressive power spectacle lens has an intermediate corridor with a width and in that the refractive index of the progressive power spectacle lens varies in space in such a way that the width of the intermediate corridor of the progressive power spectacle lens, at least in a section or over the entire length of the intermediate corridor, is greater than the width of the intermediate corridor of a comparison progressive power spectacle lens with the same distribution of the spherical equivalent in the case of the same arrangement of the comparison progressive power spectacle lens in front of the eye of the progressive power spectacle wearer, but with a spatially non-varying refractive index.

The last-described configuration of the product, in a further configuration, can further include a section selected from the group:
horizontal section,
section at half addition,
horizontal section at half addition,
horizontal section at half addition and horizontal section at 25% of the addition,
horizontal section at half addition and horizontal section at 75% of the addition, or
horizontal section at half addition and horizontal section at 25% of the addition and horizontal section at 75% of the addition.

Alternatively or additionally, the product can further comprise:
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended, and/or
(v) a data medium with data concerning a residual astigmatism distribution for the predetermined arrangement of the progressive power spectacle lens in front of the eye of the progressive power spectacle wearer, for whom the progressive power spectacle lens is intended, and/or
(vi) a data medium with data concerning an astigmatic power distribution, required for a full correction, for the predetermined arrangement of the progressive power spectacle lens in front of the eye of the progressive power spectacle wearer, for whom the progressive power spectacle lens is intended, and/or
(vii) a data medium with data concerning a prescription and an object distance model for the predetermined arrangement of a progressive power spectacle lens in front of the eye of a progressive power spectacle wearer, for whom the progressive power spectacle lens is intended, and/or
(viii) a data medium with data concerning a distribution of the spherical equivalent for the predetermined arrangement of the progressive power spectacle lens in front of the eye of the progressive power spectacle wearer, for whom the progressive power spectacle lens is intended, wherein
the progressive power spectacle lens has a distance portion and a near portion, and
the width of the intermediate corridor corresponds to the dimension transverse to a longitudinal direction of the intermediate corridor extending between the distance portion and near portion, within which the absolute value of the residual astigmatism lies below a predetermined limit value, which is selected within a range from the group specified below:
the limit value lies in the range between 0.25 dpt and 1.5 dpt,
the limit value lies in the range between 0.25 dpt and 1.0 dpt,
the limit value lies in the range between 0.25 dpt and 0.75 dpt,
the limit value lies in the range between 0.25 dpt and 0.6 dpt,
the limit value lies in the range between 0.25 dpt and 0.5 dpt,
the limit value is 0.5 dpt.

The above-described further variant of the product and optionally its developments described above can be provided such that
the product furthermore comprises (i) a representation, situated on a data medium, of a predetermined arrangement of the progressive power spectacle lens in front of an eye of a progressive power spectacle wearer, for whom the progressive power spectacle lens is intended, or (ii) a data medium with data concerning a predetermined arrangement of the progressive power spectacle lens in front of an eye of a progressive power spectacle wearer, wherein the progressive power spectacle lens has a distribution of a spherical equivalent for the predetermined arrangement of the progressive power spectacle lens in front of the eye of the progressive power spectacle wearer, for whom the progressive power spectacle lens is intended, wherein
the product further includes:
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended, and/or
(v) a data medium with data concerning a residual astigmatism distribution for the predetermined arrangement of the progressive power spectacle lens in front of the eye of the progressive power spectacle wearer, for whom the progressive power spectacle lens is intended, and/or
(vi) a data medium with data concerning an astigmatic power distribution, required for a full correction, for the predetermined arrangement of the progressive power spectacle lens in front of the eye of the progressive power spectacle wearer, for whom the progressive power spectacle lens is intended, and/or
(vii) a data medium with data concerning a prescription and an object distance model for the predetermined arrangement of the progressive power spectacle lens in front of the eye of a progressive power spectacle wearer, for whom the progressive power spectacle lens is intended, and/or
(viii) a data medium with data concerning a distribution of the spherical equivalent for the predetermined arrangement of the progressive power spectacle lens in front of the eye of the progressive power spectacle wearer, for whom the progressive power spectacle lens is intended, and wherein
the refractive index of the progressive power spectacle lens varies in space in such a way that the maximum value of the residual astigmatism of the progressive power spectacle lens is less than the maximum value of the residual astigmatism of a comparison progressive power spectacle lens with the same distribution of the spherical equivalent in the case of the same arrangement of the comparison progressive power spectacle lens in front of the eye of the progressive power spectacle wearer, but with a spatially non-varying refractive index.

The above-described further variant of the product and optionally its developments described above can also be provided such that
the product furthermore comprises (i) a representation, situated on a data medium, of a predetermined arrangement of the progressive power spectacle lens in front of an eye of a progressive power spectacle wearer, for whom the progressive power spectacle lens is intended, or (ii) a data medium with data concerning a predetermined arrangement of the progressive power spectacle lens in front of an eye of a progressive power spectacle wearer, wherein
the progressive power spectacle lens has a distribution of a spherical equivalent (W) for the predetermined arrangement of the progressive power spectacle lens in front of the eye of the progressive power spectacle wearer, for whom the progressive power spectacle lens is intended, wherein
the product further comprises
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended, and/or
(v) a data medium with data concerning a residual astigmatism distribution for the predetermined arrangement of the progressive power spectacle lens in front of the eye of the progressive power spectacle wearer, for whom the progressive power spectacle lens is intended, and/or
(vi) a data medium with data concerning an astigmatic power distribution, required for a full correction, for the predetermined arrangement of the progressive power spectacle lens in front of the eye of the progressive power spectacle wearer, for whom the progressive power spectacle lens is intended, and/or
(vii) a data medium with data concerning a prescription and an object distance model for the predetermined arrangement of the progressive power spectacle lens in front of the eye of a progressive power spectacle wearer, for whom the progressive power spectacle lens is intended, and/or
(viii) a data medium with data concerning a distribution of the spherical equivalent for the predetermined arrangement of the progressive power spectacle lens in front of the eye of the progressive power spectacle wearer, for whom the progressive power spectacle lens is intended, and wherein
the progressive power spectacle lens comprises an intermediate corridor and a principal line of sight, and in that the refractive index of the progressive power spectacle lens varies in space in such a way that for a predetermined residual astigmatism value $A_{Rest,Grenz}$ of the group:
the residual astigmatism value $A_{res,lim}$ lies in the range between 0.25 dpt and 1.5 dpt,
the residual astigmatism value $A_{res,lim}$ lies in the range between 0.25 dpt and 1.0 dpt,
the residual astigmatism value $A_{res,lim}$ lies in the range between 0.25 dpt and 0.75 dpt,
the residual astigmatism value $A_{res,lim}$ lies in the range between 0.25 dpt and 0.6 dpt, the residual astigmatism value $A_{res,lim}$ lies in the range between 0.25 dpt and 0.5 dpt, the residual astigmatism value $A_{res,lim}$ is 0.5 dpt on a horizontal section at the narrowest point of the intermediate corridor or for a horizontal section through the point on the principal line of sight at which the half addition is achieved, the following relationship applies within a region with a horizontal distance of 10 mm on both sides of the principal line of sight:

$$B > c \times \frac{A_{res,lim}}{\text{grad } W}$$

where grad W describes the power gradient of the spherical equivalent of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{res} \leq A_{res,lim}$, where c is a constant selected from the group:

(b) 1.0<c
(c) 1.1<c
(d) 1.2<c
(e) 1.3<c.

There are statements above to the effect of the inventors having recognized that the interplay of the degree of complexity of the geometry of the progressive surface and the degree of the complexity of the refractive index distribution is decisive. Thus, deviating from the solution described in WO 89/04986 A1, they propose a computer-implemented method, in the form of a ray tracing method, for designing a progressive power spectacle lens having a front surface and a back surface and a spatially varying refractive index, in which either the front surface or the back surface or both surfaces are embodied as progressive surfaces. Optical properties of the progressive power spectacle lens are calculated by means of the ray tracing method at a plurality of evaluation points, at which visual rays pass through the progressive power spectacle lens. In this ray tracing method, at least one intended optical property for the progressive power spectacle lens is set at the respective evaluation point. Initially, a design for the progressive power spectacle lens is set, wherein this design comprises a representation of a local surface geometry of the progressive surface and a local refractive index of the progressive power spectacle lens in the respective visual beam path through the evaluation points. The design of the progressive power spectacle lens is modified in view of an approximation of the at least one intended optical property of the progressive power spectacle lens. According to the disclosure, the modifying comprises not only modifying the representation of the local surface geometry of the progressive surface but also modifying the local refractive index of the progressive power spectacle lens in the respective visual beam path through the evaluation points, wherein the at least one intended optical property comprises an intended residual astigmatism of the progressive power spectacle lens.

As a rule, the surface lying opposite the modified progressive surface is fixedly prescribed. In general, the former comprises a simple surface geometry, such as, a spherical, rotationally symmetric aspherical, or toric geometry. In the case of a toric surface, the surface geometry and axis position are frequently chosen in such a way that (apart from an unwanted residual astigmatism) they compensate the astigmatic refraction deficit of the eye of the progressive power spectacle wearer. The surface lying opposite the modified progressive surface can also be a progressive surface, optionally a freeform surface, too, with a fixedly prescribed surface geometry. The former surface can contribute to the increase in power required for providing the addition. The modified progressive surface, too, can contribute to the increase in power required for providing the addition. It is also possible for both surfaces, specifically the front surface and back surface, to be modified together with the refractive index distribution for the purposes of approximating the intended residual astigmatism distribution.

Ray tracing methods for use when designing progressive power spectacle lenses are known. In particular, reference is made to Werner Koppen: Konzeption and Entwicklung von Progressivglasern, in Deutsche Optiker Zeitung DOZ 10/95, pages 42-46 as well as EP 2 115 527 B1 and the documents specified therein. taken into account. The calculation of optimized spatially dependent refractive index distributions by means of optical computing programs, for example the computing program ZEMAX by Zemax, LLC, is likewise known. By way of example, reference is made to their Internet presence at www.zemax.com.

Setting intended properties for a spectacle lens relates to the so-called design of a spectacle lens. A design of a spectacle lens usually comprises the distribution of the intended values for one or more imaging aberrations, which preferably are included in the optimization of the spectacle lens as target values or when determining the target values. In particular, a spectacle lens design is characterized by the distribution of the refractive error (i.e., the difference between the spherical equivalent of the progressive power spectacle lens in the beam path in the use position and the spherical equivalent ascertained by determining refraction) and/or the distribution of the residual astigmatism (i.e., the difference between the astigmatism of the spectacle lens and the astigmatism which is ascertained by determining the refraction). Instead of the term residual astigmatism distribution, the literature also uses the terms astigmatic aberration distribution and astigmatic deviation. Further, a spectacle lens design may likewise comprise the distribution of the intended values for magnification, distortion or other imaging aberrations, more particularly higher order imaging aberrations, as described in EP 2 115 527 B1. Here, these may relate to surface values or, preferably, use values, i.e., values in the use position of the spectacle lens.

According to the disclosure, the design of the progressive power spectacle lens is modified with the target of coming as close as possible to the predetermined intended residual astigmatism. By way of example, the intended residual astigmatism can be set to be zero at all evaluation points. It is also possible to predetermine a residual astigmatism distribution that preferably has far smaller values than those that are theoretically achievable at all by means of a conventional progressive power spectacle lens with a spatially non-varying refractive index but freeformed back surface (and/or front surface) or that are predetermined for the optimization of such a progressive power spectacle lens. The number of evaluation points, according to Werner Koppen: Konzeption and Entwicklung von Progressivglasern, in Deutsche Optiker Zeitung DOZ 10/95, pages 42-46, typically lies in the range between 1000 and 1500. EP 2 115 527 B1 proposes that the evaluation points number more than 8000.

In order to come as close as possible to this target, it is, according to the disclosure, not only the surface geometry of the (subsequent) progressive surface that is locally modified at the evaluation point, but also the local refractive index in the medium of the progressive power spectacle lens, passed by the beam path, at the evaluation point. The term medium is understood to mean the material or materials that make up the progressive power spectacle lens.

According to the disclosure, the progressive surface is modified freely in two spatial dimensions and the local refractive index is also modified freely in at least two spatial dimensions.

In order to come as close to the target as possible, this procedure of modifying must, as a rule, be carried out multiple times, i.e., iteratively. Here, it should once again be clarified that both the local surface geometry and the local refractive index can vary freely and neither the local surface geometry nor the local refractive index is fixed during the modification, in particular during the iteration. By contrast, WO 89/04986 A1 teaches the prescription of comparatively simple geometries for the front and back surface and the search for a suitable refractive index distribution in order to establish the power increase necessary for providing the addition and, optionally, in order to wholly or partly rectify the (residual) astigmatism along the principal line of sight and further undertake corrections of imaging aberrations to the side of the principal meridian where necessary.

Even though, as a rule, the refractive index is wavelength-dependent, dispersion is generally not taken into account and the calculation is implemented for a so-called design wavelength. However, an optimization process taking account of different design wavelengths, as described in EP 2 383 603 B1, for example, is not precluded.

Since the modification is carried out with the target of coming as close as possible to intended optical properties, a person skilled in the art also talks about an optimization. The modification is carried out until a termination criterion is satisfied. In the ideal case, the termination criterion consists of the designed progressive power spectacle lens having the predetermined intended optical properties. In the case where the residual astigmatism is set to be zero at all evaluation points, this ideal case would be that the residual astigmatism of the calculated spectacle lens is in fact zero at all evaluation points. However, since this will regularly not be the case, particularly in the described case, there is a termination of the calculation, e.g., after reaching one or more limit values in the surroundings of the intended property (properties) or after reaching a predetermined number of iterations.

Usually, the ascertainment of the intended properties and the calculation of the actual properties is based on model calculations that take account of the use conditions, specifically, the seat of the spectacle lenses in front of the eye and an object distance model, for example, and physiological parameters of the spectacle wearer, specifically, the refractive error, the accommodation capability, and the pupillary distance, for example. Details have already been described above.

As a rule, the result of the approximation of the at least one intended optical property (properties) of the progressive power spectacle lens by modifying the local refractive index and the local surface geometry is that the front surface embodied as a progressive surface is embodied as a freeform surface and/or that the back surface embodied as a progressive surface is embodied as a freeform surface.

The object stated at the outset is achieved in its entirety by the method according to the disclosure described above.

In one advantageous configuration of the method according to the disclosure, the progressive surface is modified in such a way that a freeform surface arises which has neither a point symmetry nor an axial symmetry. Modifying the local refractive index is furthermore effected in such a way that (a) the refractive index varies only in a first spatial dimension and in a second spatial dimension and is constant in a third spatial dimension, such that a distribution of the refractive index in the first spatial dimension and the second spatial dimension has neither point symmetry nor axial symmetry, or (b) the refractive index varies in a first spatial dimension and in a second spatial dimension and in a third spatial dimension, such that a distribution of the refractive index in the first spatial dimension and the second spatial dimension in all planes perpendicular to the third spatial dimension has neither point symmetry nor axial symmetry, or (c) the refractive index varies in a first spatial dimension and in a second spatial dimension and in a third spatial dimension, such that a distribution of the refractive index in the progressive power spectacle lens has no point symmetry and no axial symmetry at all.

The aim of the disclosure is to reduce the residual astigmatic aberrations and optionally also the residual spherical aberrations, alongside the principal line of sight (i.e. in the central region of the intermediate portion). Proceeding from (i) a design of a conventional progressive power spectacle lens with a spatially constant refractive index or (ii) a target design for a conventional progressive power spectacle lens with a spatially constant refractive index (that is to say the target design that was used for the optimization of the progressive power spectacle lens with a constant refractive index), a new target design for a progressive power spectacle lens with a spatially varying refractive index can be produced which contains the previous distribution of the residual spherical and astigmatic aberrations, but the latter are reduced especially in the central intermediate portion. In this case, the residual astigmatic aberrations are preferably reduced in a region around the principal line of sight (e.g., the region at a distance of 5, 10 to 20 mm from the principal line of sight), e.g., by their being multiplied by a factor of 0.5 to 0.8, in order to attain an improved target design.

One exemplary embodiment of this method according to the disclosure is characterized in that the modification of the design of the progressive power spectacle lens is implemented in view of a minimization of a target function. Such a target function is also referred to as "Kostenfunktion" ["cost function"] in the German literature and as merit function in the English literature. When designing progressive power spectacle lenses, the method of least squares is very frequently applied as a method for minimizing a target function, as practiced, for example, in EP 0 857 993 B2, EP 2 115 527 B1 or else Werner Koppen: Konzeption and Entwicklung von Progressivglasern, in Deutsche Optiker Zeitung DOZ 10/95, pages 42-46. The exemplary embodiment according to the disclosure applies this method with the target function reproduced below:

$$F=\Sigma_m P_m \Sigma_n W_n (T_n - A_n)^2.$$

In this target function F, $P_m$ is the weighting at the evaluation point m, $W_n$ is the weighting of the optical property n, $T_n$ is the intended value of the optical property n at the respective evaluation point m and $A_n$ is the actual value of the optical property n at the evaluation point m.

The application of this method has proven to be worthwhile for designing conventional type progressive power spectacle lenses. The disclosure proposes to also use this method for designing gradient index (GRIN) progressive power spectacle lenses according to the disclosure.

The target design can e.g., also be fixed by the stipulation of residual optical, in particular spherical and astigmatic, aberrations at many points distributed over the front surface of the entire lens.

In this case, there may be specifications for the distances of the objects for which the powers and/or residual spherical and astigmatic aberrations for the spectacle wearer when looking through the spectacle lens are determined.

Furthermore, there may be stipulations for the surface curvatures at further points on the progressive surface, thickness requirements (in particular in the geometric center and at the edge of the progressive power spectacle lens) and prismatic requirements at further points.

An individual weighting can be assigned to each of these optical and geometric stipulations at each of the aforementioned points. If the residual aberrations, surface curvatures, prismatic powers and thicknesses for the stipulation at the point are determined for a starting lens (e.g., the progressive power spectacle lens optimized for the constant refractive index), it is thus possible to determine a total aberration F according to what has been indicated above. This function value F dependent on the optical and geometric lens properties can be minimized by means of known mathematical methods by simultaneously changing the surface geometry and the refractive index distribution. A progressive power spectacle lens having improved properties in regard to the requirements specified above is obtained in this way.

Alternatively, for the optimization of the progressive power spectacle lens with a material with the variable refractive index, it is also possible to use the original target design, that is to say the target design that was used for the optimization of the lens with a constant refractive index.

In this case, the weightings used in the optimization with the original design can be used or else altered. In particular, the weighting for the residual astigmatic and spherical aberrations in the intermediate corridor can be increased in order to obtain improved properties of the progressive power spectacle lens in the progression region.

However, increasing the weighting in the intermediate corridor is expedient here only if the astigmatic and spherical aberrations of the optimized lens with a material with a constant refractive index do not already correspond to the stipulations of the (new) target design.

If the original design had already been accepted by the spectacle wearer, this procedure yields at any rate a more compatible design for the spectacle wearer since the residual optical aberrations are reduced with the new design.

What is achieved overall is a new improved target design which is not achievable with a material with a constant refractive index, but with this target design and by means of simultaneous optimization of the form of the freeform surfaces and the distribution of the refractive index for a material with a non-constant refractive index, it is possible to achieve an improved progressive power spectacle lens design having, in particular, a wider intermediate corridor, lower maximum residual astigmatic aberrations in the intermediate region and thus also less distortion in the intermediate region.

This new progressive power spectacle lens design can be realized here taking account of the original conditions of use, thickness stipulations, etc.

One particularly advantageous exemplary embodiment of the method according to the disclosure is characterized in that an intended residual astigmatism is predetermined for at least one evaluation point, the intended residual astigmatism being less than the smallest theoretically achievable residual astigmatism at the at least one corresponding evaluation point on a comparison progressive power spectacle lens, for the same prescription and the same object distance model, but with the same distribution of the spherical equivalent and the same arrangement of the comparison progressive power spectacle lens in front of the eye of the progressive power spectacle wearer, but with a spatially non-variable refractive index, and in that modifying the representation of the local surface geometry of the progressive surface and of the local refractive index of the progressive power spectacle lens in the respective visual beam path through the evaluation points is only terminated if the residual astigmatism at the at least one evaluation point, achieved for the planned progressive power spectacle lens, is less than the theoretically achievable residual astigmatism at the at least one corresponding evaluation point on the comparison progressive power spectacle lens.

It is possible—as already explained above—to set the intended residual astigmatism to be zero at all evaluation points. In order to plan a progressive power spectacle lens that, over the entire surface, has better optical properties than a conventional comparison progressive power spectacle lens, the intended residual astigmatism at all evaluation points will be chosen to be lower, at least by a significant percentage of, e.g., 10-50%, than what is usually set when planning the comparison progressive power spectacle lens. In general, at least at the evaluation points, an intended residual astigmatism will be predetermined that is less than the theoretically achievable residual astigmatism at the at least corresponding evaluation points in the comparison progressive power spectacle lens that should lie within the subsequent intermediate corridor. This is because a broadening of the intermediate corridor is always desirable.

As an alternative or in addition to the advantageous exemplary embodiment described above, one method variant consists in carrying out a modification of the representation of the local surface geometry of the progressive power surface and of the local refractive index of the progressive power spectacle lens in the respective visual beam path through the evaluation points with the stipulation that the maximum value of the residual astigmatism of the progressive power spectacle lens is less than the maximum value of the residual astigmatism of a comparison progressive power spectacle lens, for the same prescription, with the same distribution of the spherical equivalent and the same arrangement of the comparison progressive power spectacle lens in front of the eye of the progressive power spectacle wearer, but with a spatially non-variable refractive index. In principle, the maximum value for the residual astigmatism in the progressive power spectacle lens planned according to the disclosure need not be placed at the "same" location or the "same" evaluation point as the maximum value for the residual astigmatism in the comparison progressive power spectacle lens. However, this may also be considered as a constraint when carrying out the method. As a result of these prescriptions, the optical properties of the progressive power spectacle lens according to the disclosure are further improved in relation to a comparison progressive power spectacle lens that was manufactured in a conventional way.

In one exemplary embodiment, the method according to the disclosure can be carried out in such a way that, when planning the progressive power spectacle lens, a progressive power spectacle lens corresponding to a product of the above-described types arises. The advantages of these products were already described in detail above.

In a further method variant according to the disclosure, provision is even made for the progressive power spectacle lens to be planned precisely with the stipulation of producing a progressive power spectacle lens according to a product according to any one of the types described above. The intended properties and the termination conditions in this further variant are chosen in such a way that the corresponding progressive power spectacle lens with the above-described optical properties necessarily arises in the arrangement in front of the eye of the future spectacle wearer, as predetermined by the representation, when carrying out planning.

Further, the disclosure provides a computer program with program code for carrying out all of the process steps according to any one of the above-described methods when the computer program is loaded onto a computer and/or run on a computer. The computer program can be saved on any computer-readable medium, in particular on a hard disk drive of a computer, on a USB stick or else in the cloud.

Accordingly, the disclosure also seeks protection for a computer-readable medium with a computer program of the type described above.

The disclosure also relates to a method for producing, by way of an additive method, a progressive power spectacle lens according to any one of the products described above or a progressive power spectacle lens planned using a method of the above-described variants.

Additive methods are methods in which the progressive power spectacle lens is constructed sequentially. Particularly in this context, it is known that so-called digital fabricators, in particular, offer manufacturing options for virtually any structure, the structures not being realizable or only being realizable with difficulty using conventional abrasive methods. Within the digital fabricator machine class, 3D printers represent the most important subclass of additive, i.e., accumulating, building fabricators. The most important techniques of 3D printing are selective laser melting (SLM) and electron-beam melting for metals and selective laser sintering (SLS) for polymers, ceramics and metals, stereolithography (SLA) and digital light processing for liquid artificial resins and multij et or polyj et modeling (e.g., inkjet printers) and fused deposition modeling (FDM) for plastics and, in part, artificial resins. Further, construction with the aid of nanolayers is also known, as described, for example, at peaknano. com/wp-content/uploads/PEAK-1510-GR-INOptics-Overview.pdf, retrieved on Jan. 12, 2017.

Source materials for manufacturing by means of 3D printing and options for the 3D manufacturing method itself can be gathered from, for example, the European patent application EP3312661.

A development of the disclosure consists in a method for producing a progressive power spectacle lens comprising a method for planning a progressive power spectacle lens as described above and manufacturing the progressive power spectacle lens according to the plan.

Manufacturing the progressive power spectacle lens according to the plan can, according to the disclosure, once again be implemented by an additive method.

Another development of the disclosure consists in a computer comprising a processor configured to carry out a method for planning a progressive power spectacle lens according to any one of the above-described types or variants.

BRIEF DESCRIPTION OF THE DRAWINGS

The disclosure will now be described with reference to the drawings wherein:

FIG. 6A shows the sagittal heights of the front surface of the comparison progressive power spectacle lens;

FIG. 6B shows the sagittal heights of the front surface of the GRIN progressive power spectacle lens according to the disclosure according to the first exemplary embodiment;

FIG. 12A shows sagittal heights of the front surface of the comparison progressive power spectacle lens;

FIG. 12B shows sagittal heights of the front surface of the progressive power spectacle lens according to the second exemplary embodiment;

FIGS. 18A-1 and 18A-2 show the sagittal heights of the front surface of a comparison progressive power spectacle lens;

FIGS. 18B-1 and 18B-2 show the sagittal heights of the front surface of the progressive power spectacle lens according to the third exemplary embodiment;

FIGS. 24A-1 and 24A-2 show the sagittal heights of the back surface of a comparison progressive power spectacle lens;

FIGS. 24B-1 and 24B-2 show the sagittal heights of the back surface of the progressive power spectacle lens according to the fourth exemplary embodiment;

FIGS. 28-1 and 28-2 show the sagittal heights of the back surface of the progressive power spectacle lens according to the fifth exemplary embodiment.

DESCRIPTION OF EXEMPLARY EMBODIMENTS

Figure 1A:
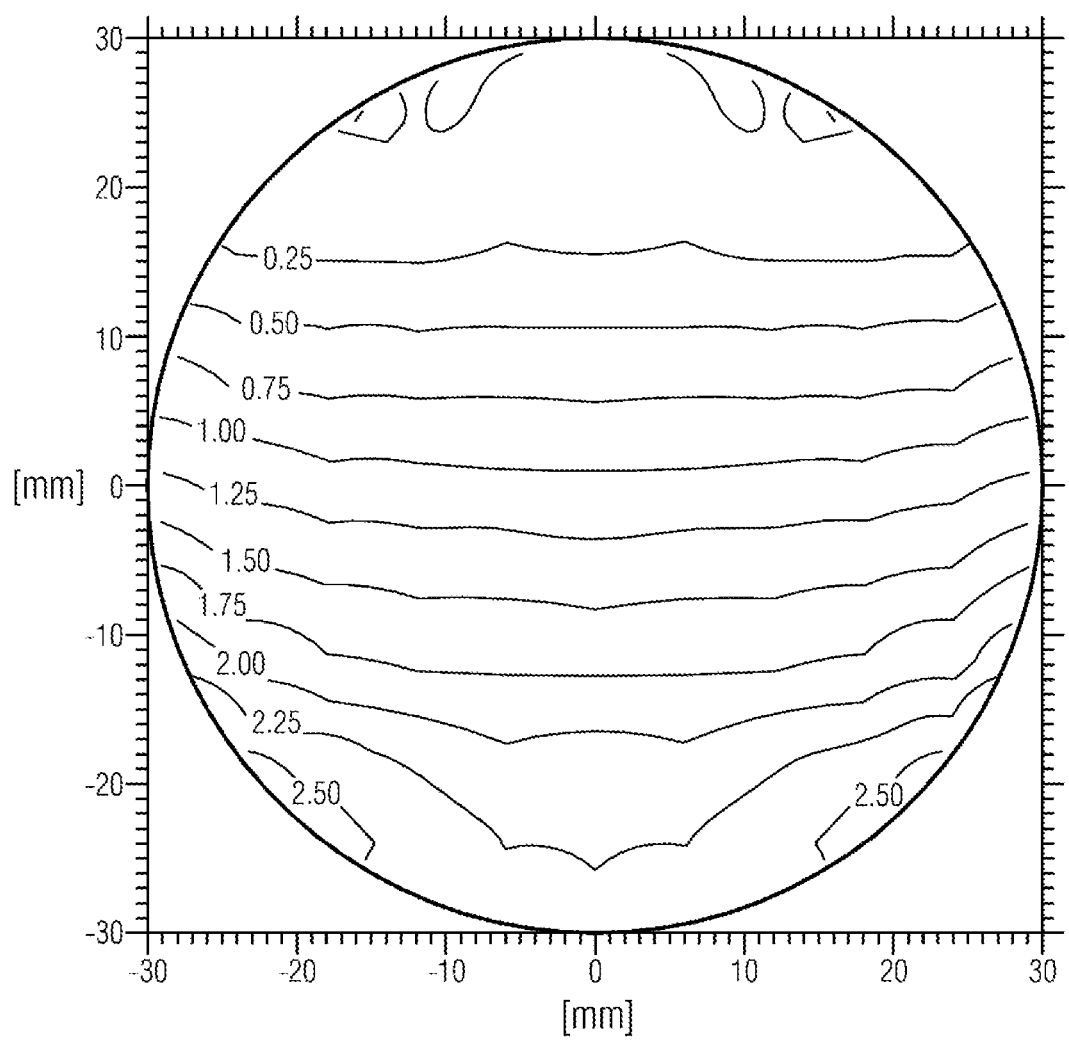
FIG. 1A shows the mean spherical power of a comparison progressive power spectacle lens.
Figure 1B:
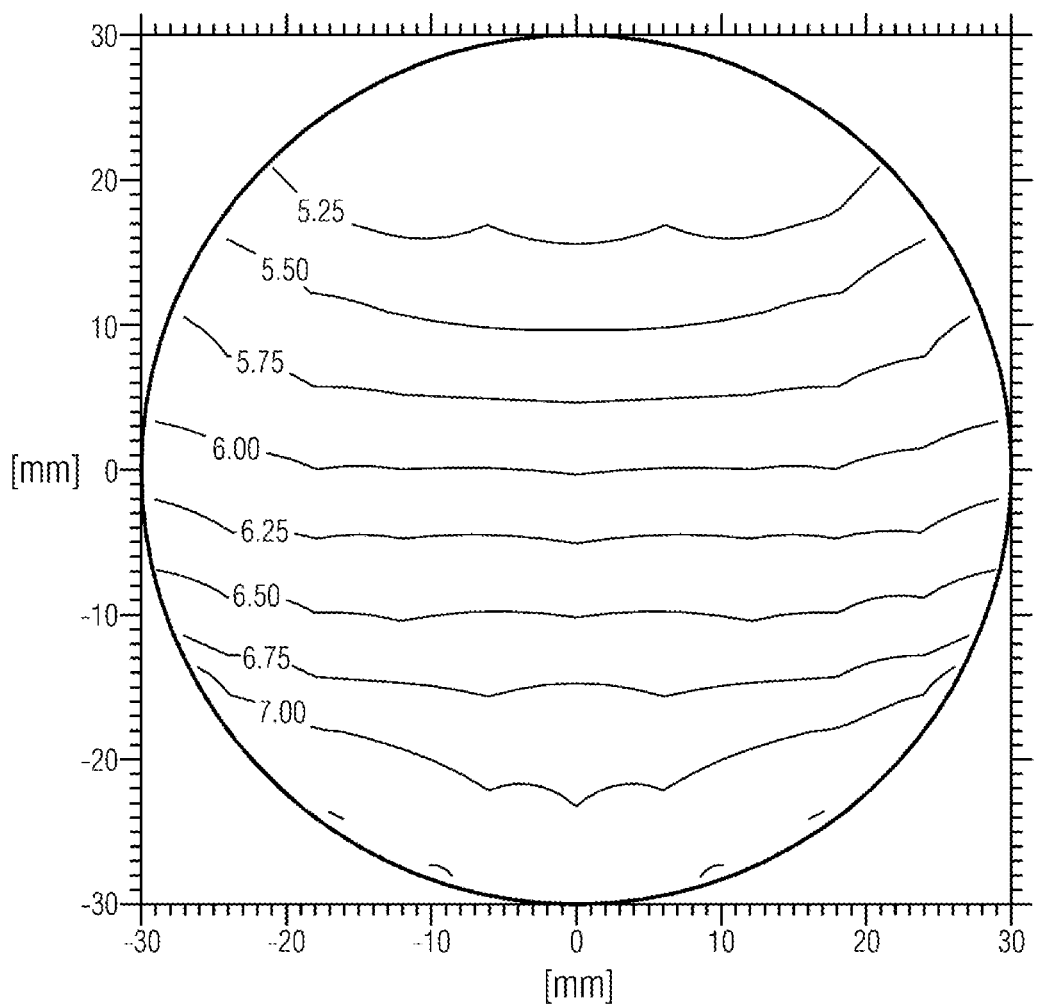
FIG. 1B shows the mean surface optical power of the comparison progressive power spectacle lens of FIG. 1A.
Figure 1C:
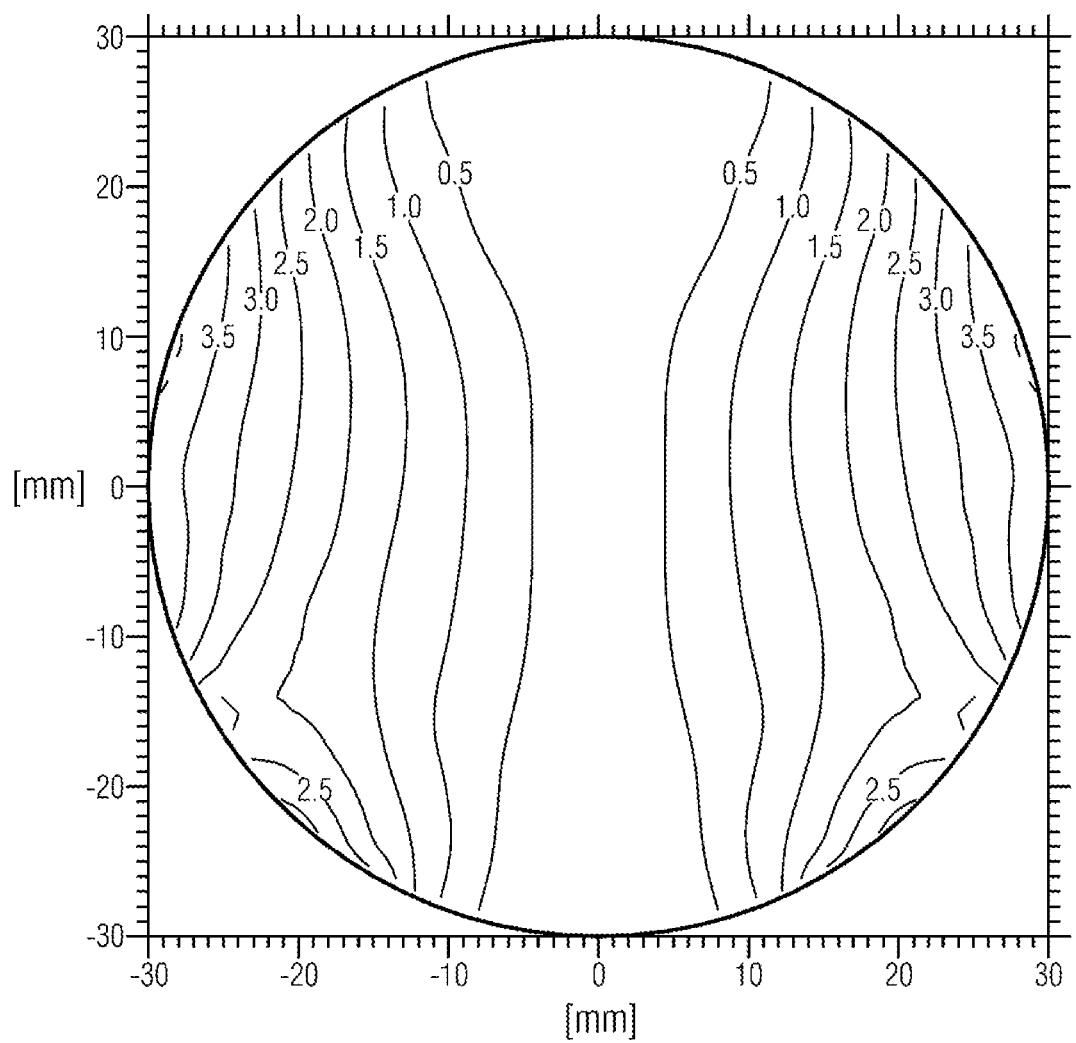
FIG. 1C shows the surface astigmatism of the object-side surface of the comparison progressive power spectacle lens of FIG. 1A.

FIGS. 1A to 1C show optical properties of a comparison progressive power spectacle lens of conventional construction made of a material with a refractive index of n=1.600 in relation to a GRIN progressive power spectacle lens with a vertical plane of symmetry according to a first exemplary embodiment of the disclosure, wherein FIG. 1A shows the mean spherical power of the comparison progressive power spectacle lens, FIG. 1B shows the mean surface optical power of the comparison progressive power spectacle lens, object-side freeform surface, and FIG. 1C shows the surface astigmatism of the object-side freeform surface of the comparison progressive power spectacle lens of FIG. 1A.

Figure 2A:
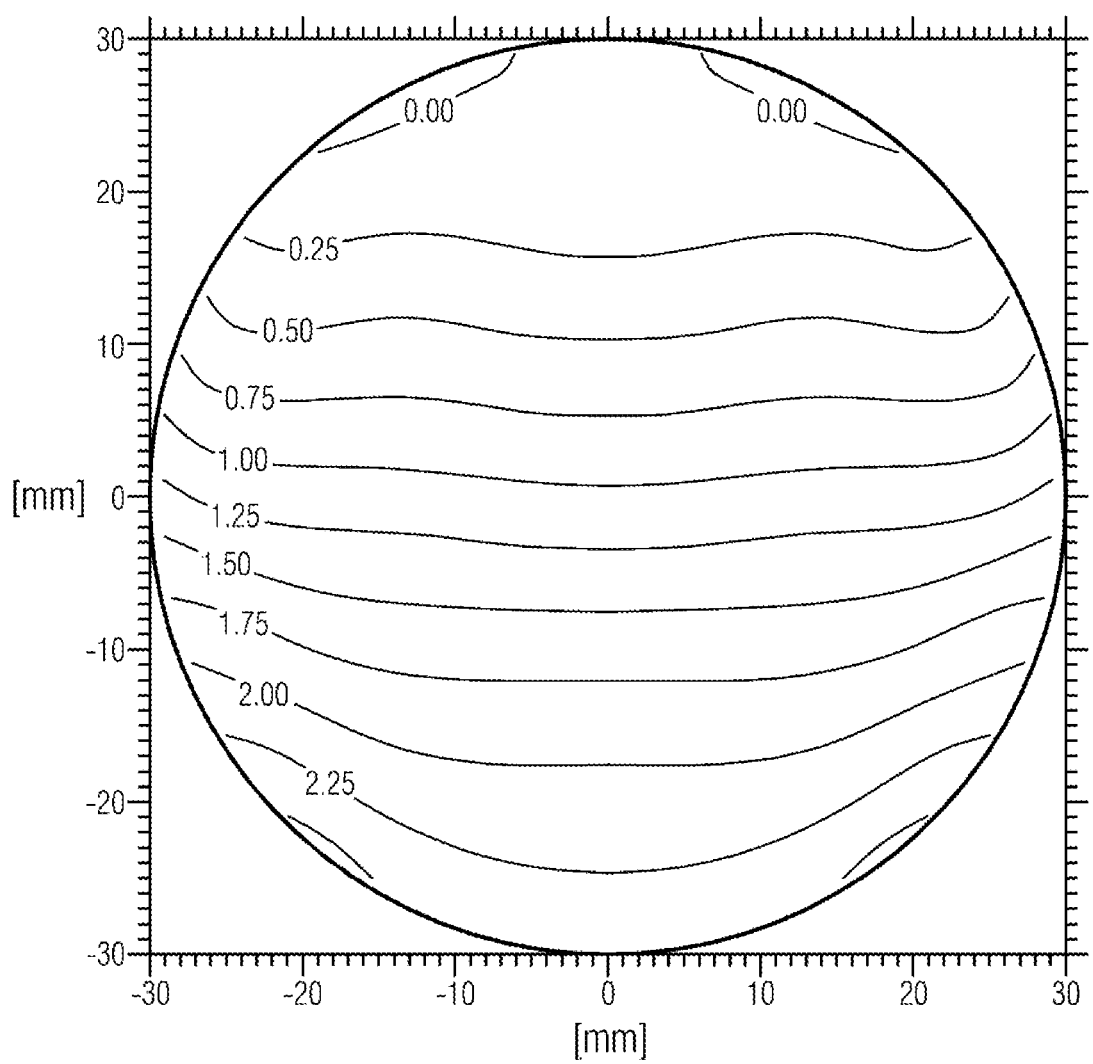
FIG. 2A shows the mean spherical power of the GRIN progressive power spectacle lens according to the first exemplary embodiment.
Figure 2B:
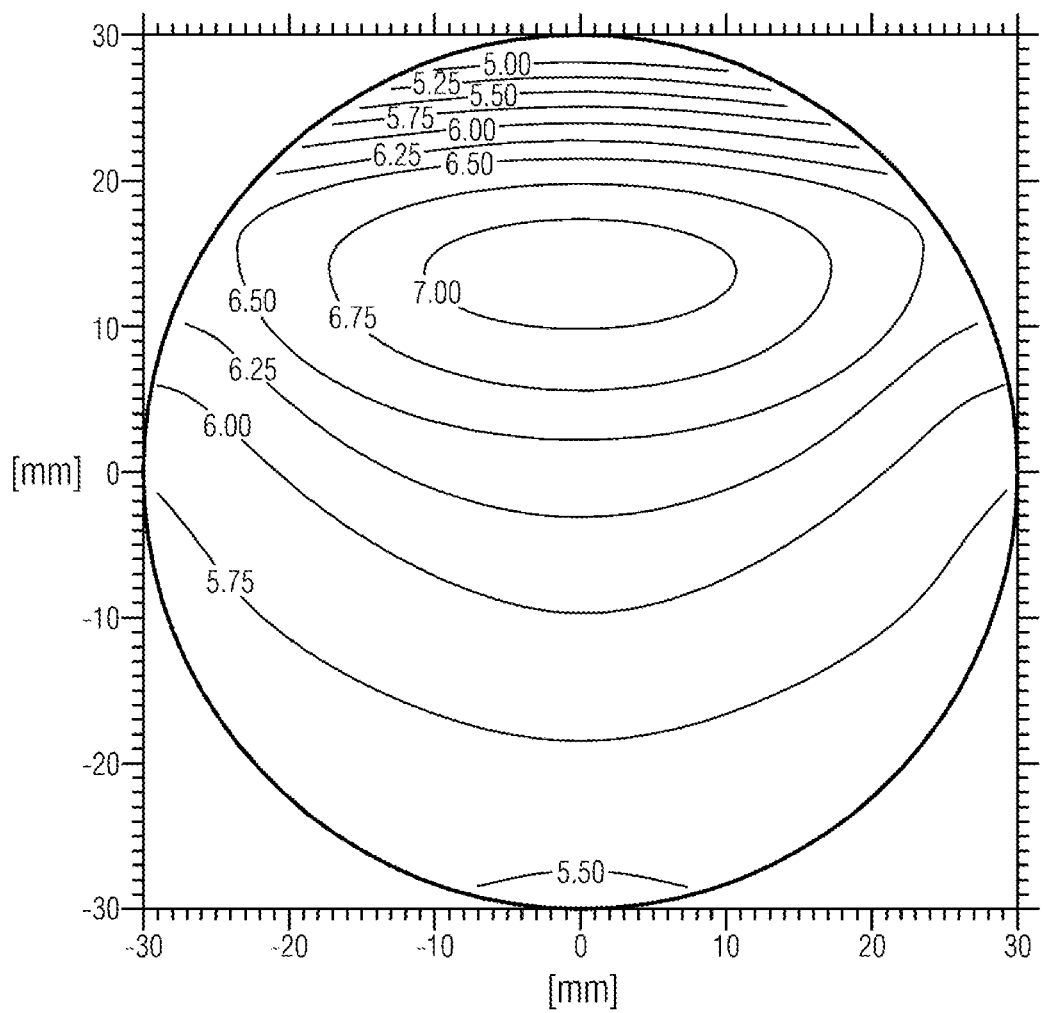
FIG. 2B shows the mean surface optical power of the progressive power spectacle lens of FIG. 2A.
Figure 2C:
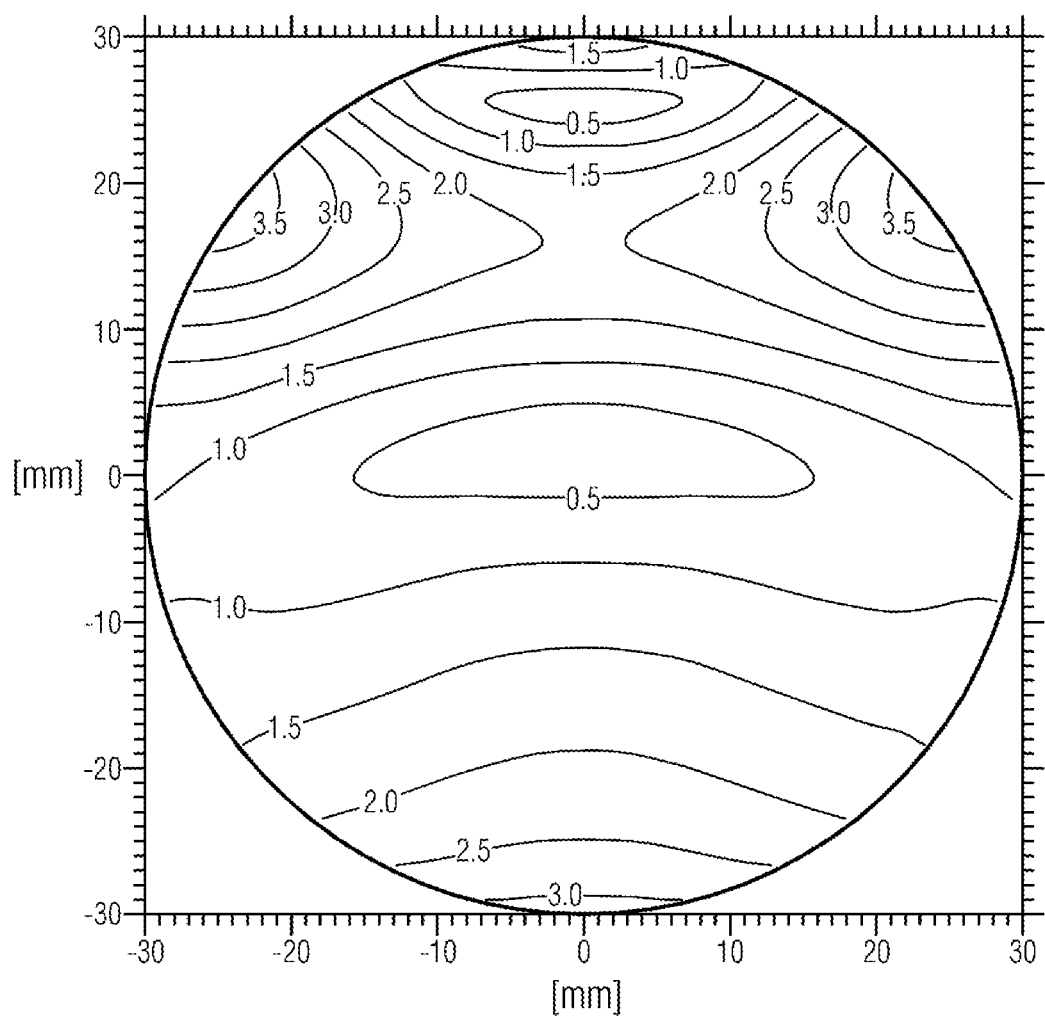
FIG. 2C shows the surface astigmatism of the object-side surface of the progressive power spectacle lens of FIG. 2A.

FIGS. 2A to 2C show optical properties of the GRIN progressive power spectacle lens according to the first exemplary embodiment, wherein FIG. 2A shows the mean spherical power, FIG. 2B shows the mean surface optical power, calculated for a constant refractive index of n=1.600 for the object-side freeform surface, and FIG. 2C shows the surface astigmatism for n=1.600 of the object-side freeform surface of the GRIN progressive power spectacle lens of FIG. 2A.

Figure 3:
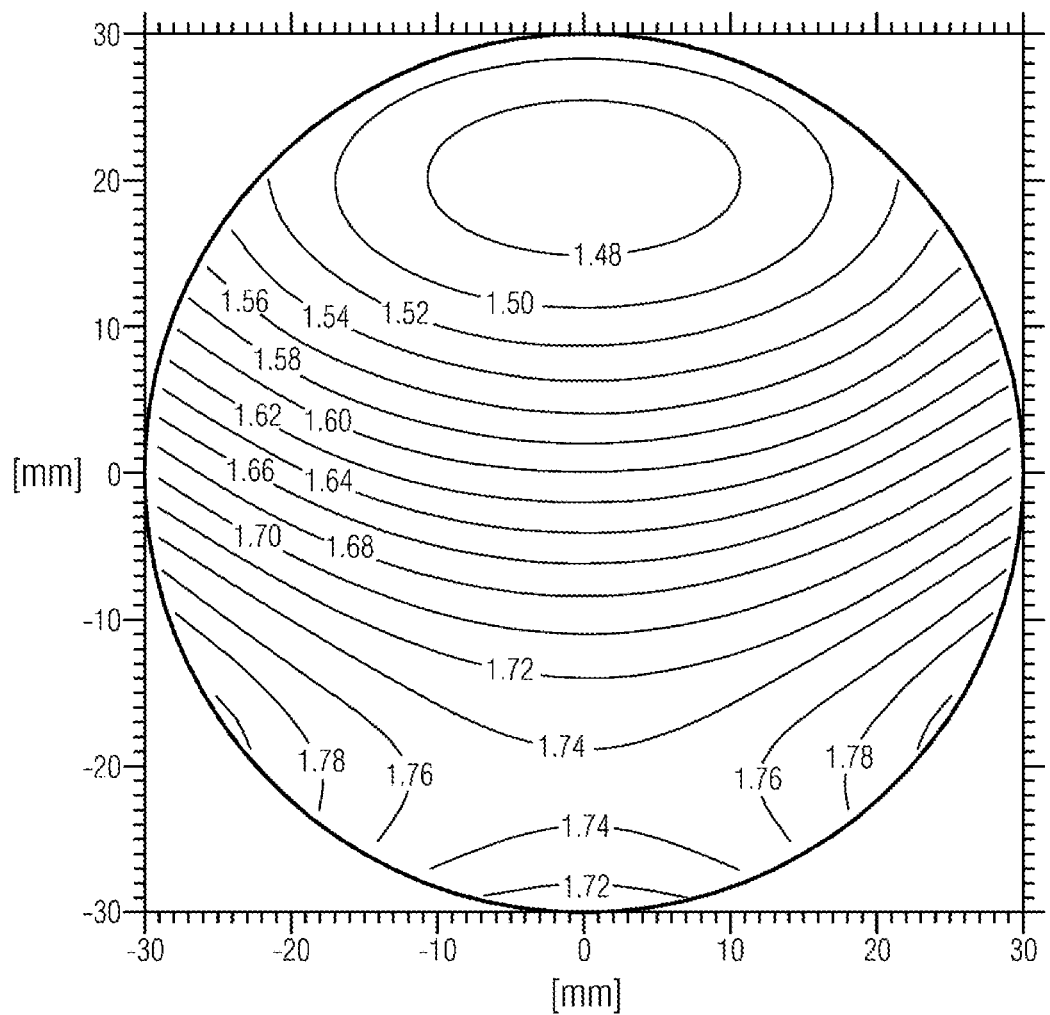
FIG. 3 shows the distribution of the refractive index of the GRIN progressive power spectacle lens according to the first exemplary embodiment.

FIG. 3 shows the distribution of the refractive index of the GRIN progressive power spectacle lens according to the first exemplary embodiment.

Figure 4A:
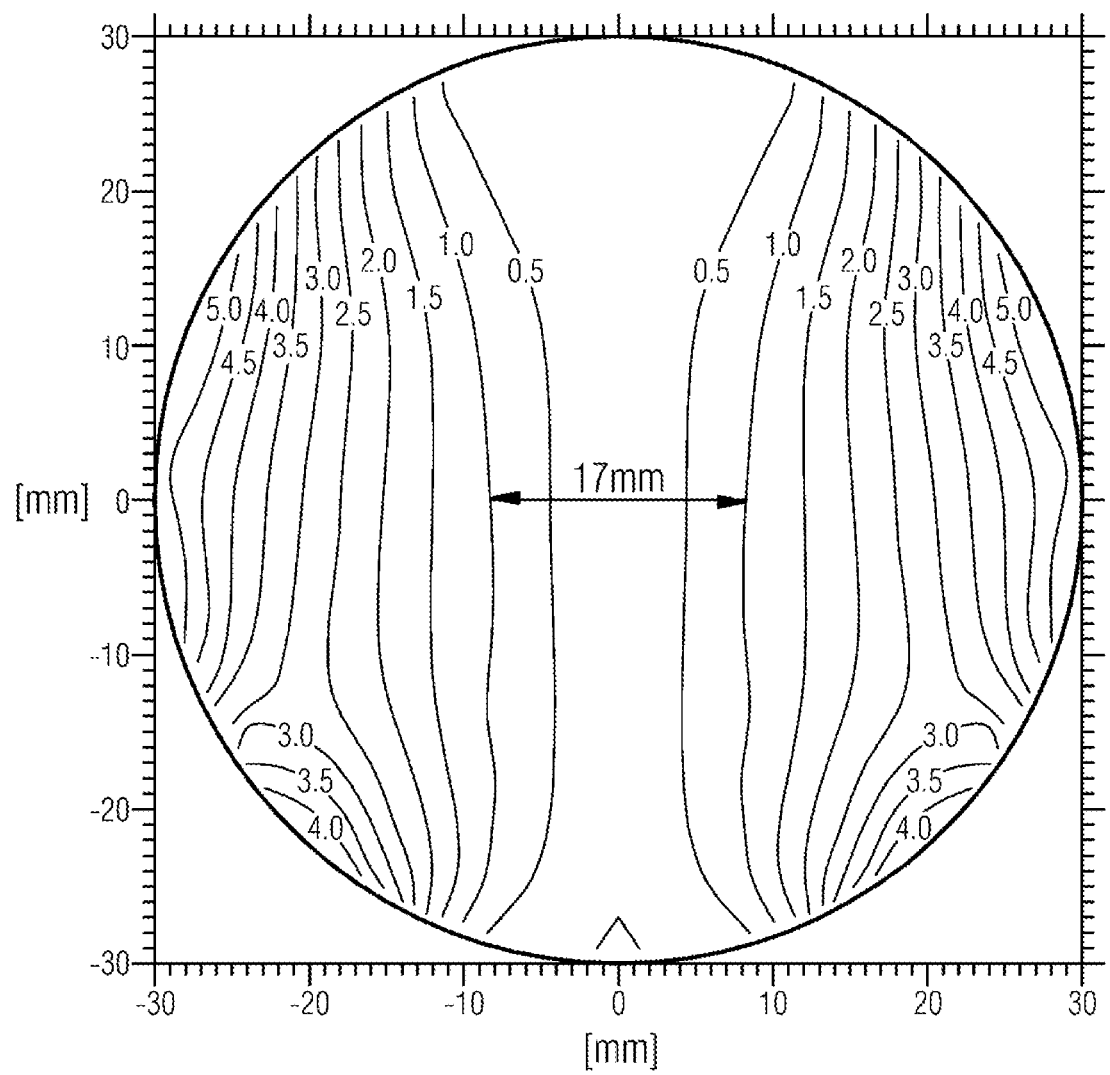
FIG. 4A shows the residual astigmatism distribution of the comparison progressive power spectacle lens.
Figure 4B:
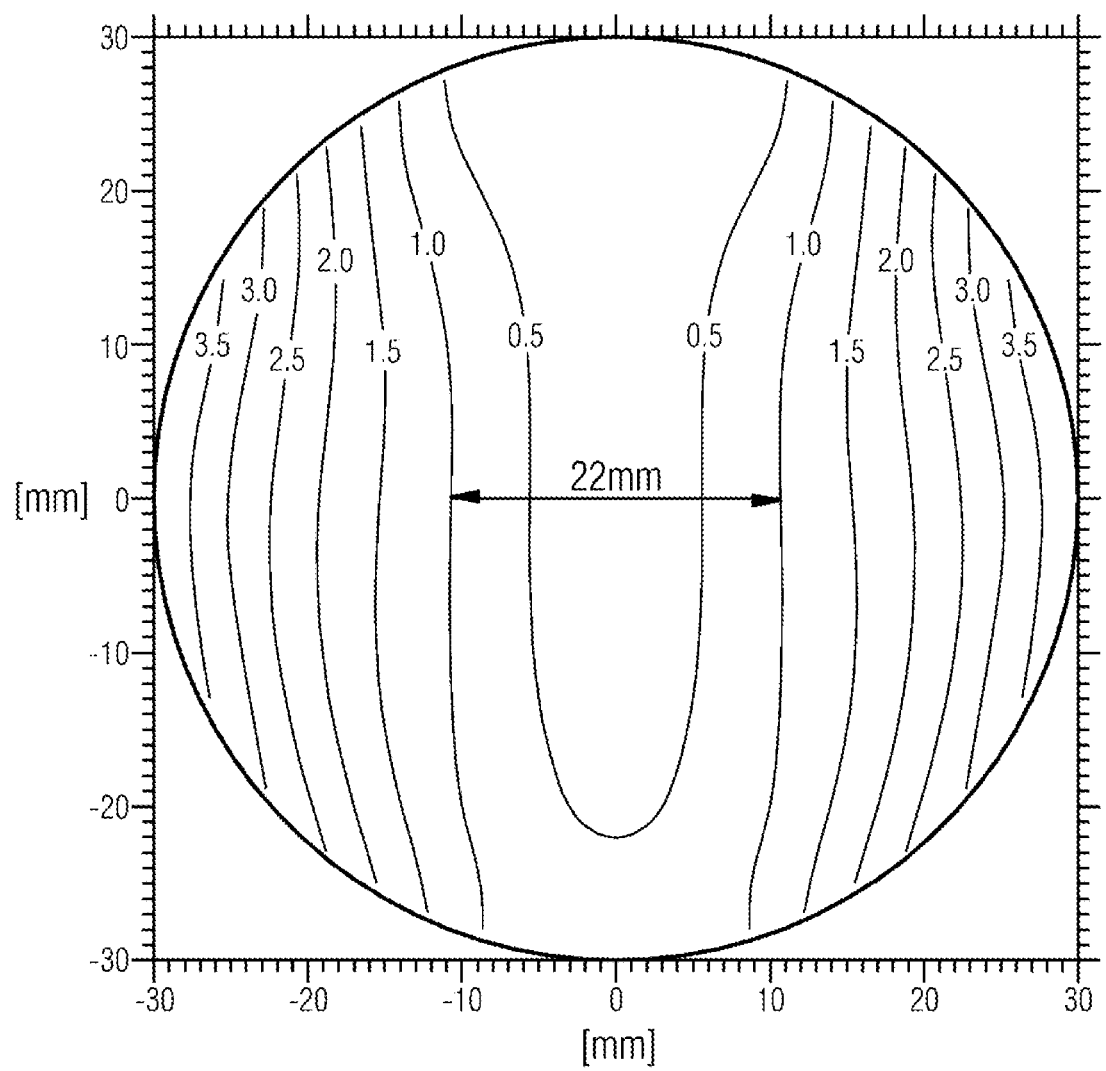
FIG. 4B shows the residual astigmatism distribution of the progressive power spectacle lens according to the first exemplary embodiment.

FIGS. 4A and 4B show a comparison of the residual astigmatism distribution of the GRIN progressive power spectacle lens according to the first exemplary embodiment with the residual astigmatism distribution of the comparison progressive power spectacle lens, wherein FIG. 4A shows the residual astigmatism distribution of the comparison progressive power spectacle lens and FIG. 4B shows the residual astigmatism distribution of the GRIN progressive power spectacle lens according to the disclosure according to the first exemplary embodiment.

Figure 5A:
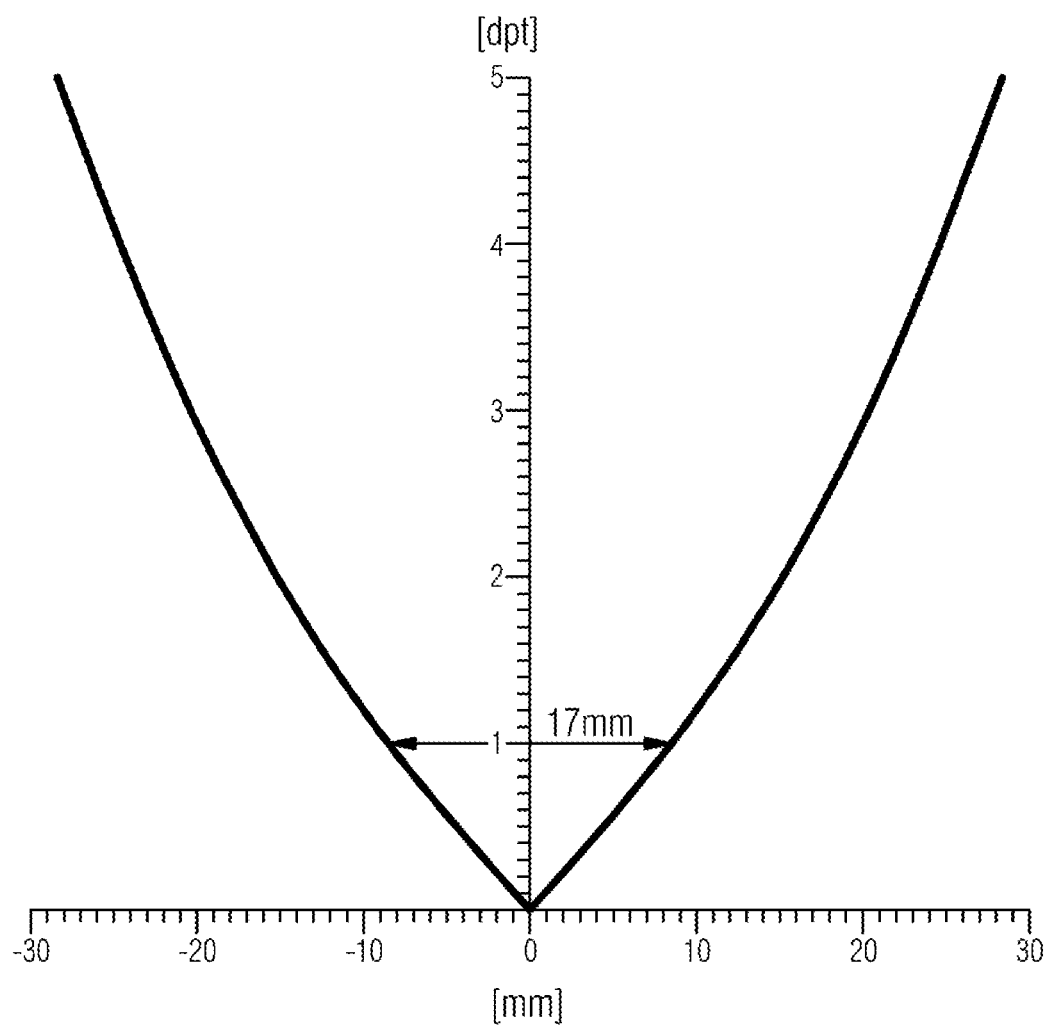
FIG. 5A shows the residual astigmatism profile of the comparison progressive power spectacle lens.
Figure 5B:
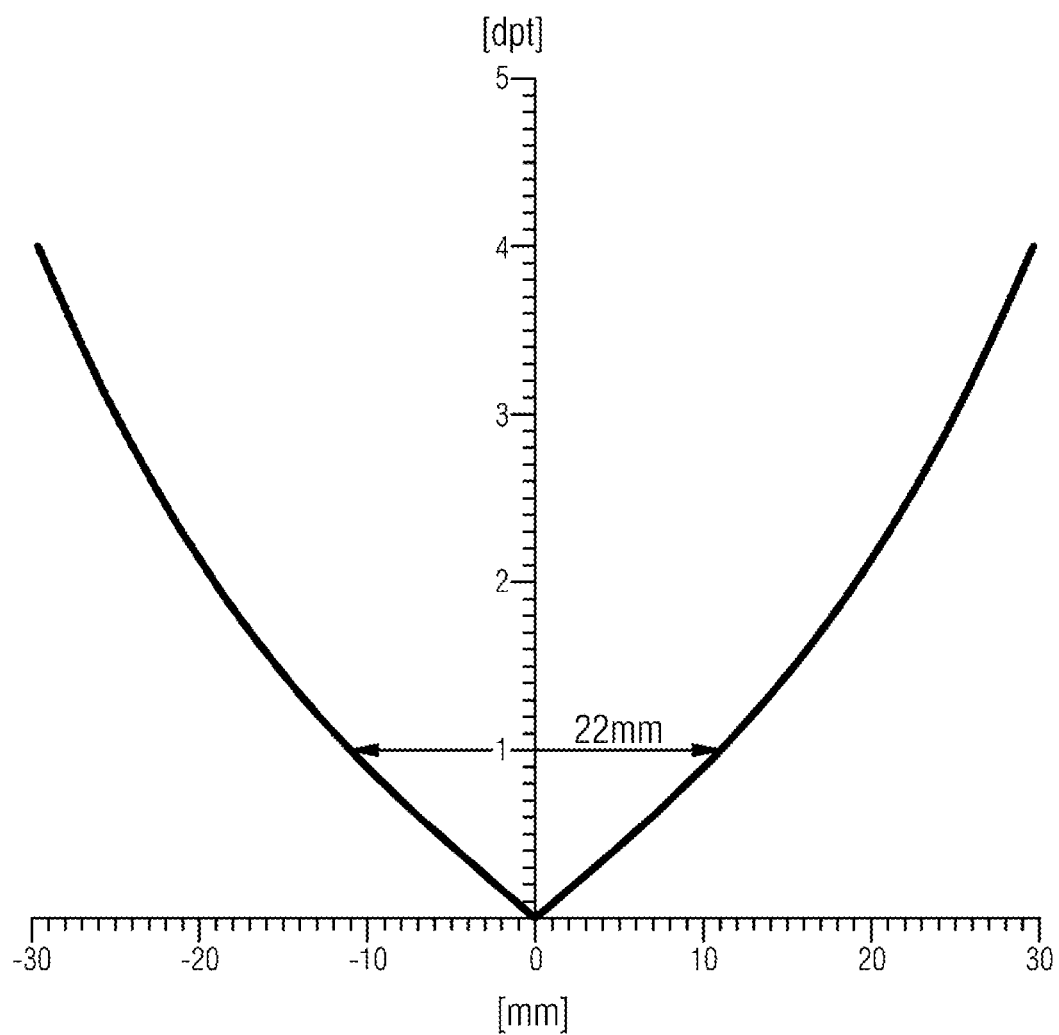
FIG. 5B shows the residual astigmatism profile of the progressive power spectacle lens according to the first exemplary embodiment.

FIGS. 5A and 5B show a comparison of the residual astigmatism profile of the GRIN progressive power spectacle lens according to the first exemplary embodiment with the residual astigmatism profile of the comparison progressive power spectacle lens along a section at y=0 according to FIG. 4, wherein FIG. 5A shows the residual astigmatism profile of the comparison progressive power spectacle lens and FIG. 5B shows the residual astigmatism profile of the GRIN progressive power spectacle lens according to the disclosure according to the first exemplary embodiment.

FIGS. 6A and 6B show a comparison of the contour of the front surface of the GRIN progressive power spectacle lens according to the first exemplary embodiment with the contour of the front surface of the comparison progressive power spectacle lens, wherein FIG. 6A shows the sagittal heights of the front surface of the comparison progressive power spectacle lens and FIG. 6B shows the sagittal heights of the front surface of the GRIN progressive power spectacle lens according to the disclosure according to the first exemplary embodiment.

Figure 7A:
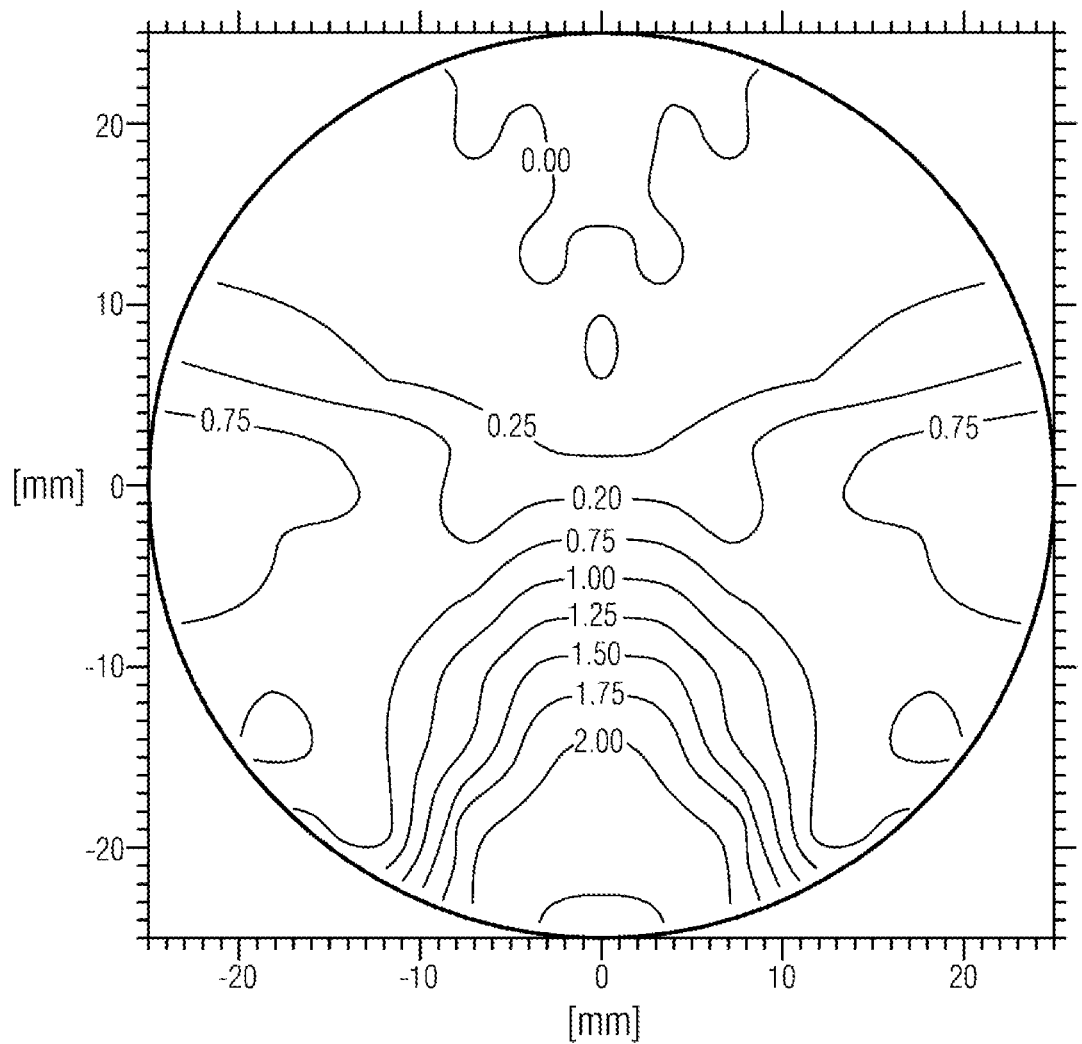
FIG. 7A shows the mean spherical power optical of a comparison progressive power spectacle lens.
Figure 7B:
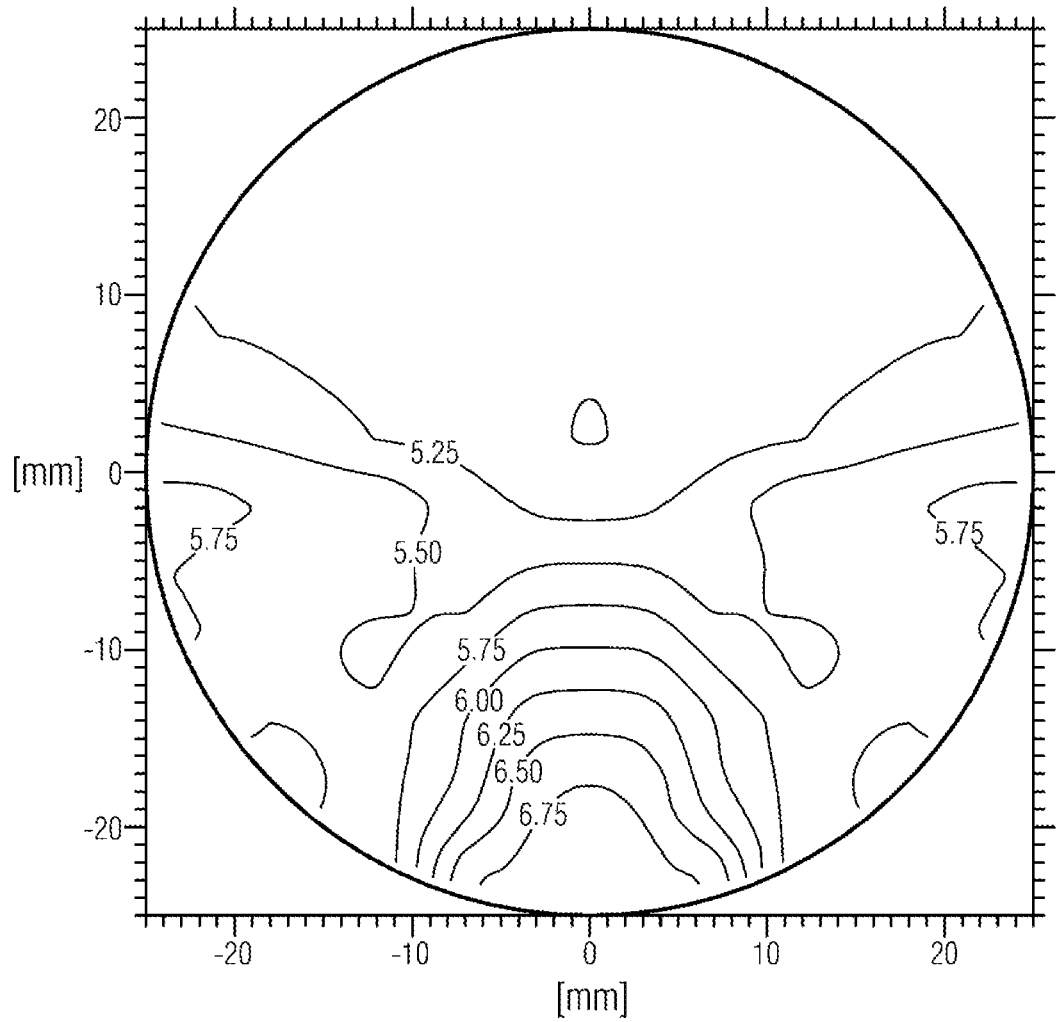
FIG. 7B shows the mean surface optical power of the object-side surface of the comparison progressive power spectacle lens of FIG. 7A.
Figure 7C:
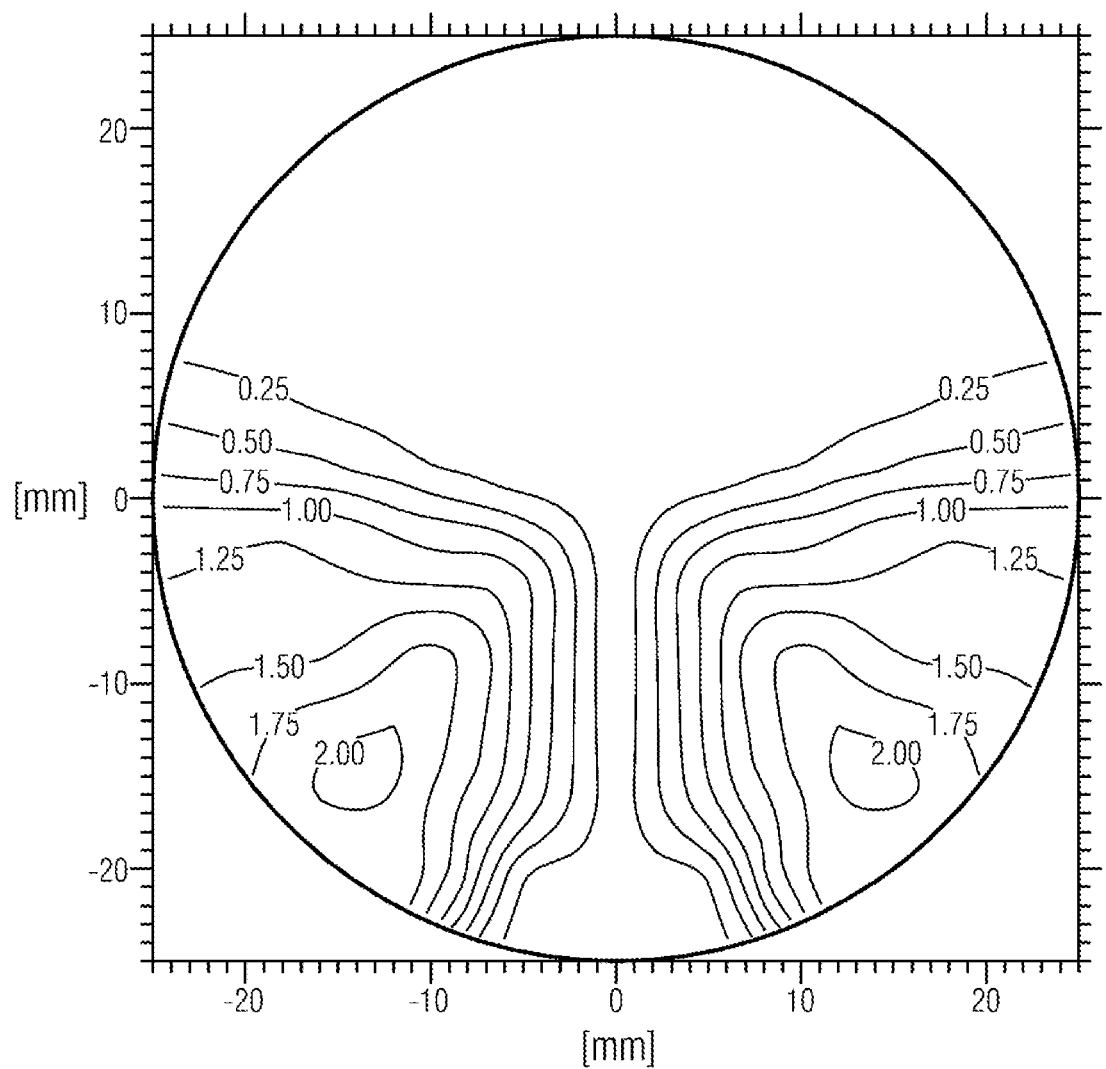
FIG. 7C shows the surface astigmatism of the object-side surface of the comparison progressive power spectacle lens of FIG. 7A.

FIGS. 7A to 7C show optical properties of a comparison progressive power spectacle lens of conventional construction made of a material with a refractive index of n=1.600 in relation to a GRIN progressive power spectacle lens with a vertical plane of symmetry according to a second exemplary embodiment of the disclosure, wherein FIG. 7A the mean spherical power, FIG. 7B shows the mean surface optical power, object-side freeform surface, and FIG. 7C shows the surface astigmatism of the object-side freeform surface of the comparison progressive power spectacle lens of FIG. 7A.

Figure 8A:
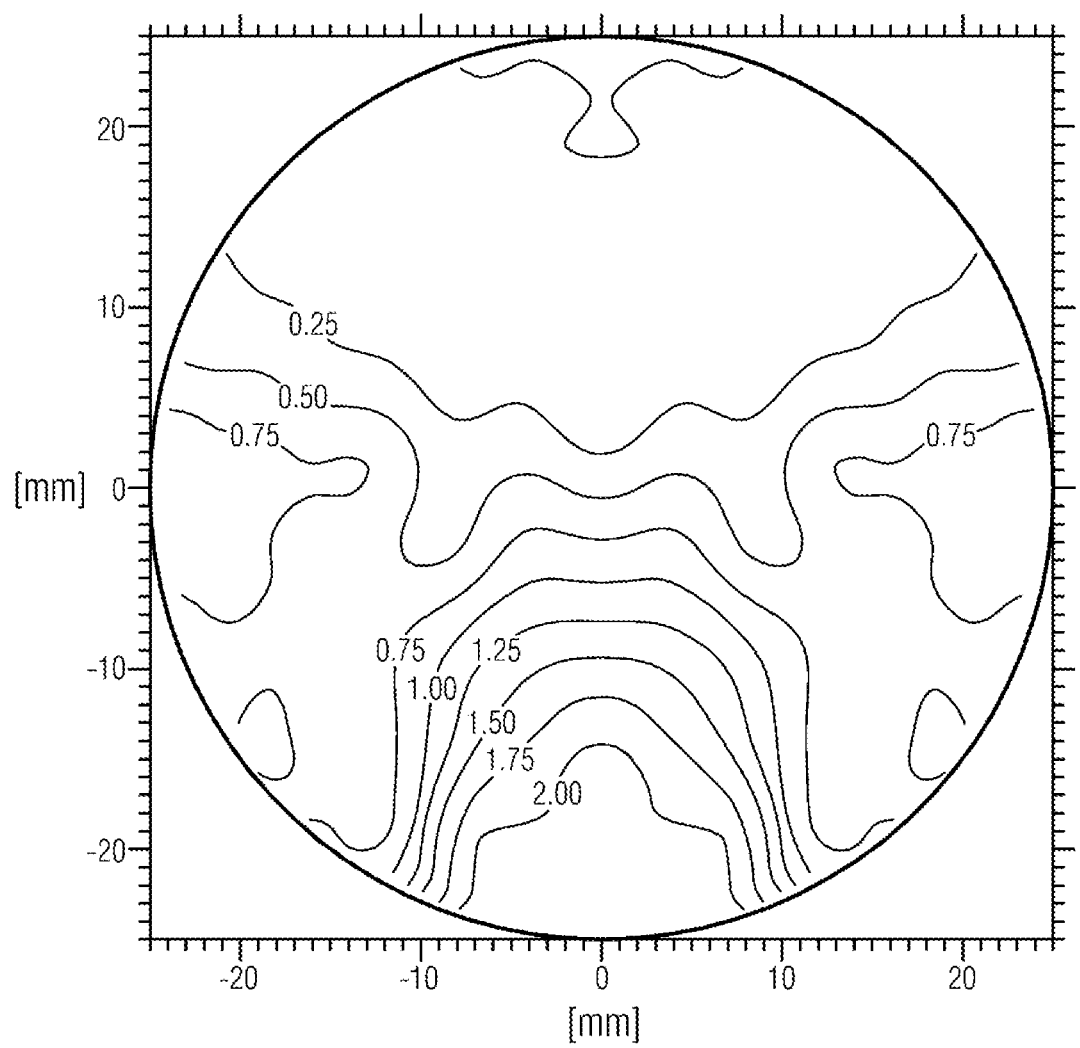
FIG. 8A shows the mean spherical power of the progressive power spectacle lens according to the second exemplary embodiment.
Figure 8B:
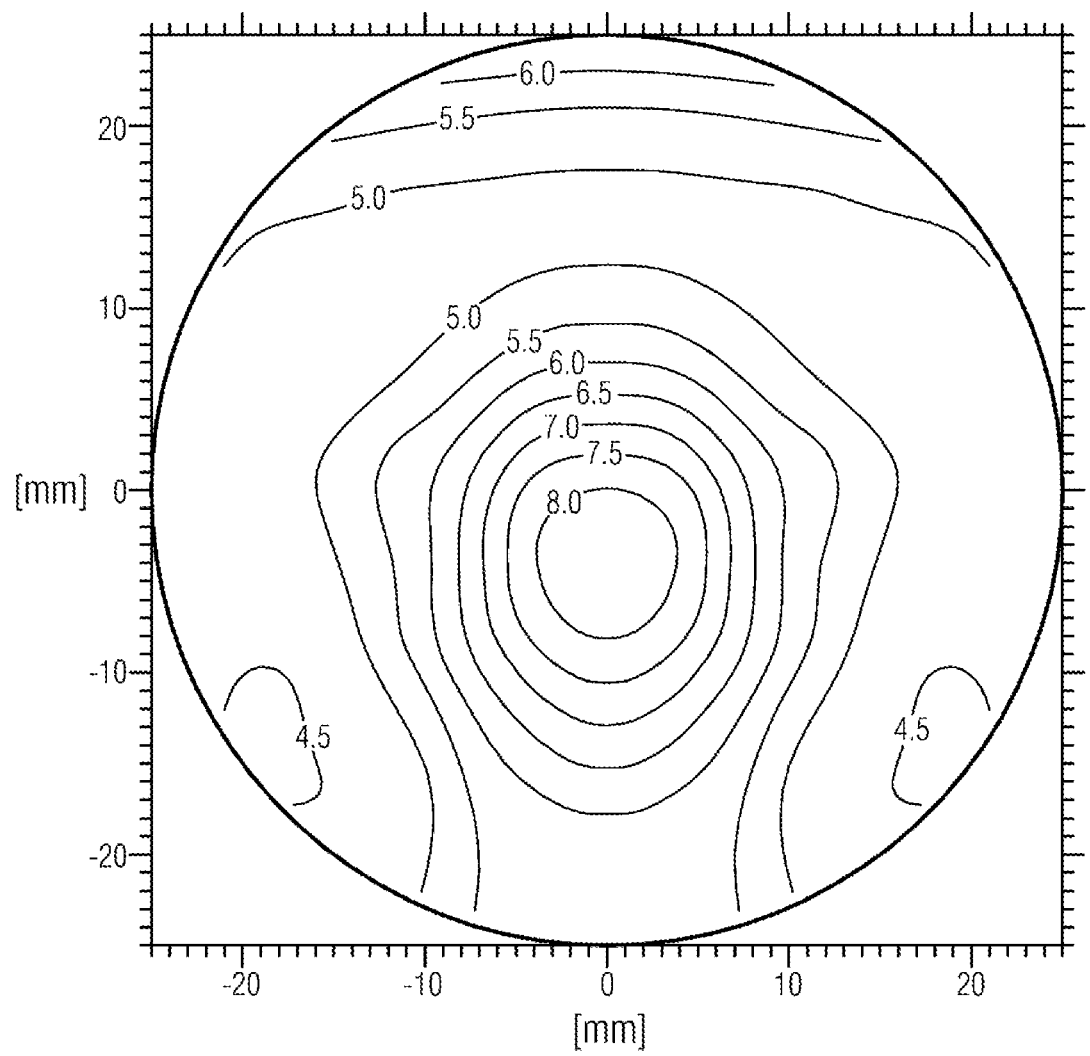
FIG. 8B shows the mean surface optical power of the object-side surface of the progressive power spectacle lens according to FIG. 8A.
Figure 8C:
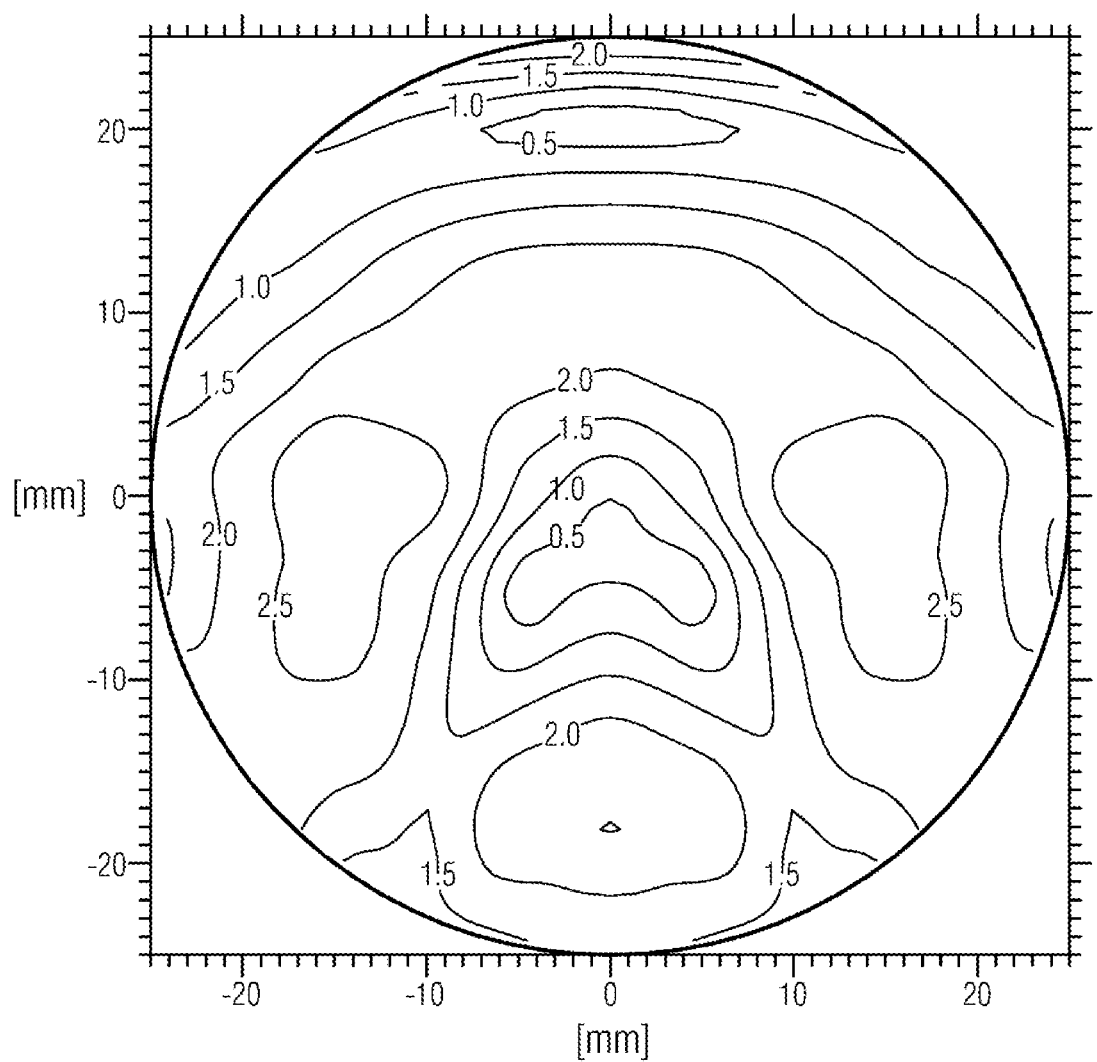
FIG. 8C shows the surface astigmatism of the object-side surface of the GRIN progressive power spectacle lens according to FIG. 8A.

FIGS. 8A to 8C show optical properties of the GRIN progressive power spectacle lens according to the second exemplary embodiment, wherein FIG. 8A shows the mean spherical power, FIG. 8B shows the mean surface optical power, calculated for a refractive index of n=1.600 for the object-side surface, and FIG. 8C shows the surface astigmatism for n=1.600 of the object-side freeform surface of the GRIN progressive power spectacle lens according to FIG. 8A.

Figure 9:
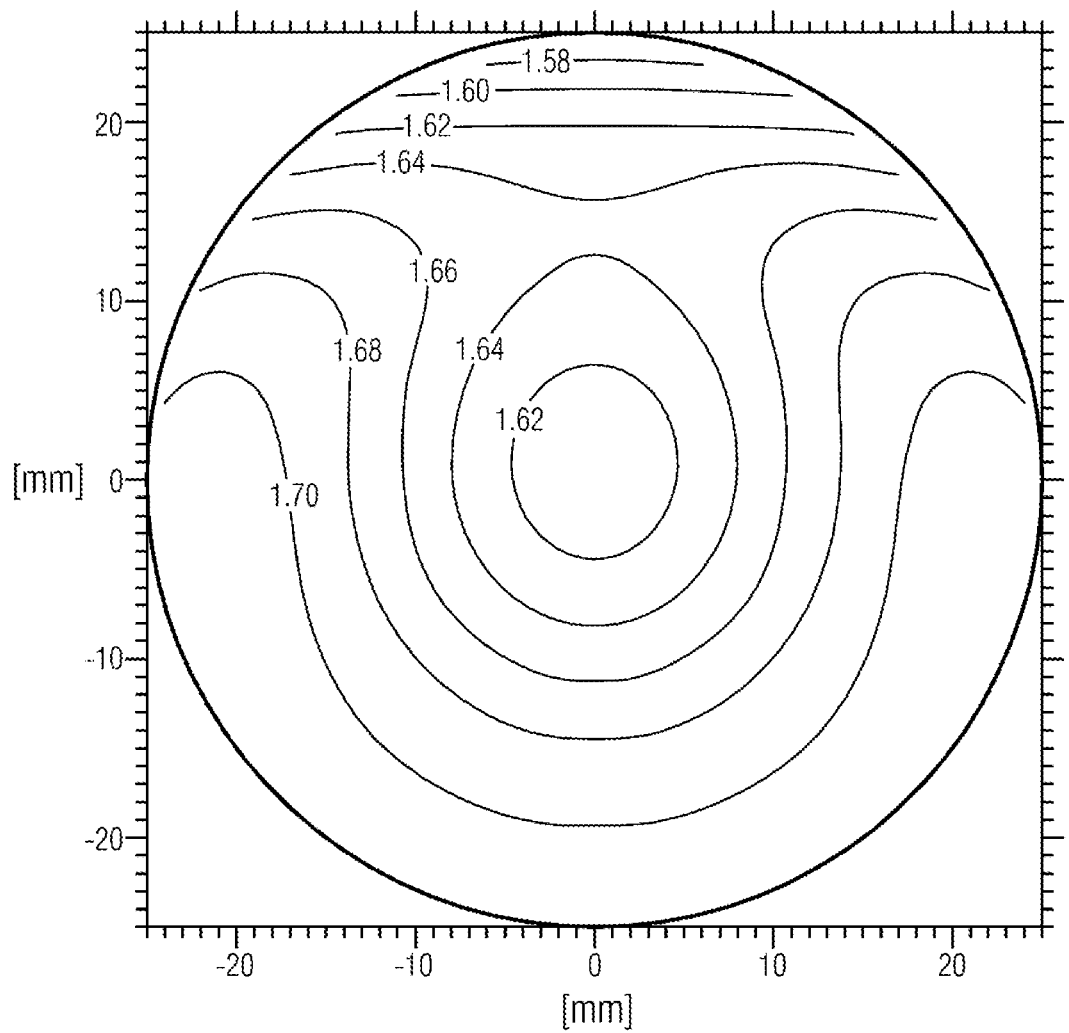
FIG. 9 shows the distribution of the refractive index of the GRIN progressive power spectacle lens according to the second exemplary embodiment.

FIG. 9 shows the distribution of the refractive index of the GRIN progressive power spectacle lens according to the second exemplary embodiment.

Figure 10A:
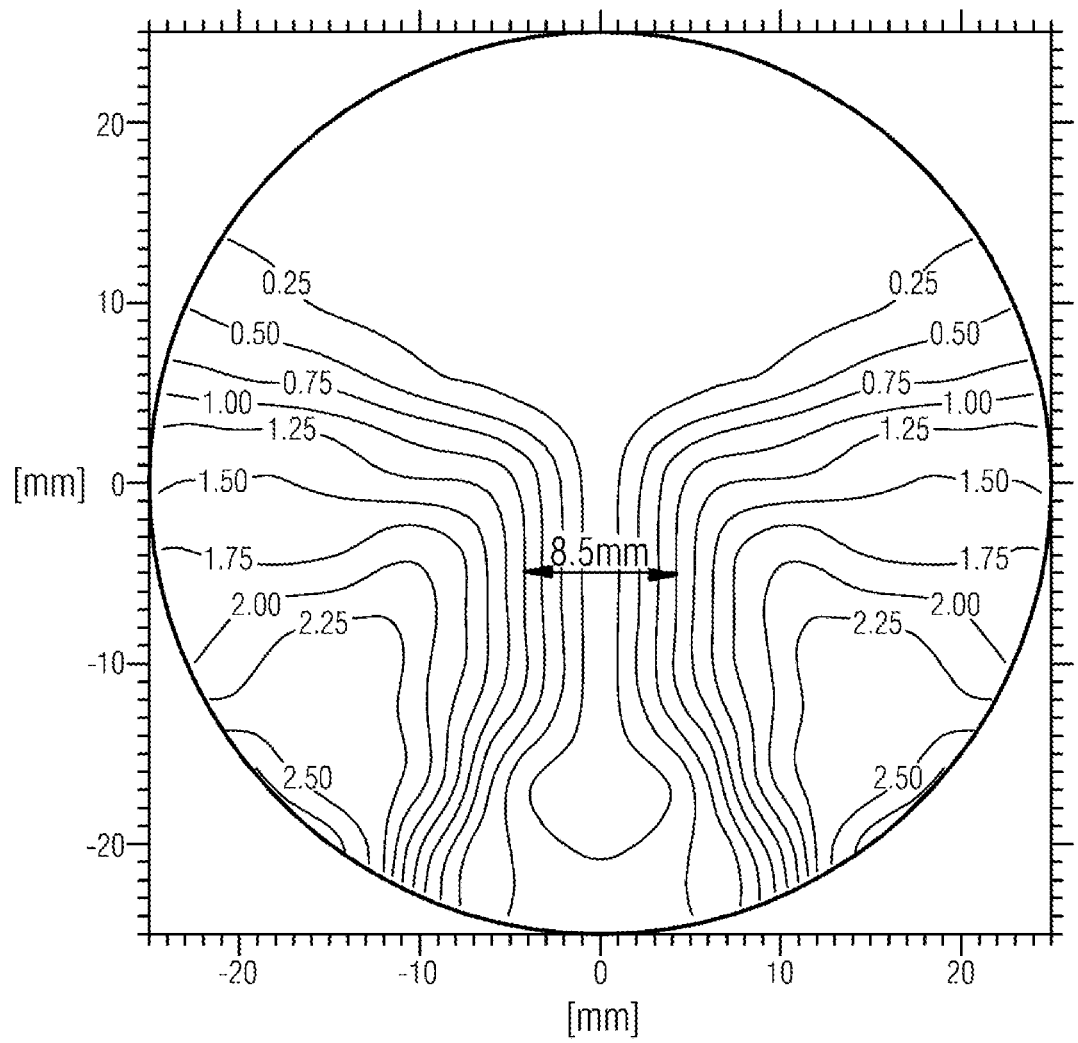
FIG. 10A shows a comparison of the residual astigmatism distribution of a progressive power spectacle lens according to the second exemplary embodiment.
Figure 10B:
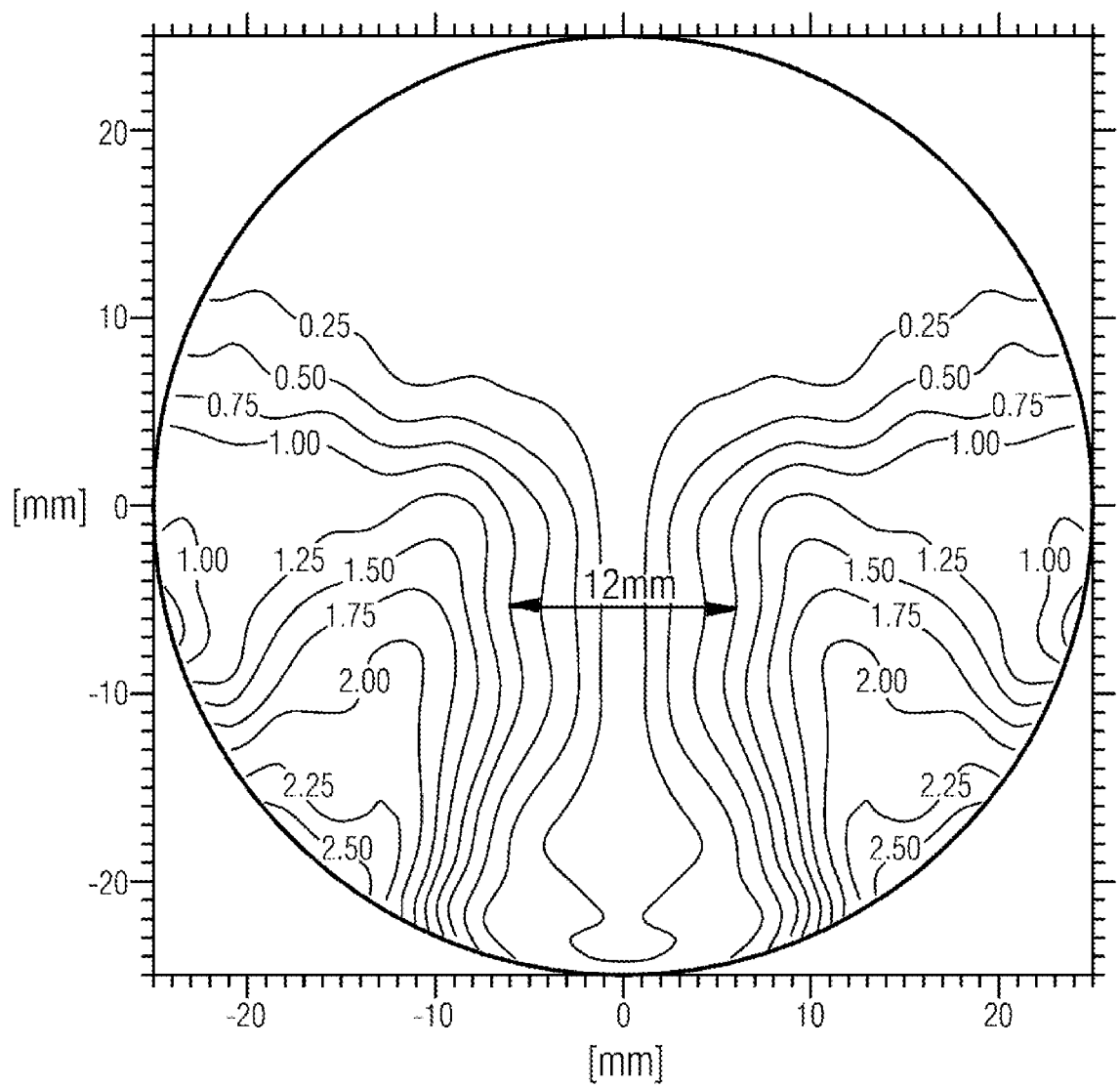
FIG. 10B shows the residual astigmatism distribution of the comparison progressive power spectacle lens.

FIGS. 10A and 10B show a comparison of the residual astigmatism distribution of the GRIN progressive power spectacle lens according to the second exemplary embodiment with the residual astigmatism distribution of the comparison progressive power spectacle lens, wherein FIG. 10A shows the residual astigmatism distribution of the comparison progressive power spectacle lens, and FIG. 10B shows the residual astigmatism distribution of the GRIN progressive power spectacle lens according to the second exemplary embodiment.

Figure 11A:
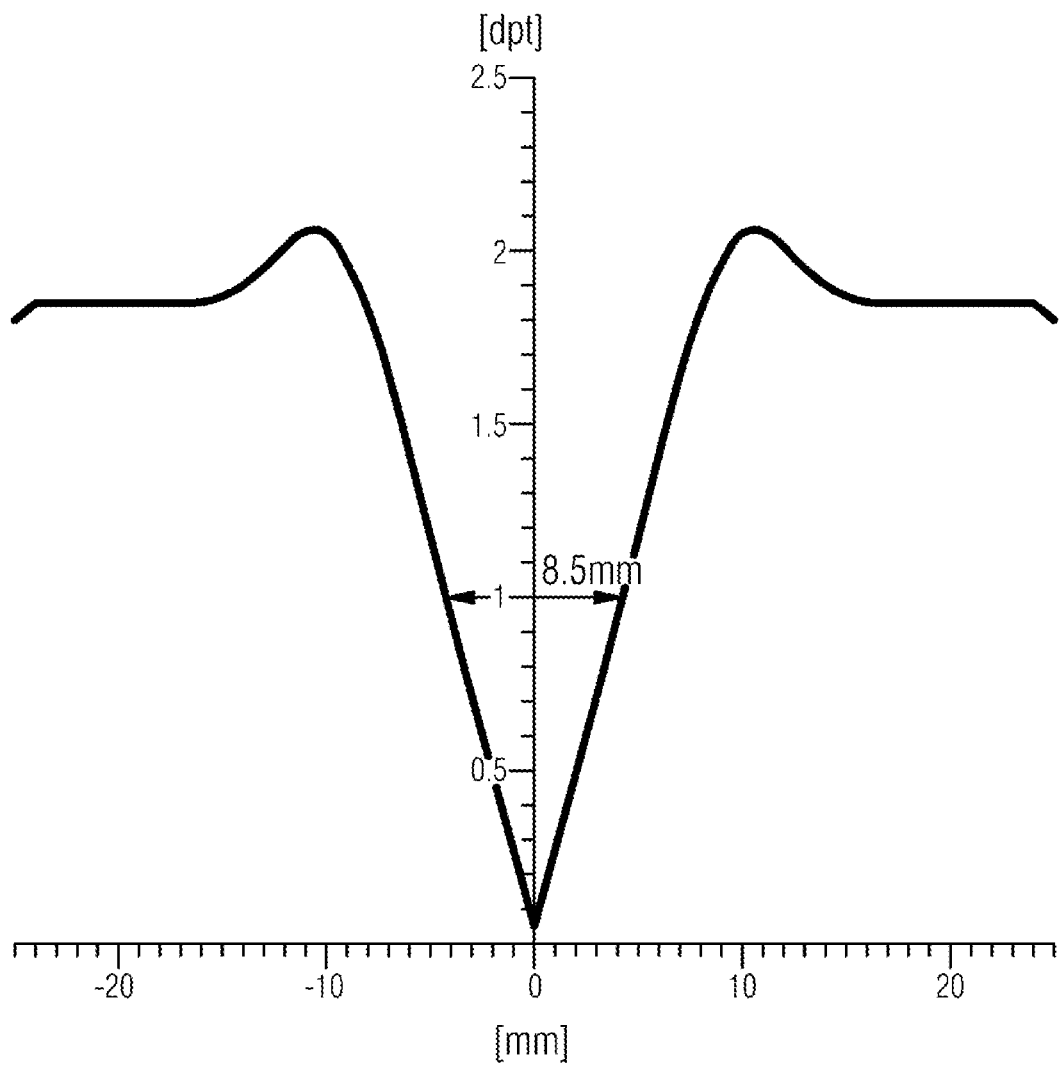
FIG. 11A shows the residual astigmatism profile of the comparison progressive power spectacle lens.
Figure 11B:
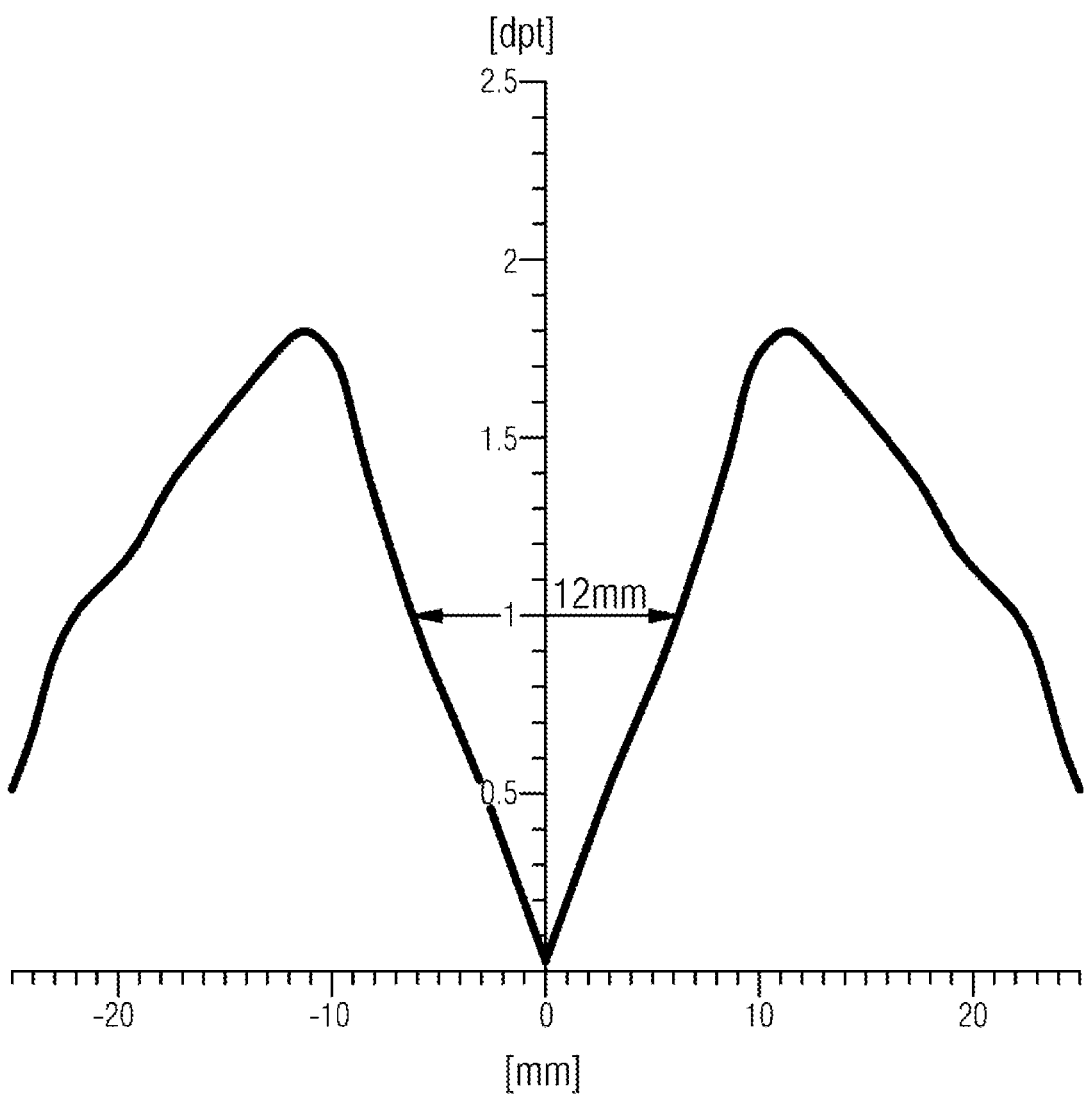
FIG. 11B shows the residual astigmatism profile of the progressive power spectacle lens according to the second exemplary embodiment.

FIGS. 11A and 11B show a comparison of the residual astigmatism profile of the GRIN progressive power spectacle lens according to the second exemplary embodiment with the residual astigmatism profile of the comparison progressive power spectacle lens along a section at y=−5 mm according to FIGS. 10A and 10B, wherein FIG. 11A shows the residual astigmatism profile of the comparison progressive power spectacle lens, and FIG. 11B shows the residual astigmatism profile of the GRIN progressive power spectacle lens according to the second exemplary embodiment.

FIGS. 12A and 12B show a comparison of the contour of the front surface of the GRIN progressive power spectacle lens according to the second exemplary embodiment with the contour of the front surface of the comparison progressive power spectacle lens; the sagittal heights are specified in relation to a plane tilted through −7.02° about the horizontal axis, wherein FIG. 12A shows the sagittal heights of the front surface of the comparison progressive power spectacle lens, and FIG. 12B shows the sagittal heights of the front surface of the GRIN progressive power spectacle lens according to the disclosure according to the second exemplary embodiment.

Figure 13A:
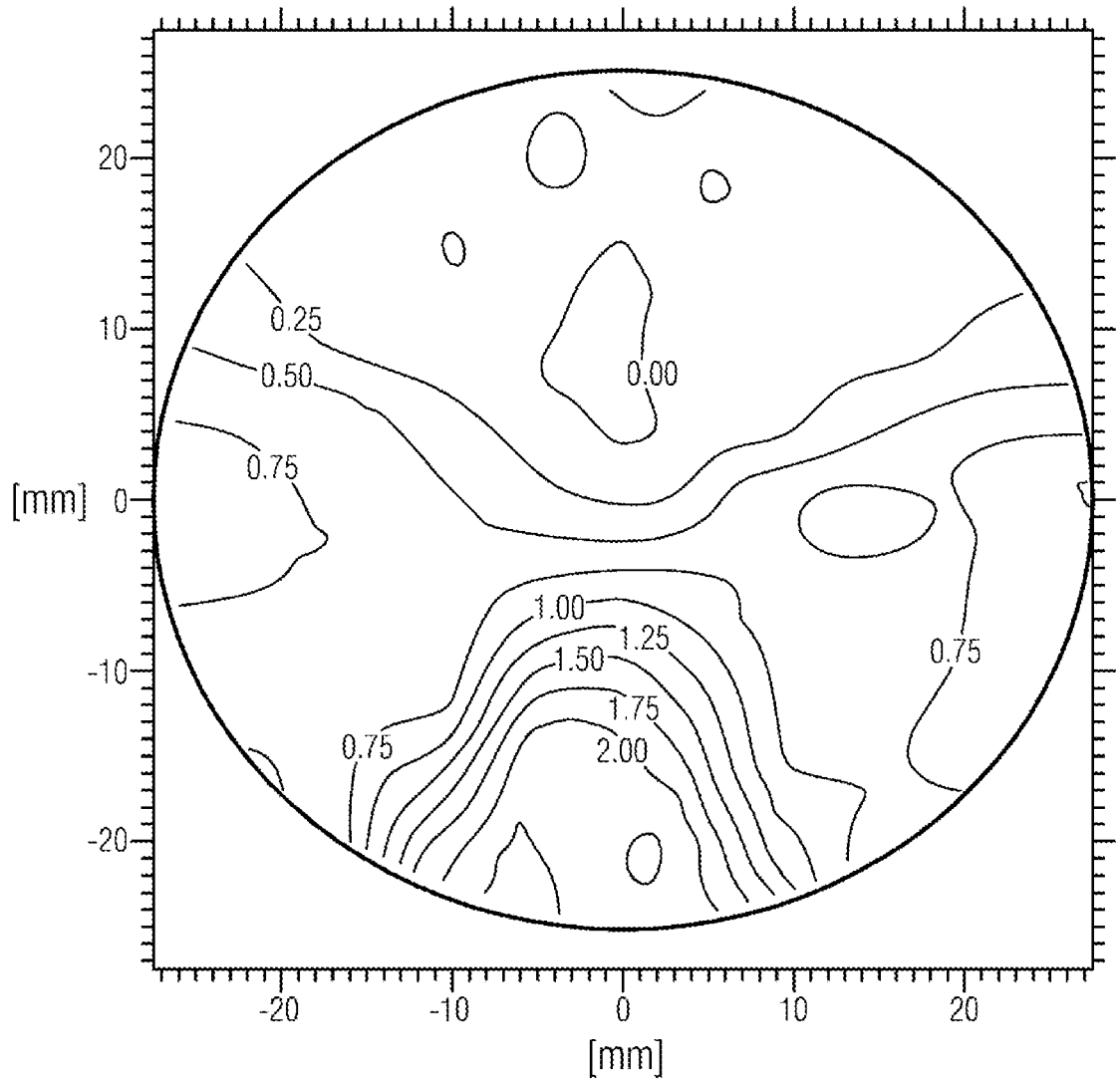
FIG. 13A shows the mean spherical power of a comparison progressive power spectacle lens.
Figure 13B:
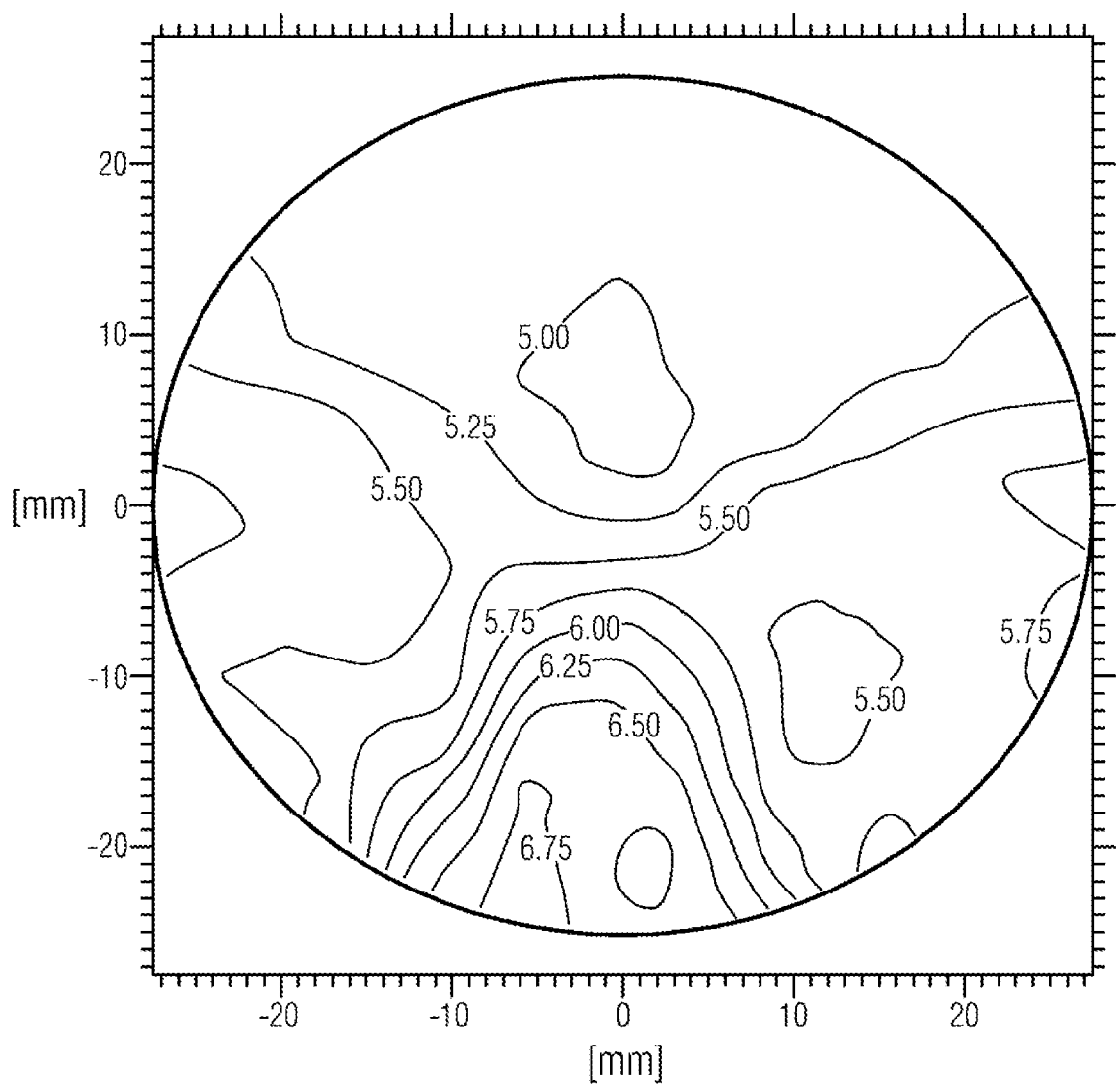
FIG. 13B shows the mean surface optical power of the comparison progressive power spectacle lens of FIG. 13A.
Figure 13C:
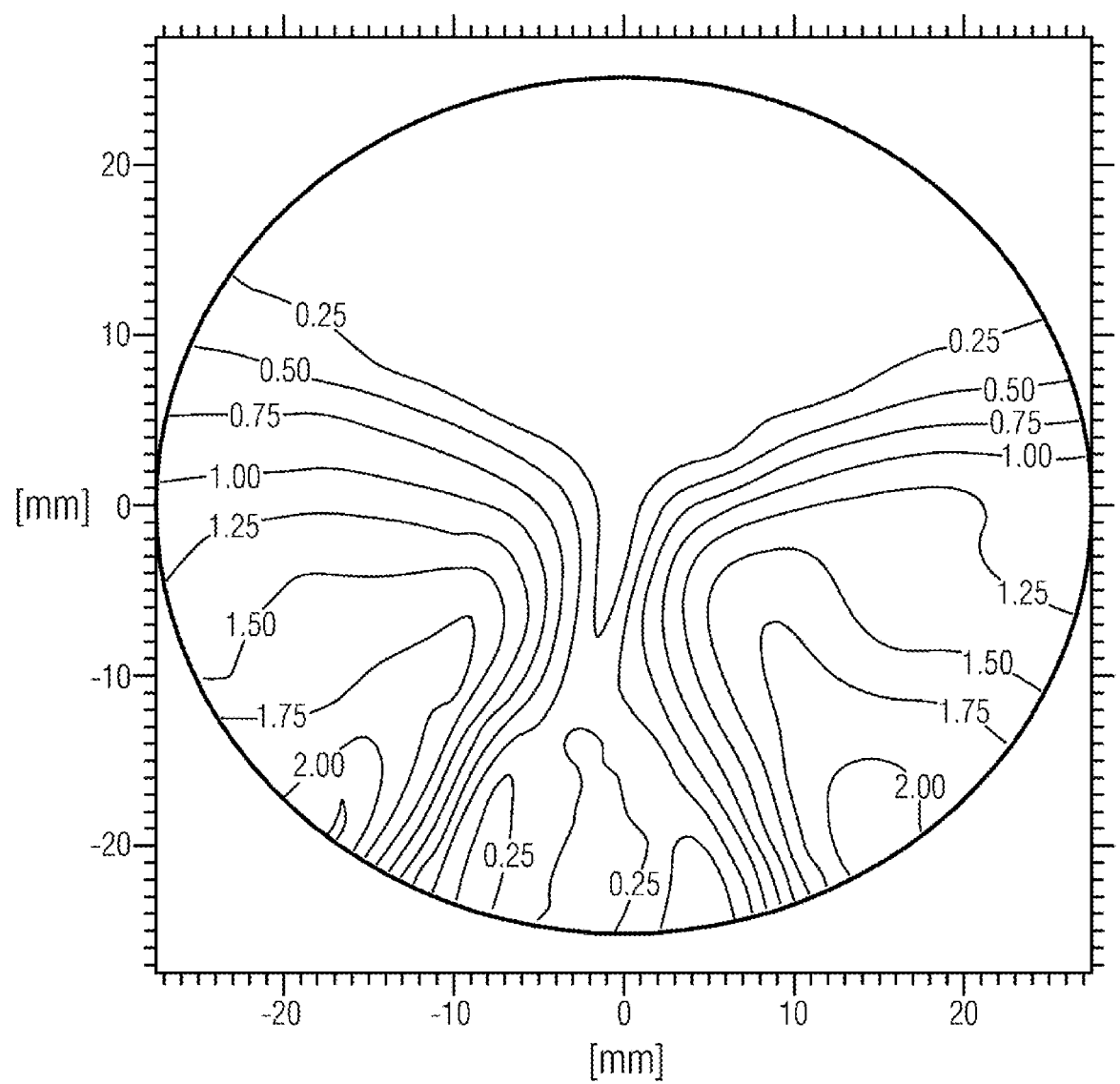
FIG. 13C shows the surface astigmatism of the object-side freeform surface of the comparison progressive power spectacle lens of FIG. 13A.

FIGS. 13A to 13C show optical properties of a comparison progressive power spectacle lens of conventional construction made of a material with a refractive index of n=1.600 in relation to a GRIN progressive power spectacle lens without any symmetry according to a third exemplary embodiment of the disclosure, wherein FIG. 13A shows the mean spherical power of the comparison progressive power spectacle lens, FIG. 13B shows the mean surface optical power of the comparison progressive power spectacle lens, object-side freeform surface, and FIG. 13C shows the surface astigmatism of the object-side freeform surface of the comparison progressive power spectacle lens of FIG. 13A.

Figure 14A:
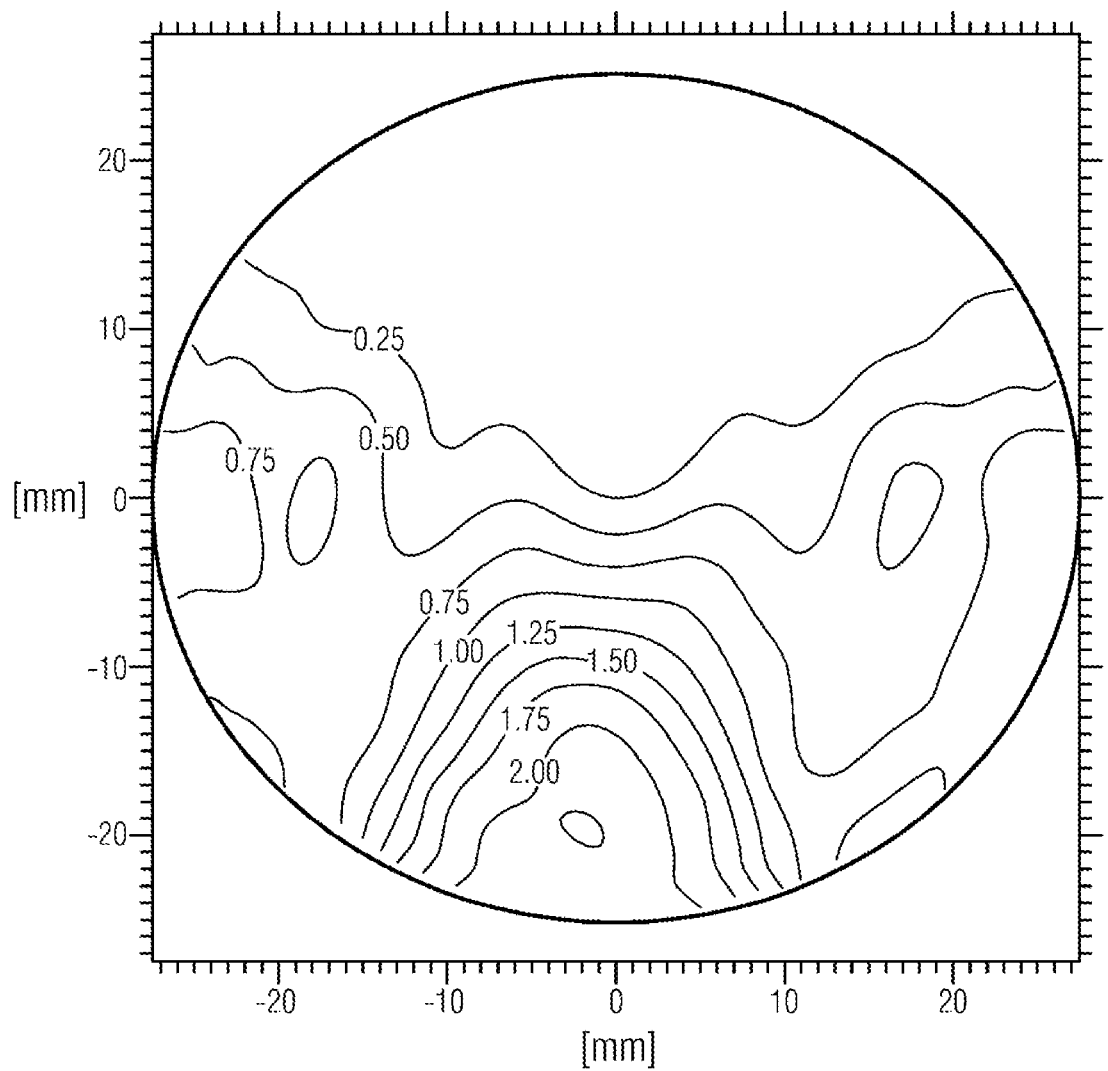
FIG. 14A shows the mean spherical power optical properties of the progressive power spectacle lens according to the third exemplary embodiment.
Figure 14B:
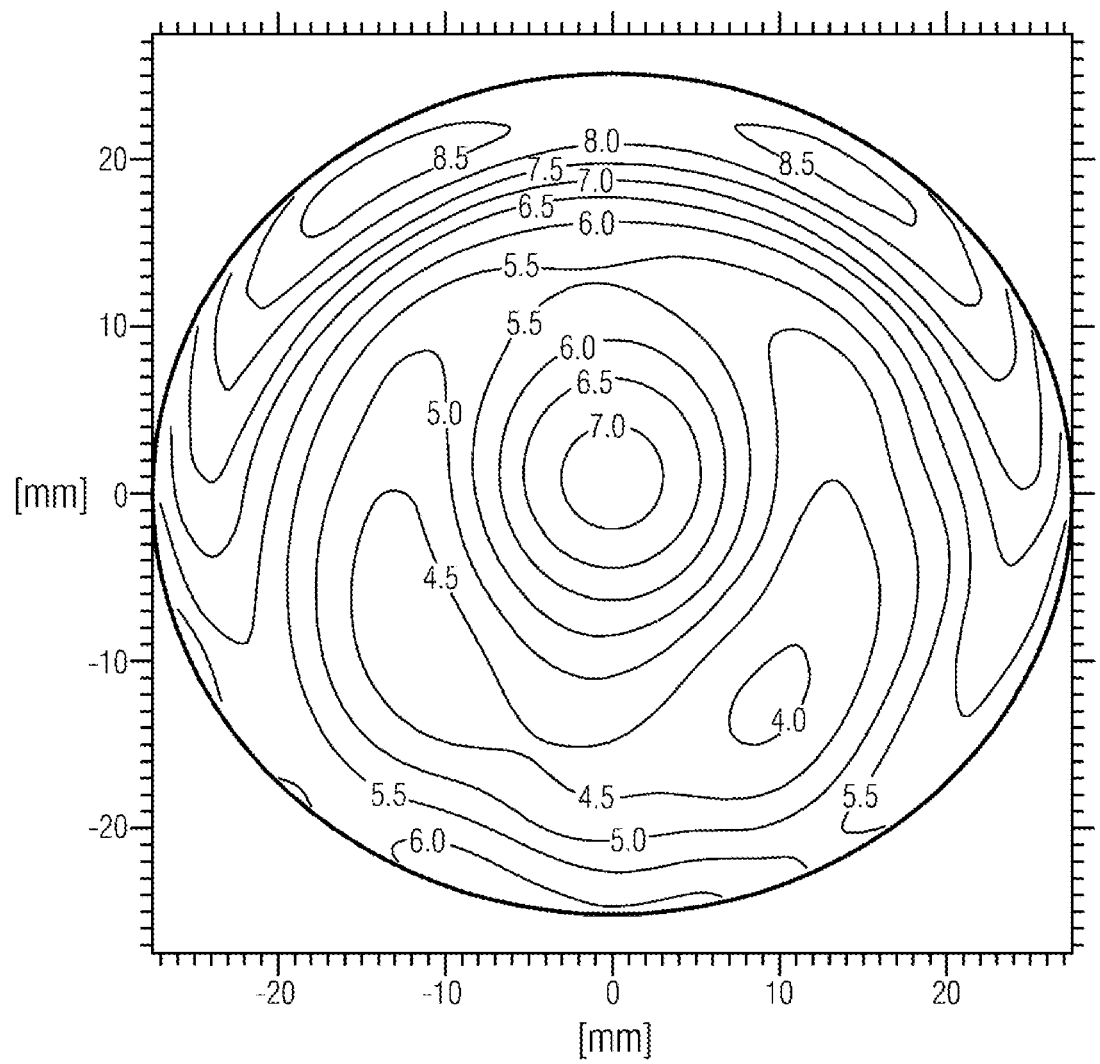
FIG. 14B shows the mean surface optical power of the object-side surface of the progressive power spectacle lens of FIG. 14A.
Figure 14C:
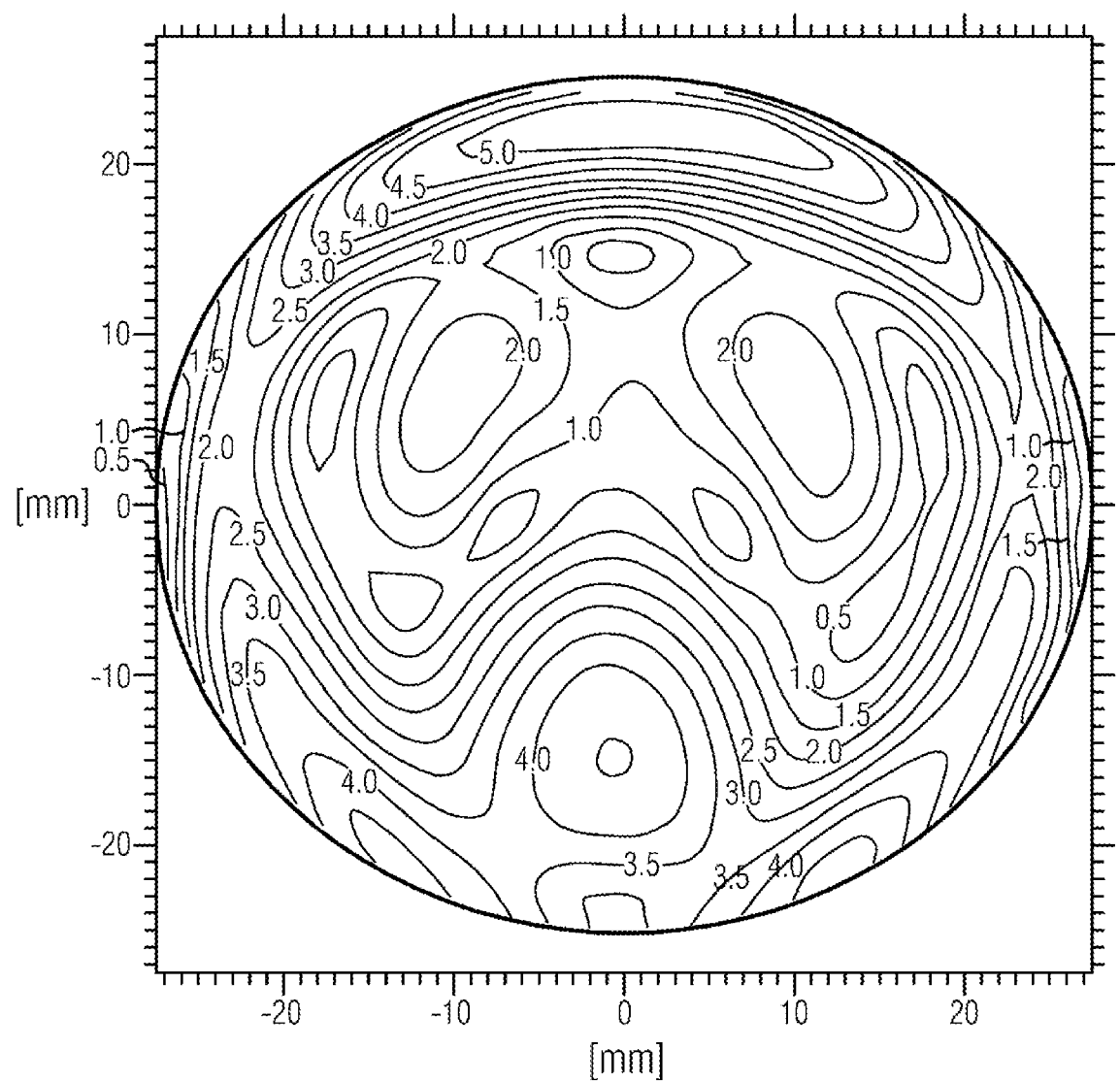
FIG. 14C shows the surface astigmatism object-side surface of the progressive power spectacle lens of FIG. 14A.

FIGS. 14A to 14C show optical properties of the GRIN progressive power spectacle lens according to the third exemplary embodiment, wherein FIG. 14A shows the mean spherical power, FIG. 14B shows the mean surface optical power of the object-side freeform surface, calculated for a refractive index of n=1.600, and FIG. 14C shows the surface astigmatism for n=1.600 of the object-side freeform surface of the GRIN progressive power spectacle lens of FIG. 14A.

Figure 15:
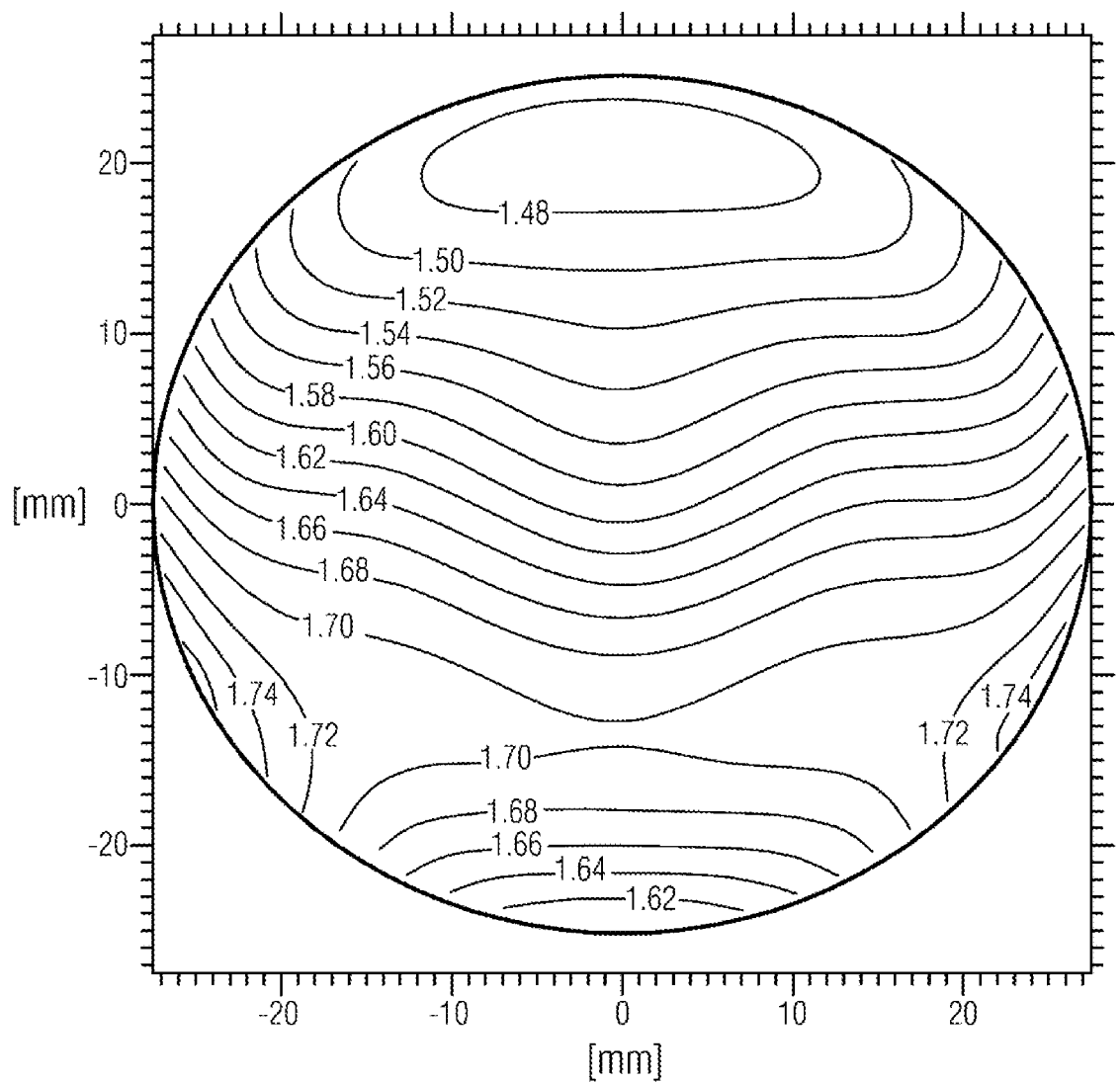
FIG. 15 shows the distribution of the refractive index of the GRIN progressive power spectacle lens according to the third exemplary embodiment.

FIG. 15 shows the distribution of the refractive index of the GRIN progressive power spectacle lens according to the third exemplary embodiment.

Figure 16A:
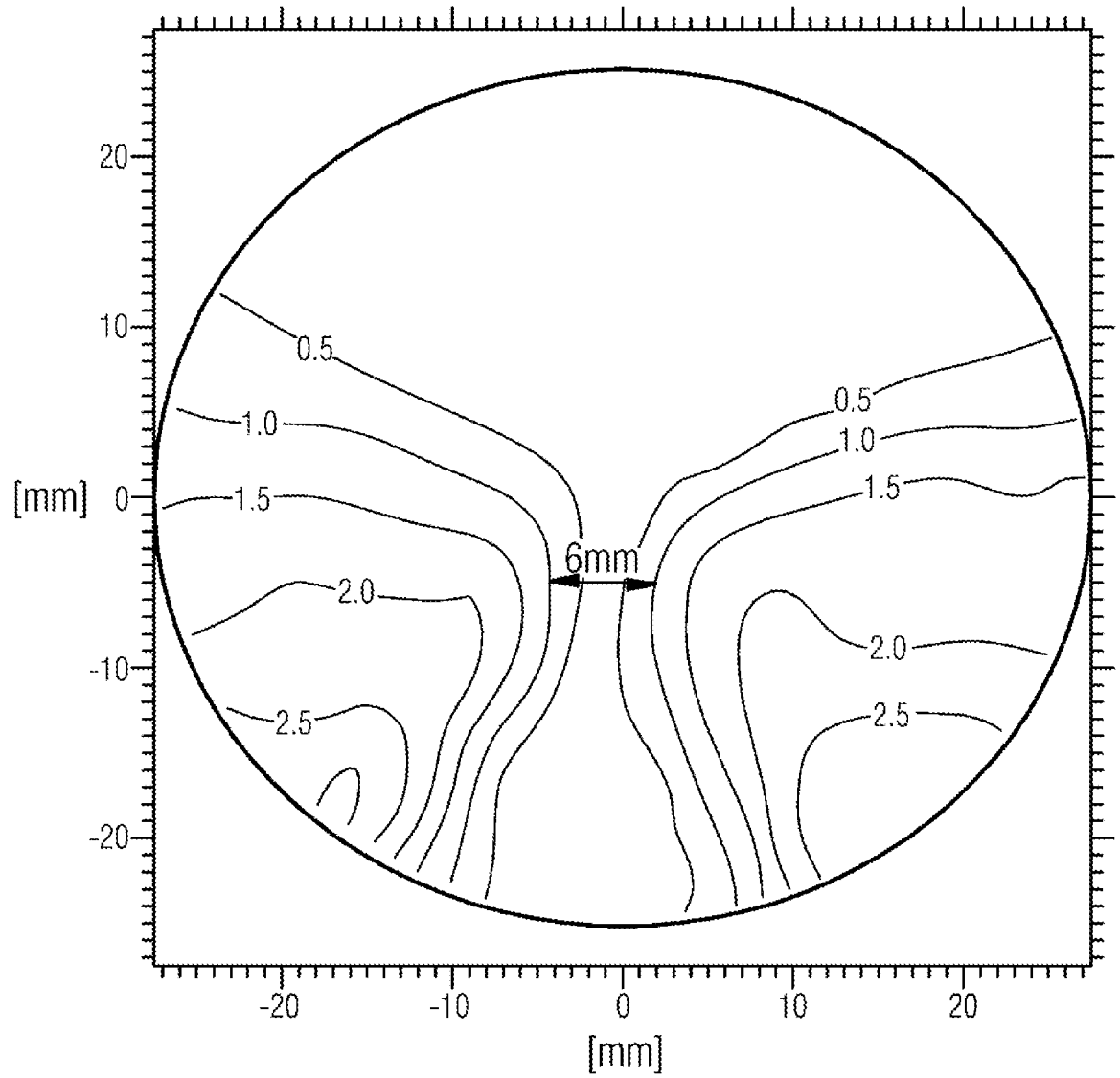
FIG. 16A shows the residual astigmatism distribution of the comparison progressive power spectacle lens.
Figure 16B:
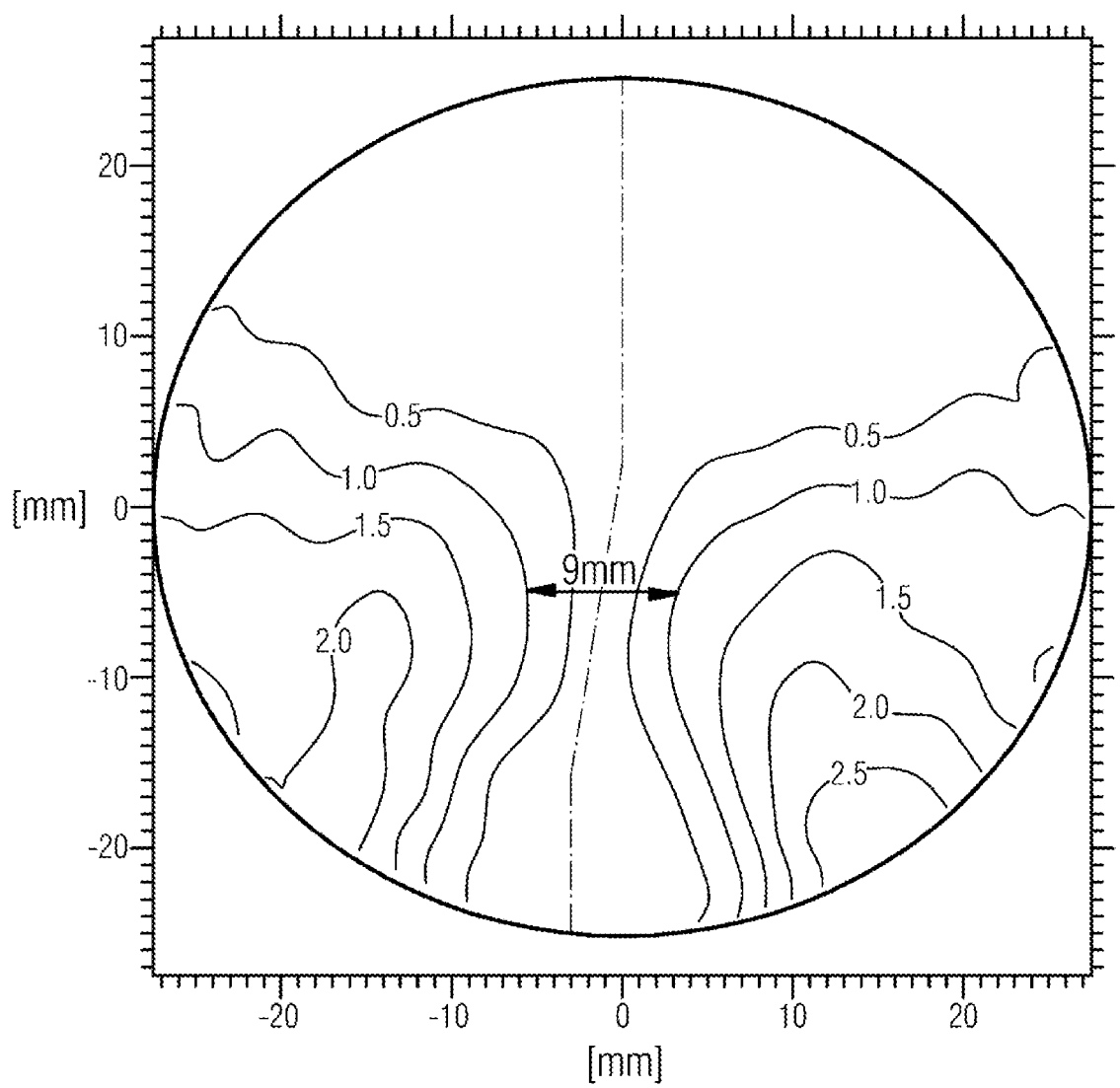
FIG. 16B shows the residual astigmatism distribution of the progressive power spectacle lens according to the third exemplary embodiment.

FIGS. 16A and 16B show a comparison of the residual astigmatism distribution of the GRIN progressive power spectacle lens according to the third exemplary embodiment with the residual astigmatism distribution of the comparison progressive power spectacle lens, wherein FIG. 16A shows the residual astigmatism distribution of the comparison progressive power spectacle lens, and FIG. 16B shows the residual astigmatism distribution of the GRIN progressive power spectacle lens according to the disclosure according to the third exemplary embodiment.

Figure 17A:
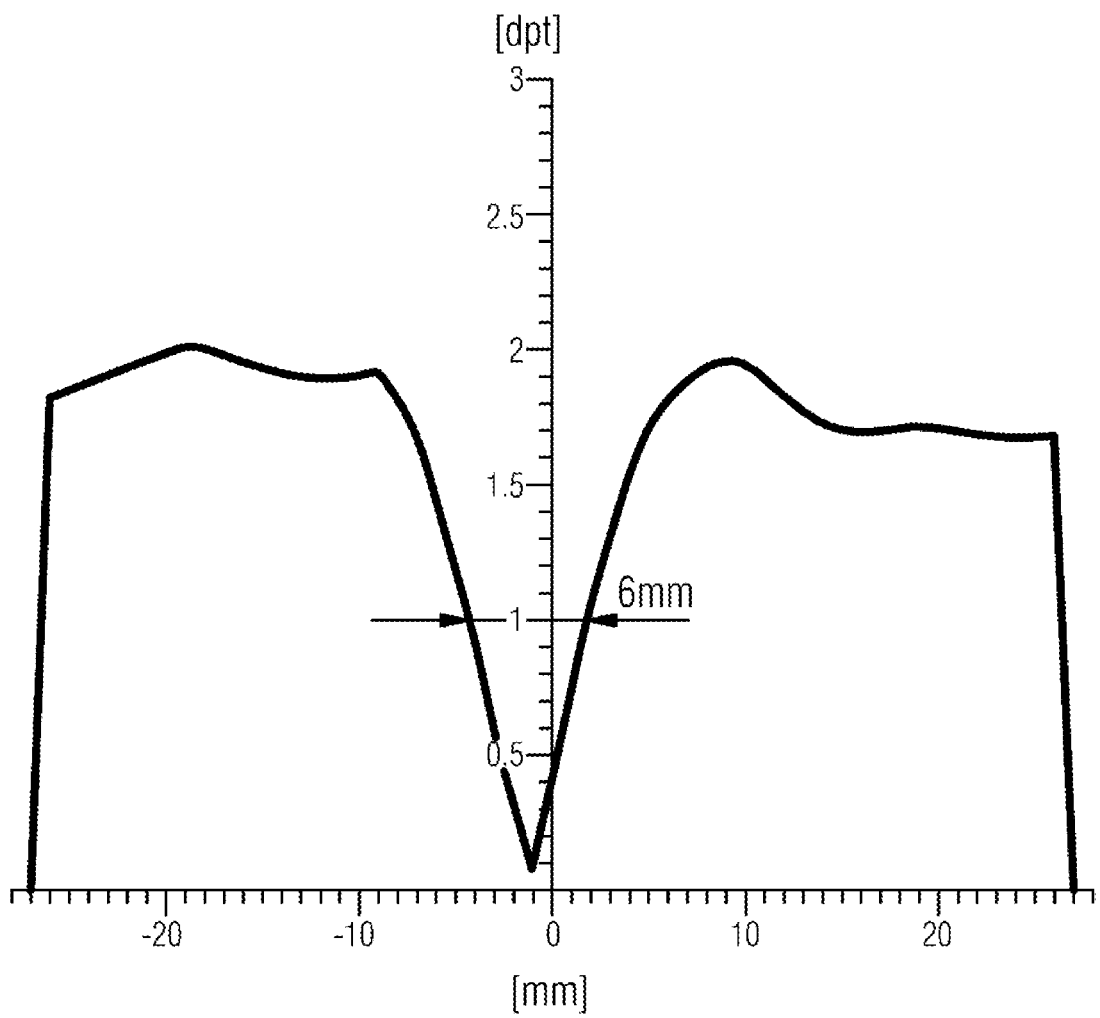
FIG. 17A shows the residual astigmatism profile of the comparison progressive power spectacle lens according to FIG. 16A.
Figure 17B:
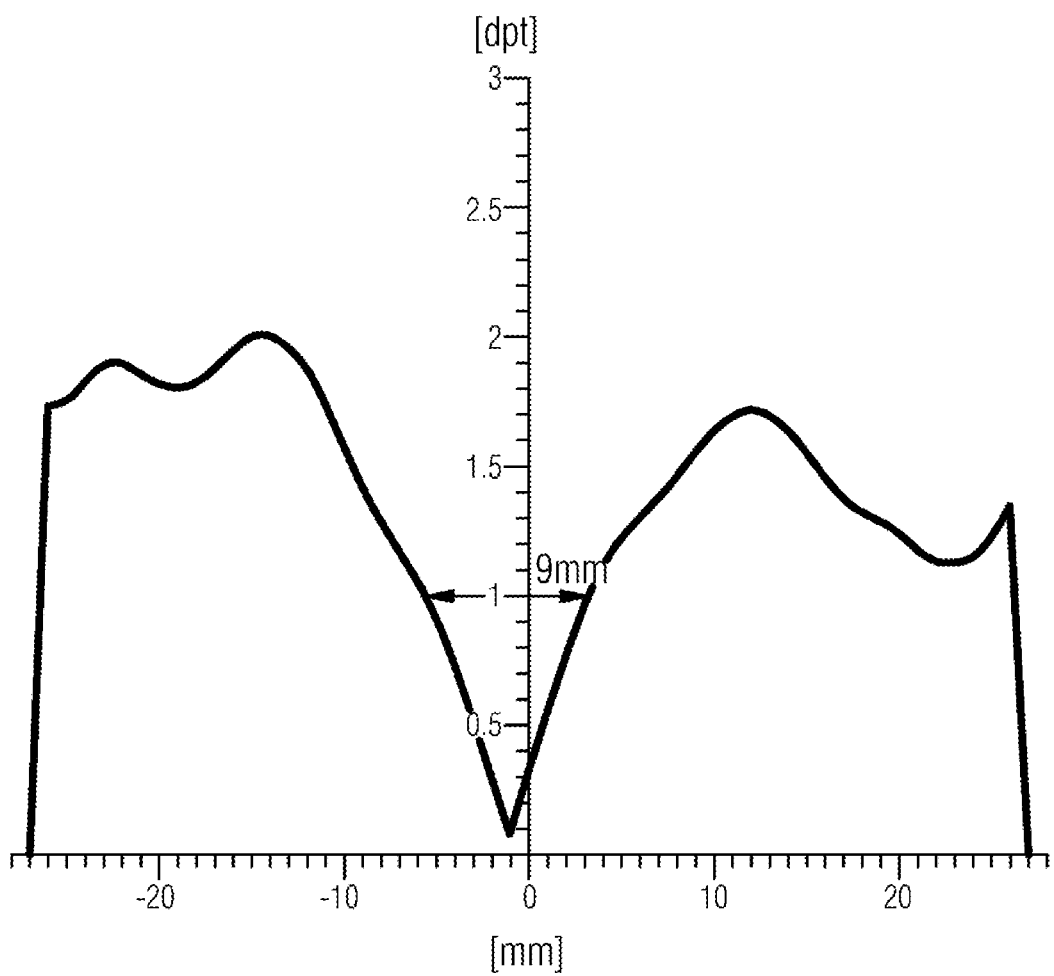
FIG. 17B shows the residual astigmatism profile of the progressive power spectacle lens according to FIG. 16B.

FIGS. 17A and 17B show a comparison of the residual astigmatism profile of the GRIN progressive power spectacle lens according to the third exemplary embodiment with the residual astigmatism profile of the comparison progressive power spectacle lens along a section at y=−5 mm according to FIGS. 16A and 16B, wherein FIG. 17A shows the residual astigmatism profile of the comparison progressive power spectacle lens, and FIG. 17B shows the residual astigmatism profile of the GRIN progressive power spectacle lens according to the disclosure according to the third exemplary embodiment.

FIGS. 18A-1, 18A-2, 18B-1, and 18B-2 show a comparison of the contour of the front surface of the GRIN progressive power spectacle lens according to the third exemplary embodiment with the contour of the front surface of the comparison progressive power spectacle lens, wherein FIGS. 18A-1 and 18A-2 show the sagittal heights of the front surface of the comparison progressive power spectacle lens, and FIGS. 18B-1 and 18B-2 show the sagittal heights of the front surface of the GRIN progressive power spectacle lens according to the disclosure according to the third exemplary embodiment.

Figure 19A:
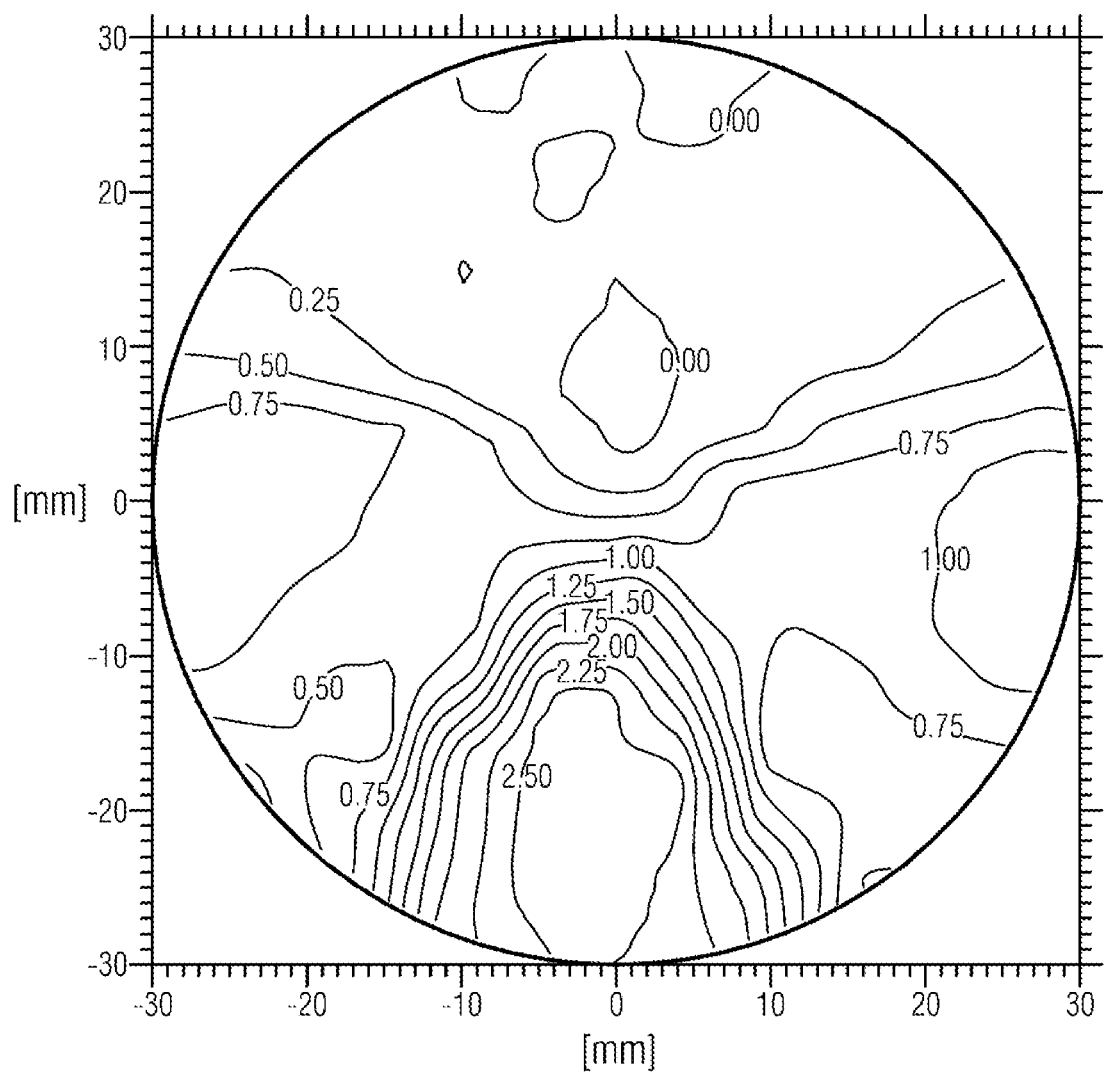
FIG. 19A shows the mean spherical power of a comparison progressive power spectacle lens.
Figure 19B:
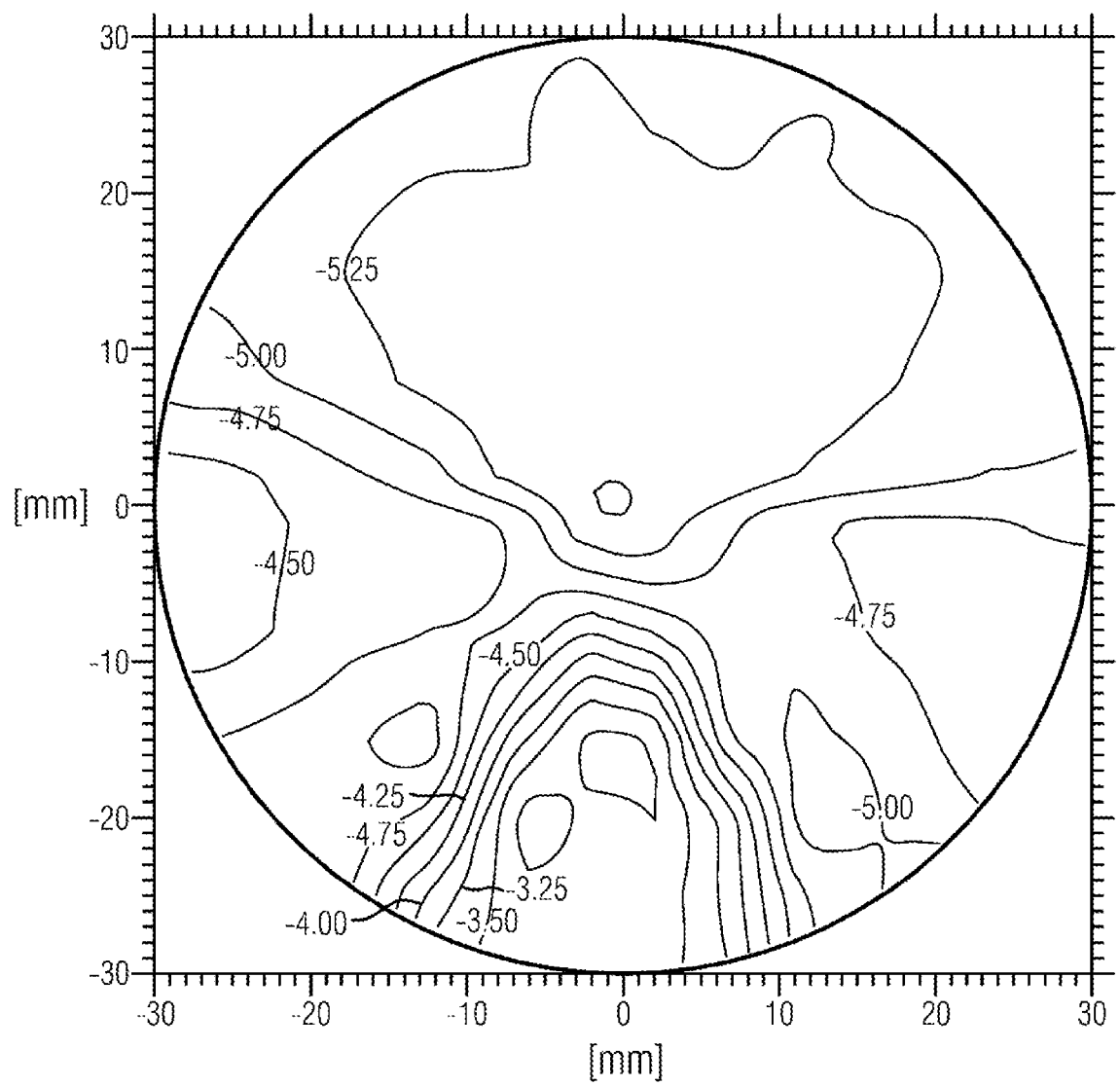
FIG. 19B shows the mean surface optical power of the comparison progressive power spectacle lens, eye-side surface according to FIG. 19A.
Figure 19C:
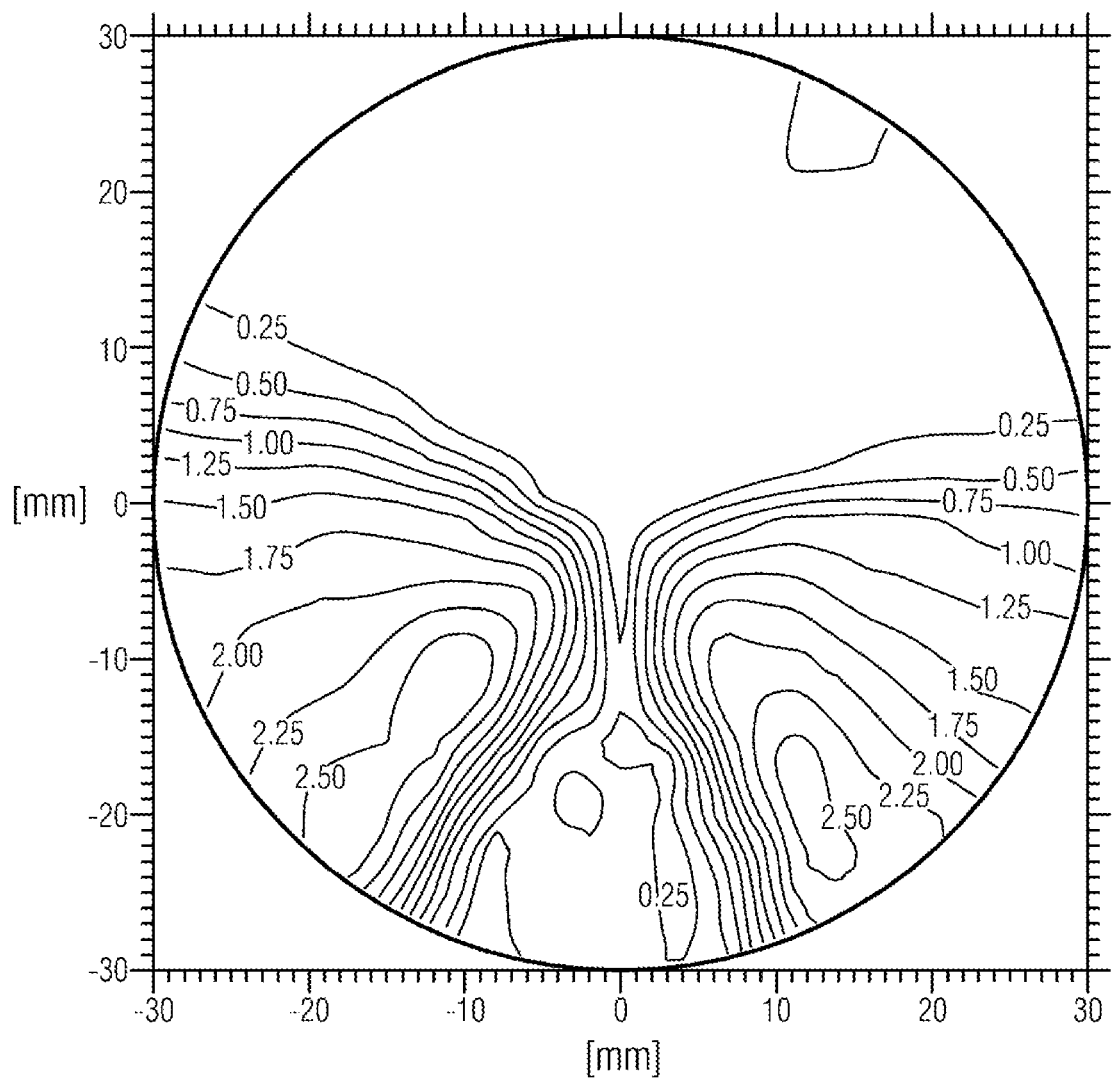
FIG. 19C shows the surface astigmatism of the eye-side surface of the comparison progressive power spectacle lens of FIG. 19A.

FIGS. 19A to 19C show optical properties of a comparison progressive power spectacle lens of conventional construction made of a material with a refractive index of n=1.600 in relation to a GRIN progressive power spectacle lens without any symmetry according to a fourth exemplary embodiment according to the disclosure, wherein FIG. 19A shows the mean spherical power of the comparison progressive power spectacle lens, FIG. 19B shows the mean surface optical power of the comparison progressive power spectacle lens, eye-side freeform surface, and FIG. 19C shows the surface astigmatism of the eye-side freeform surface of the comparison progressive power spectacle lens of FIG. 19A.

Figure 20A:
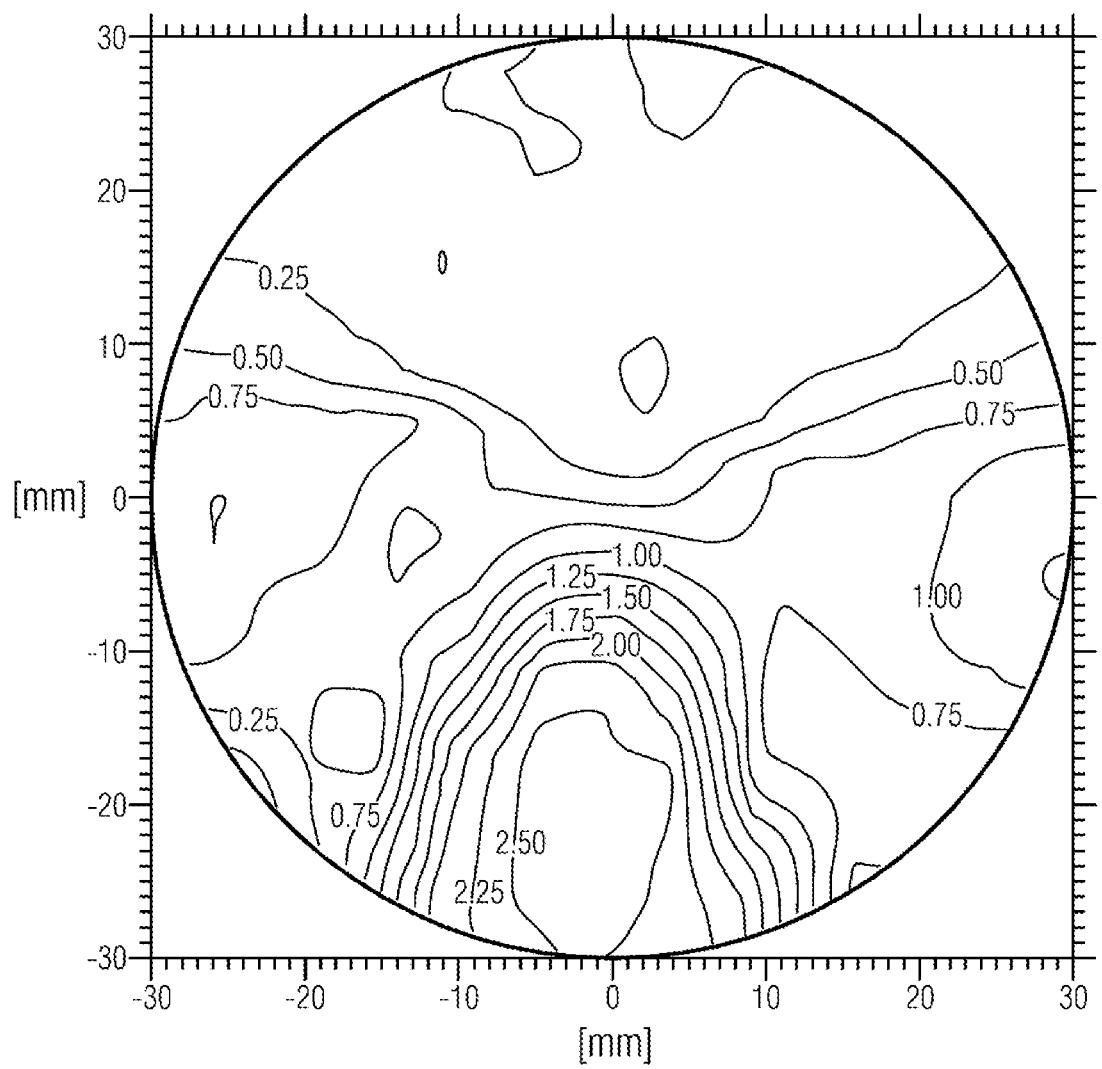
FIG. 20A shows the mean spherical power of the progressive power spectacle lens according to the fourth exemplary embodiment.
Figure 20B:
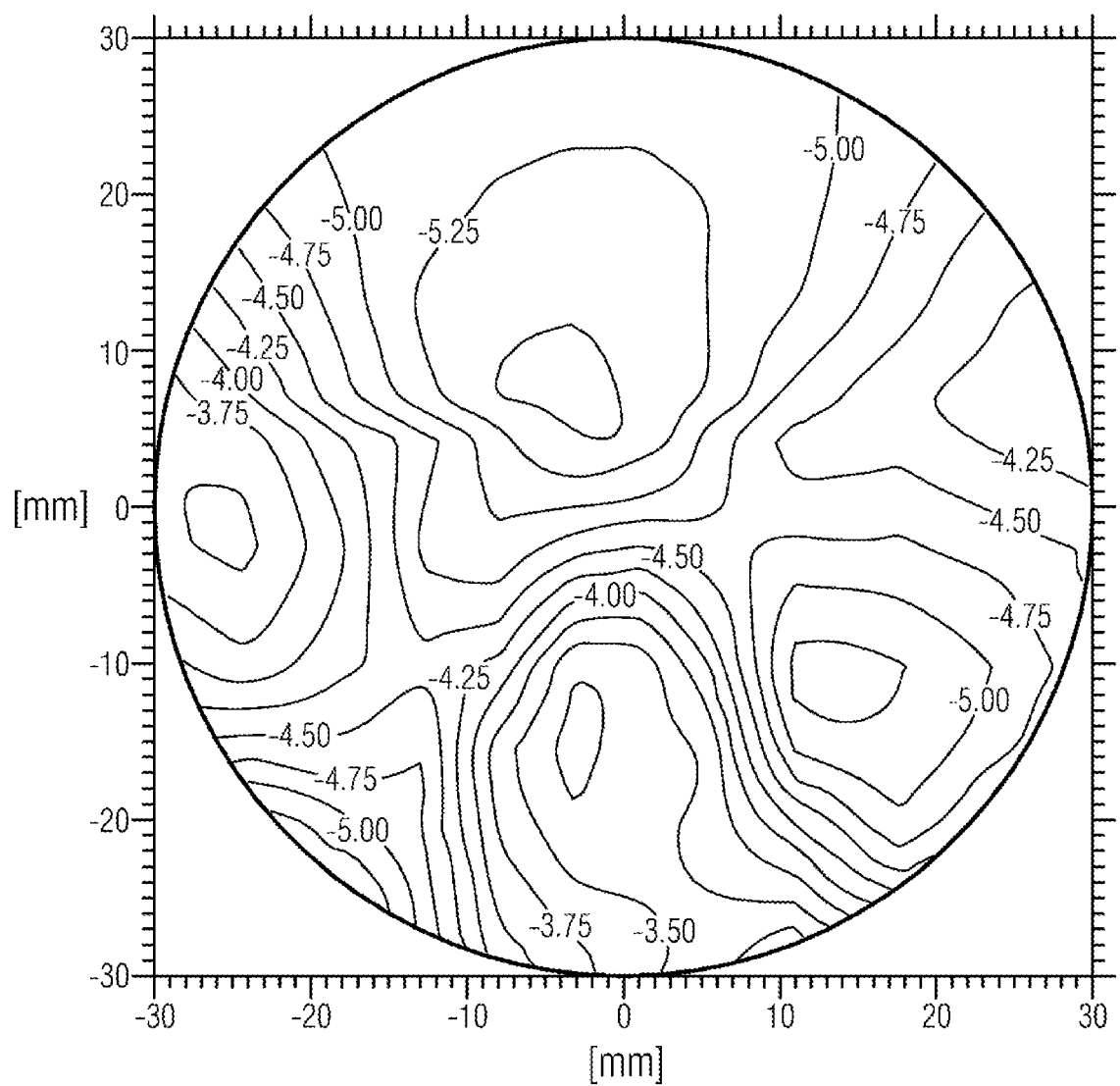
FIG. 20B shows the mean surface optical power of the eye-side surface of the progressive power spectacle lens of FIG. 20A.
Figure 20C:
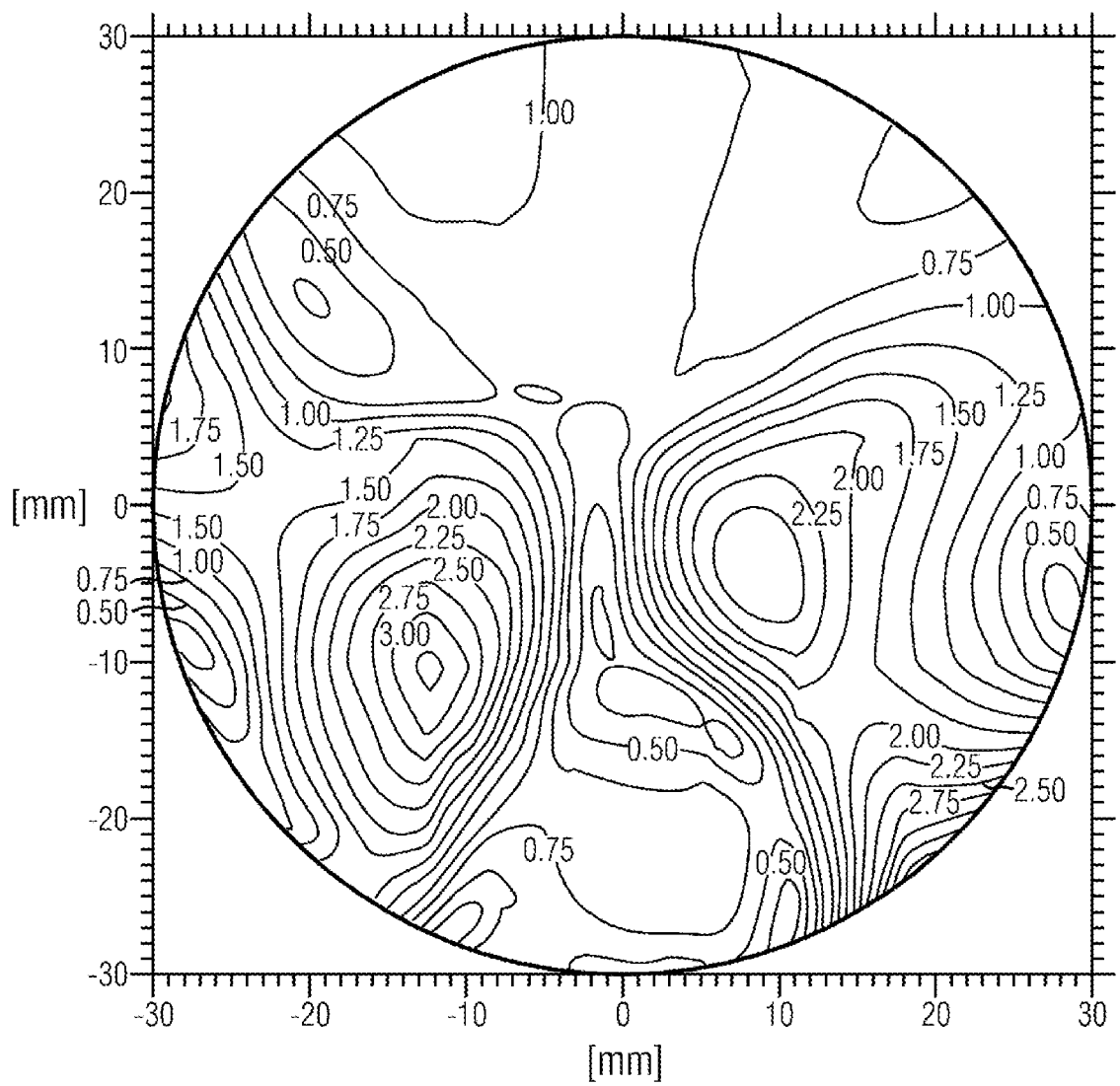
FIG. 20C shows the surface astigmatism of the eye-side surface of the progressive power spectacle lens of FIG. 20A.

FIGS. 20A to 20C show optical properties of the GRIN progressive power spectacle lens according to the fourth exemplary embodiment, wherein FIG. 20 shows the mean spherical power, FIG. 20B shows the mean surface optical power of the eye-side freeform surface, calculated for a refractive index of n=1.600, and FIG. 20C shows the surface astigmatism for n=1.600 of the eye-side freeform surface of the GRIN progressive power spectacle lens of FIG. 20A.

Figure 21:
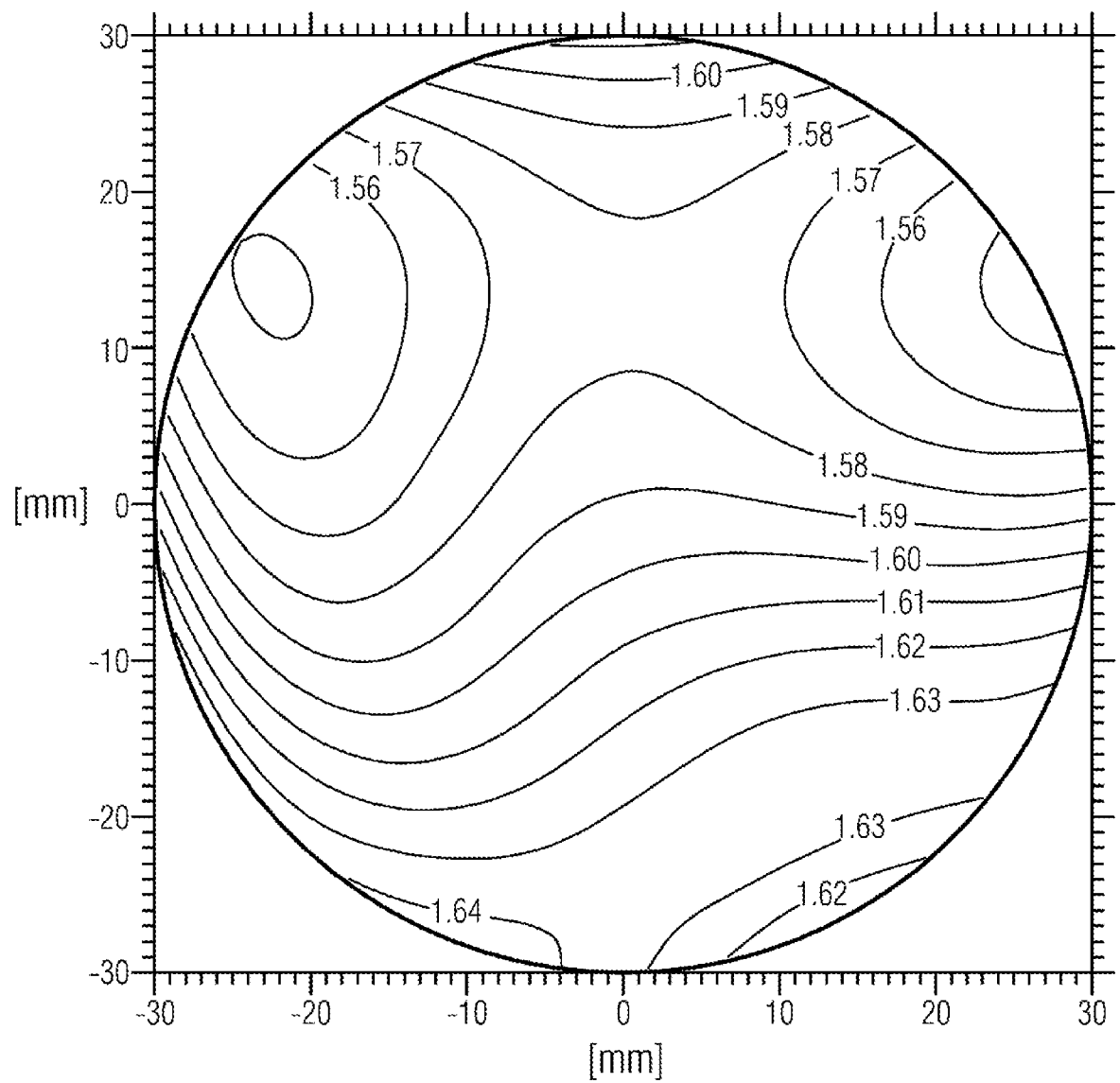
FIG. 21 shows the distribution of the refractive index of the progressive power spectacle lens according to the fourth exemplary embodiment.

FIG. 21 shows the distribution of the refractive index of the GRIN progressive power spectacle lens according to the fourth exemplary embodiment.

Figure 22A:
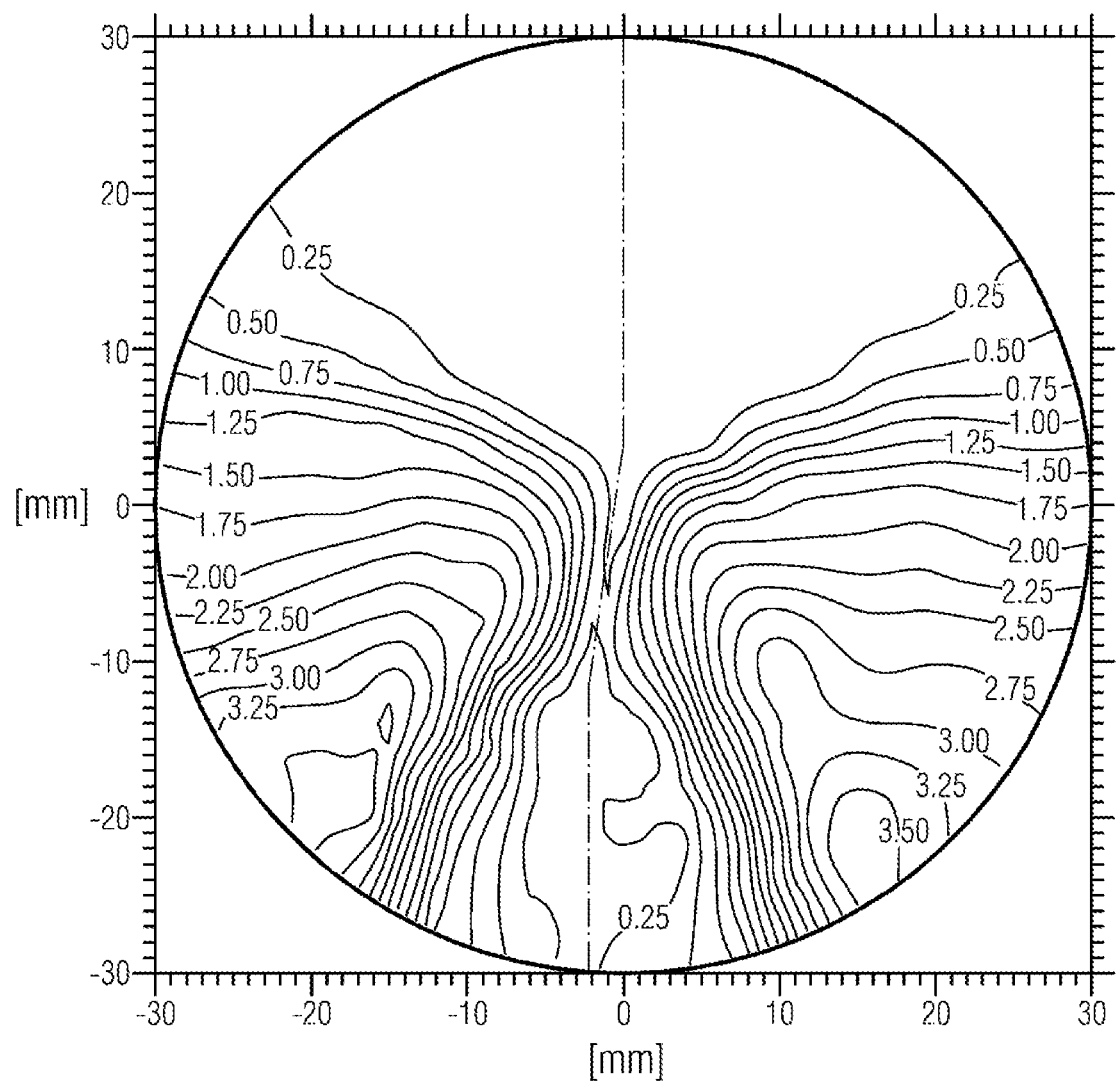
FIG. 22A shows the residual astigmatism distribution of the comparison progressive power spectacle lens.
Figure 22B:
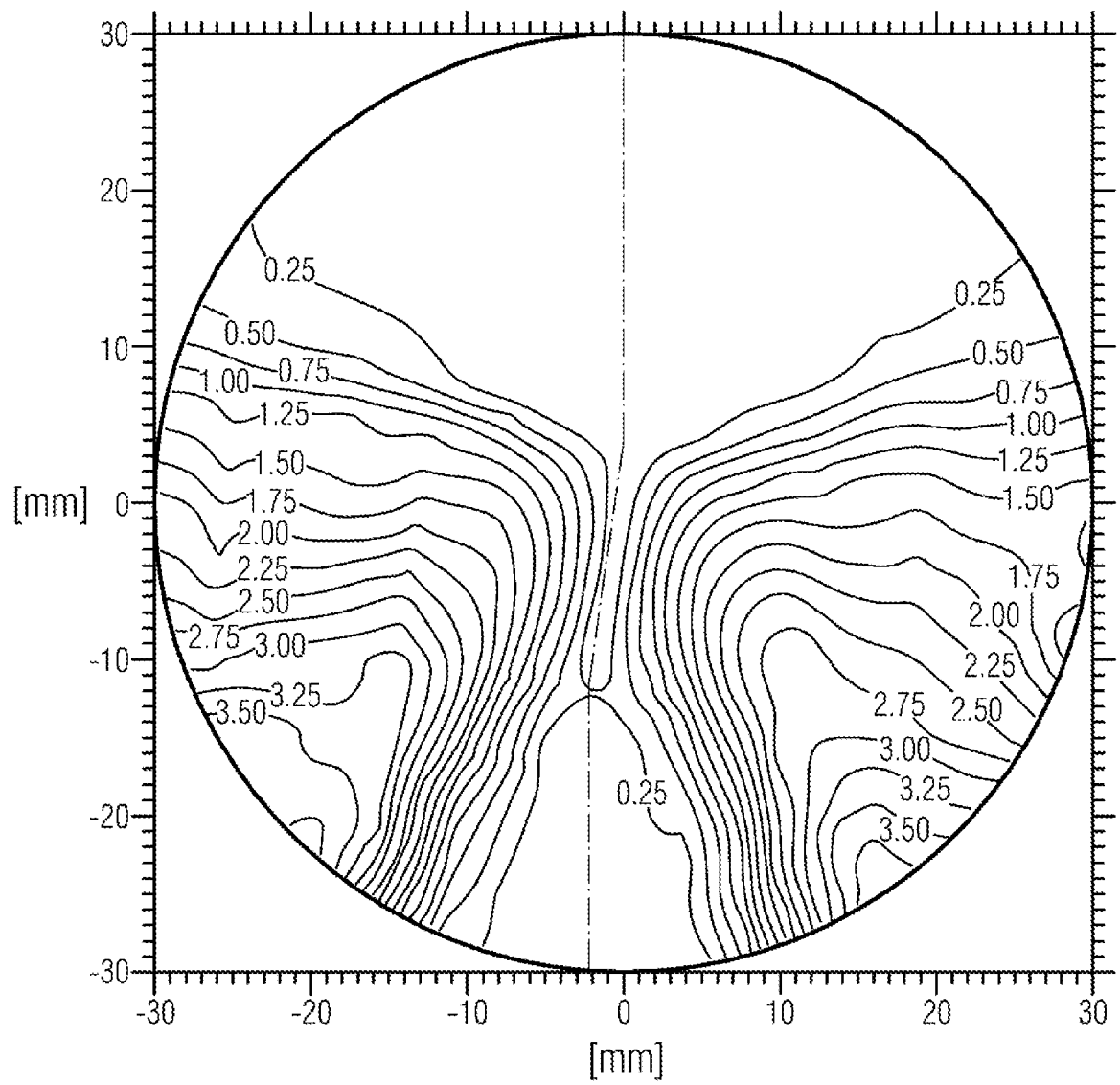
FIG. 22B shows the residual astigmatism distribution of the progressive power spectacle lens according to the fourth exemplary embodiment.

FIGS. 22A and 22B show a comparison of the residual astigmatism distribution of the GRIN progressive power spectacle lens according to the fourth exemplary embodiment with the residual astigmatism distribution of the comparison progressive power spectacle lens, wherein FIG. 22A shows the residual astigmatism distribution of the comparison progressive power spectacle lens, and FIG. 22B shows the residual astigmatism distribution of the GRIN progressive power spectacle lens according to the disclosure according to the fourth exemplary embodiment.

Figure 23A:
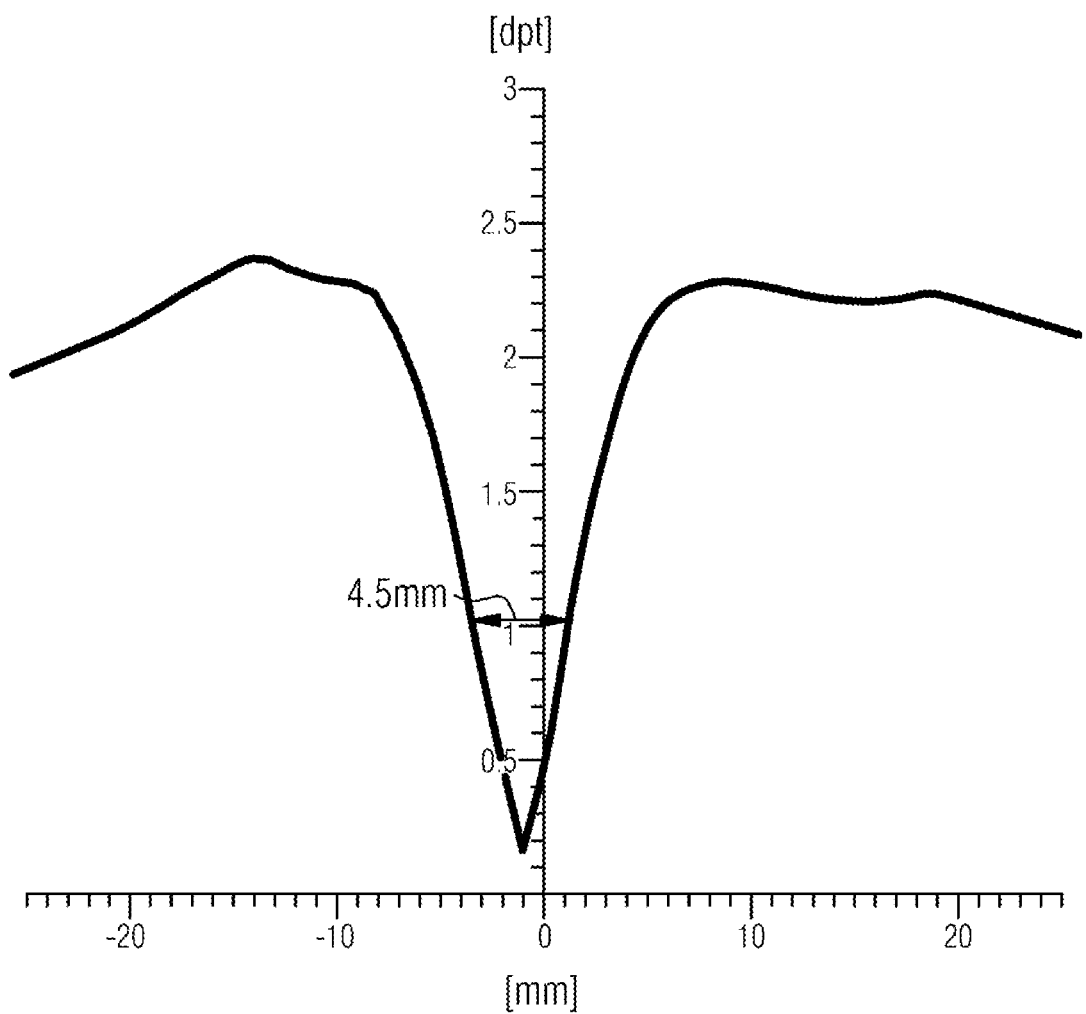
FIG. 23A shows the residual astigmatism profile of the comparison progressive power spectacle lens according to FIG. 22A.
Figure 23B:
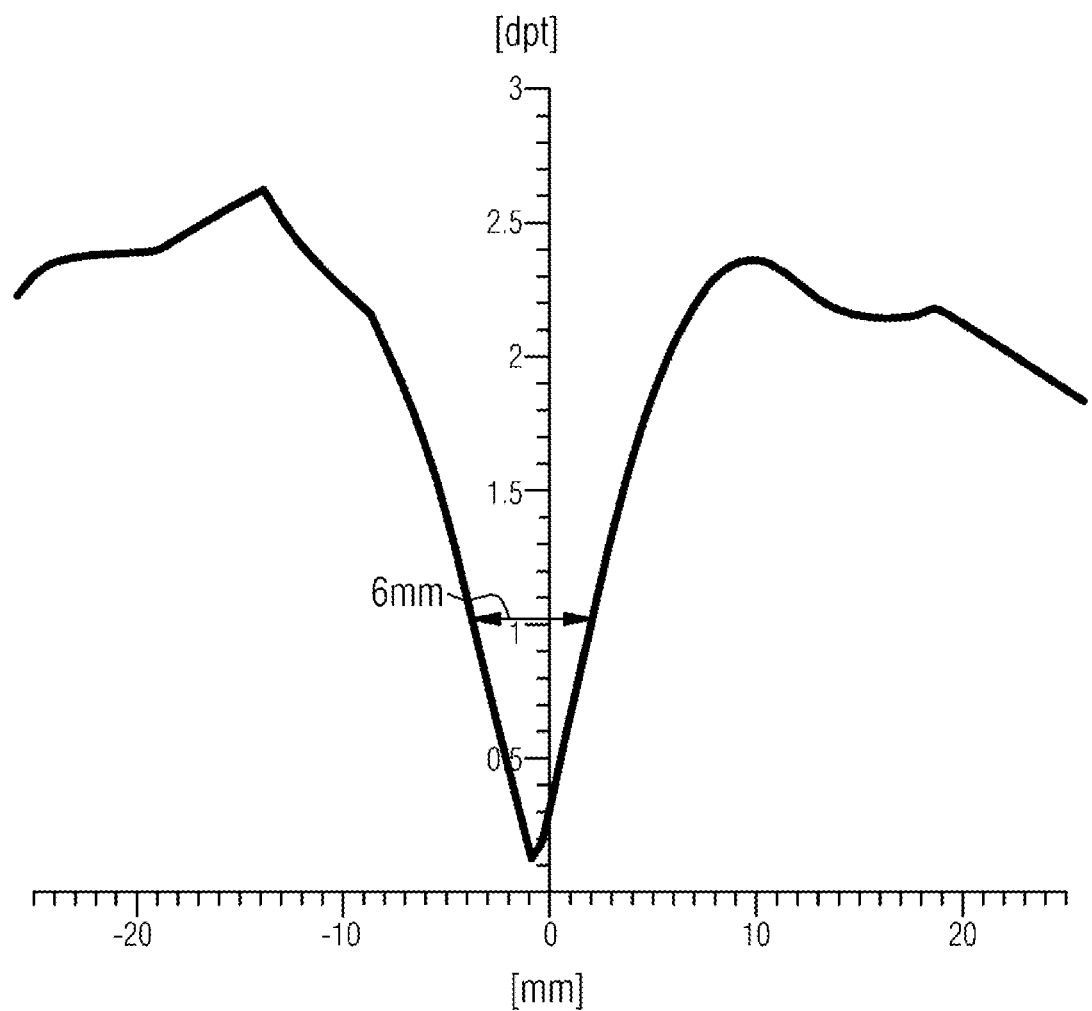
FIG. 23B shows the residual astigmatism profile of the progressive power spectacle lens according to FIG. 22B.

FIGS. 23A and 23B show a comparison of the residual astigmatism profile of the GRIN progressive power spectacle lens according to the fourth exemplary embodiment with the residual astigmatism profile of the comparison progressive power spectacle lens along a section at y=−4 mm according to FIGS. 22A and 22B, wherein FIG. 23A shows the residual astigmatism profile of the comparison progressive power spectacle lens, and FIG. 23B shows the residual astigmatism profile of the GRIN progressive power spectacle lens according to the disclosure according to the fourth exemplary embodiment.

FIGS. 24A-1, 24A-2, 24B-1, and 24B-2 show a comparison of the contour of the back surface of the GRIN progressive power spectacle lens according to the fourth exemplary embodiment with the contour of the back surface of the comparison progressive power spectacle lens, wherein FIGS. 24A-1 and 24A-2 show the sagittal heights of the back surface of the comparison progressive power spectacle lens, and FIGS. 24B-1 and 24B-2 show the sagittal heights of the back surface of the GRIN progressive power spectacle lens according to the disclosure according to the fourth exemplary embodiment.

Figure 25A:
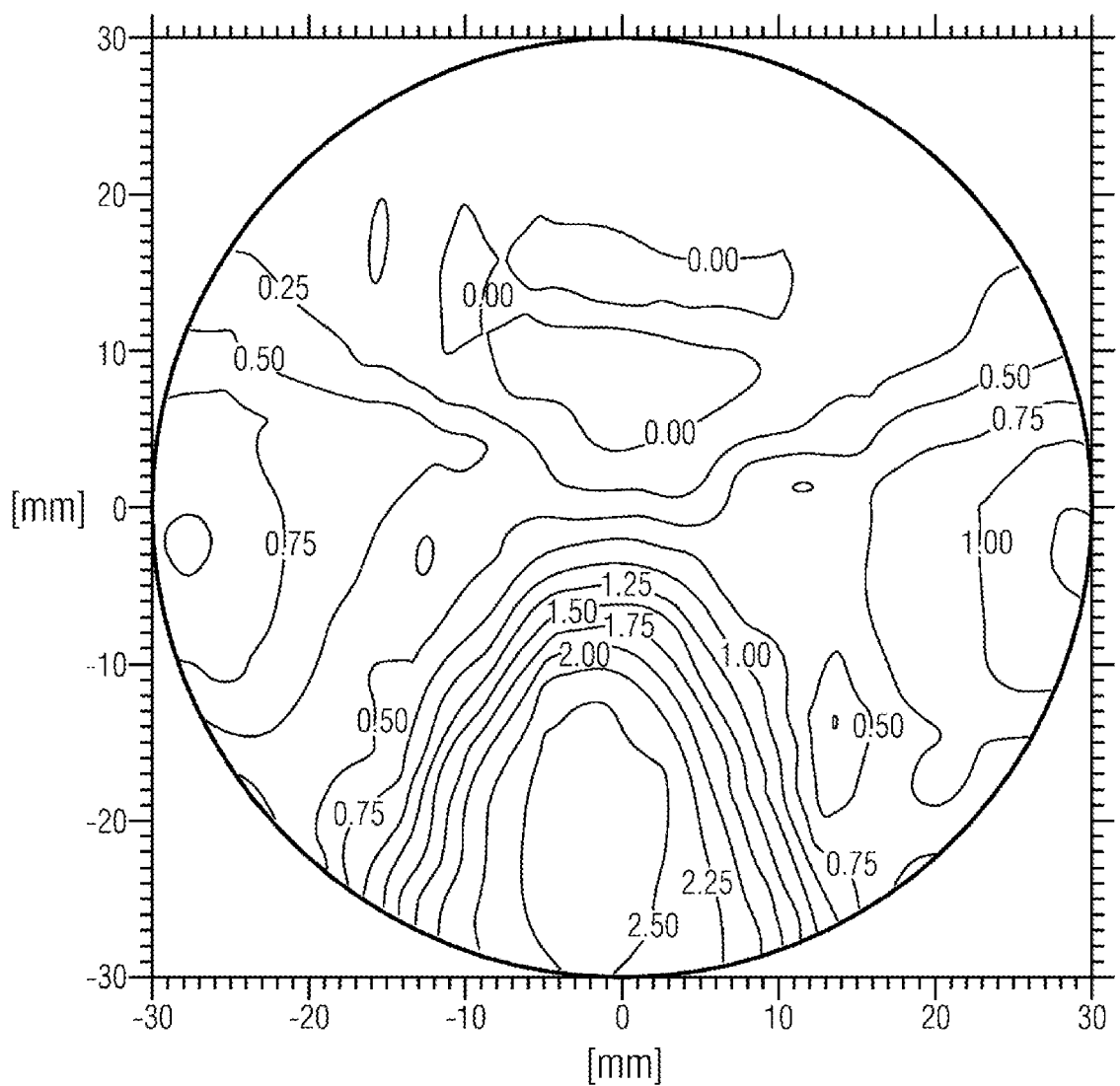
FIG. 25A shows the mean spherical power of the progressive power spectacle lens according to the fifth exemplary embodiment.
Figure 25B:
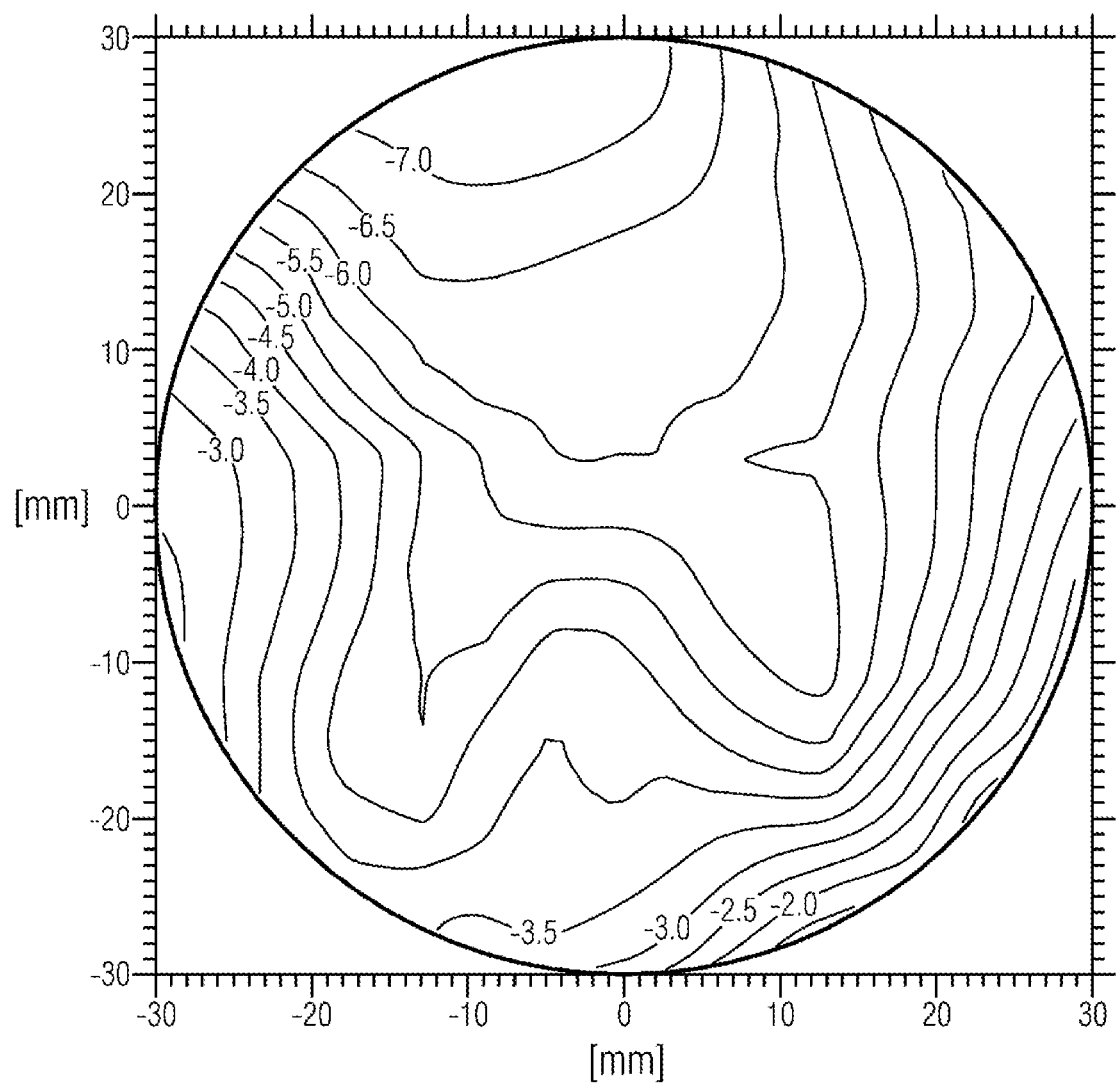
FIG. 25B shows the mean surface optical power of the eye-side surface of the progressive power spectacle lens of FIG. 25A.
Figure 25C:
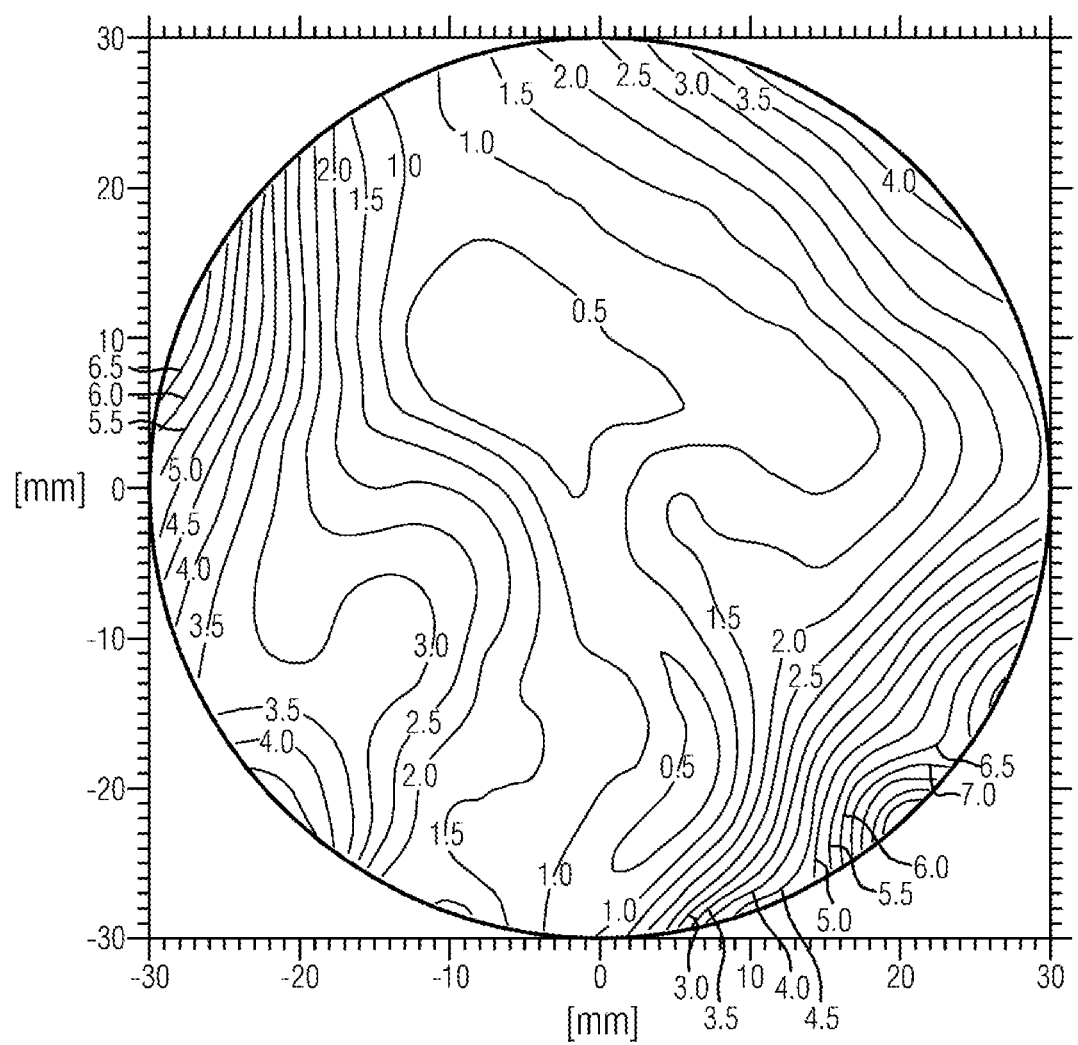
FIG. 25C shows the surface astigmatism of the eye-side surface of the progressive power spectacle lens of FIG. 25A.
Figure 26:
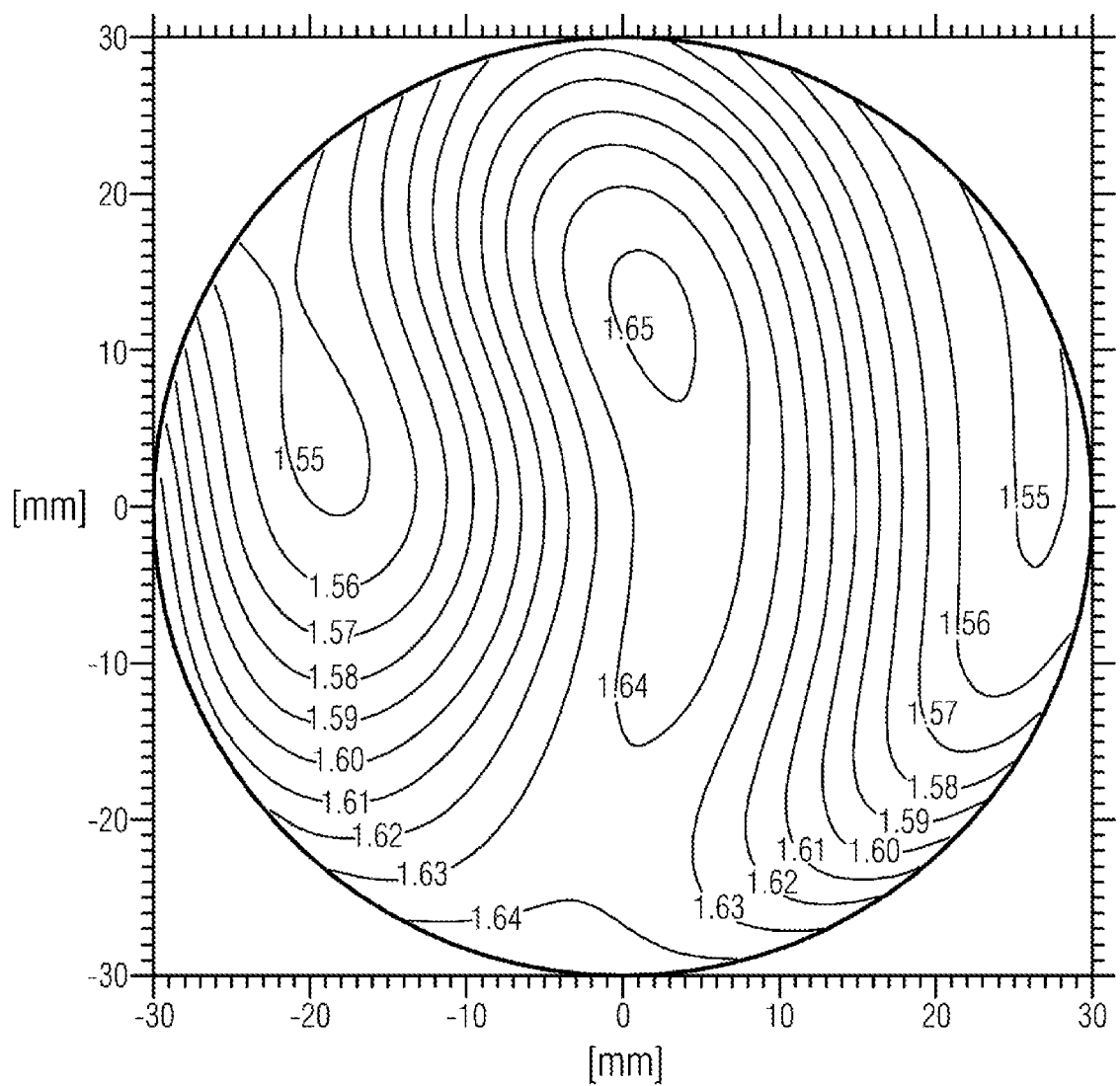
FIG. 26 shows the distribution of the refractive index of the progressive power spectacle lens according to the fifth exemplary embodiment.

FIGS. 25A to 25C show optical properties of the GRIN progressive power spectacle lens without any symmetry according to the fifth exemplary embodiment, designed for the prescription values sphere −4 dpt, cylinder 2 dpt, axis 90 degrees, wherein FIG. 25A shows the mean spherical power, FIG. 25B shows the mean surface optical power of the eye-side freeform surface, calculated for a refractive index of n=1.600, and FIG. 25C shows the surface astigmatism for n=1.600 of the eye-side freeform surface of the GRIN progressive power spectacle lens of FIG. 25A FIG. 26 shows the distribution of the refractive index of the GRIN progressive power spectacle lens according to the fifth exemplary embodiment.

Figure 27A:
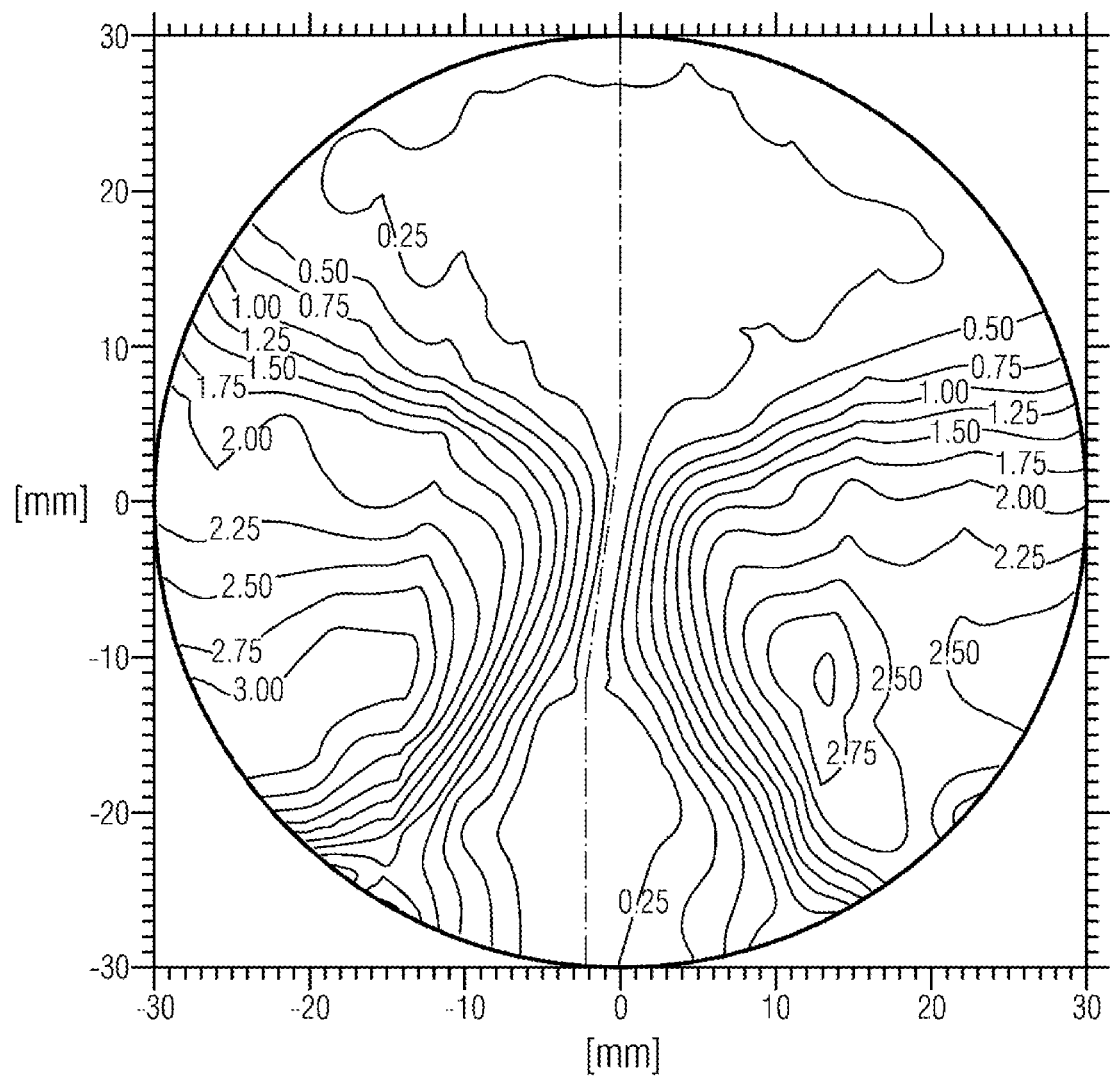
FIG. 27A shows the residual astigmatism distribution of the progressive power spectacle lens according to the fifth exemplary embodiment.
Figure 27B:
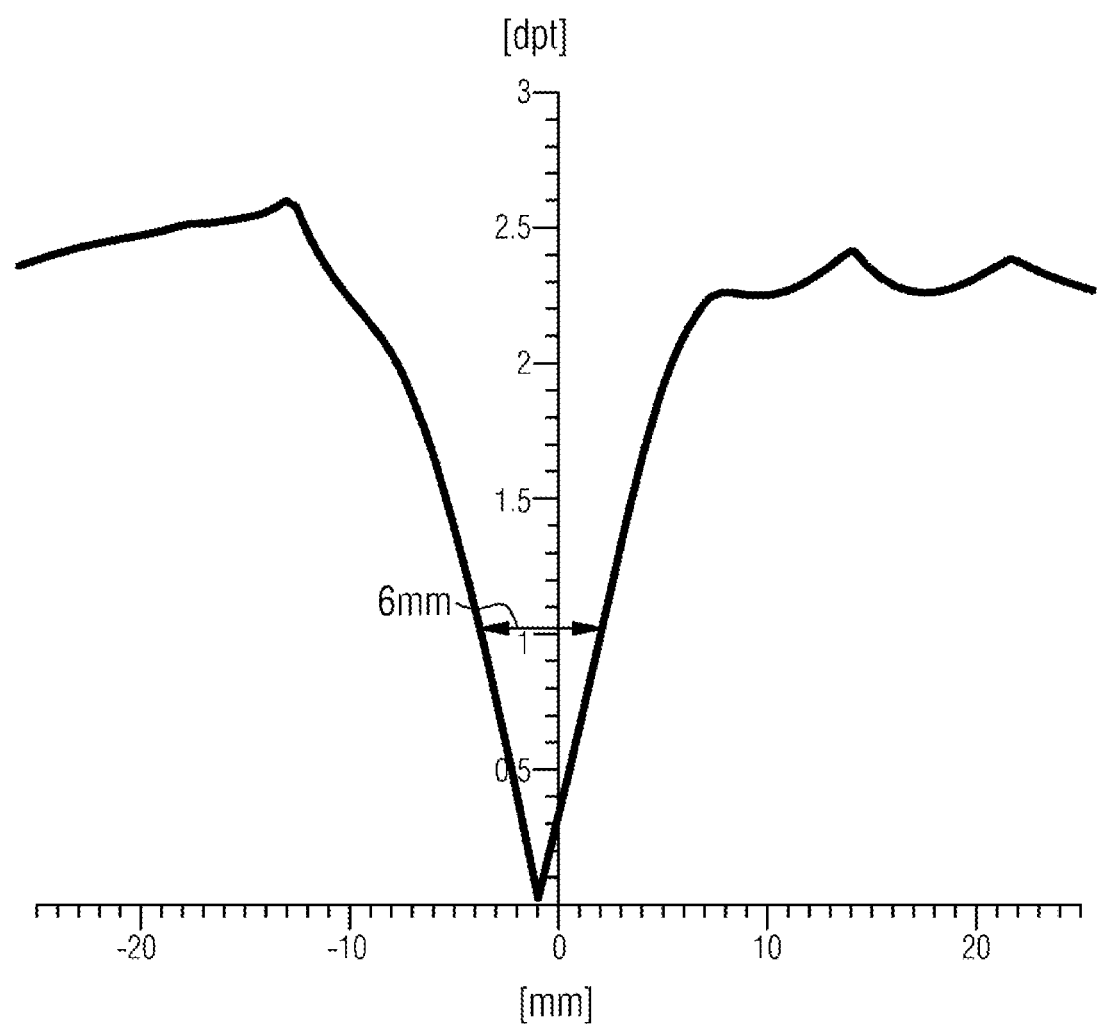
FIG. 27B shows the residual astigmatism profile along a section of the progressive power spectacle lens according to the fifth exemplary embodiment.

FIGS. 27A and B show residual astigmatism of the GRIN progressive power spectacle lens according to the fifth exemplary embodiment, wherein FIG. 27A shows the residual astigmatism distribution of the GRIN progressive power spectacle lens according to the disclosure according to the fifth exemplary embodiment, and FIG. 27B shows the residual astigmatism profile along a section at y=−4 mm of the GRIN progressive power spectacle lens according to the disclosure according to the fifth exemplary embodiment.

FIGS. 28-1 and 28-2 show sagittal heights of the back surface of the GRIN progressive power spectacle lens according to the disclosure according to the fifth exemplary embodiment.

The first five exemplary embodiments relate to GRIN progressive power spectacle lenses or the representation thereof in a memory of a computer according to a product of the type according to the disclosure. The sixth exemplary embodiment shows, in exemplary fashion, a method according to the disclosure for planning a GRIN progressive power spectacle lens.

First Exemplary Embodiment

A progressive power spectacle lens with a particularly simple surface geometry is chosen in the first example. It is constructed in mirror symmetric fashion in relation to a plane perpendicular to the plane of the drawing and substantially only consists of a zone with continuously increasing power that is arranged in a central region and extends perpendicularly from top to bottom.

FIG. 1A shows the distribution of the mean spherical power in the beam path for the spectacle wearer for a progressive power spectacle lens made of a standard material (refractive index n=1.600) with an object-side freeform surface, which is described by so-called bicubic splines. This progressive power spectacle lens serves as a comparison progressive power spectacle lens for a progressive power spectacle lens embodied according to the disclosure, which is referred to below as a GRIN progressive power spectacle lens on account of its spatially varying refractive index.

The back side of the comparison progressive power spectacle lens is a spherical surface with a radius of 120 mm and the center of rotation of the eye lies behind the geometric center of the lens at a distance of 25.5 mm from the back surface. The lens has a central thickness of 2.5 mm and a prismatic power of 0 at the geometric center. The back surface is untilted, i.e., both front surface and back surface have a normal in the direction of the horizontally straight-ahead direction of view at the geometric center.

The plotted coordinate axes x and y serve to determine points on this surface. On the perpendicular central axis of the lens, the power exceeds the 0.00 diopter at a height of approximately y=25 mm; a power of 2.25 dpt (diopter) is reached at approximately y=−25 mm. Accordingly, the lens power increases by 2.25 diopter along this length of 50 mm. Accordingly, the progressive power spectacle lens has no spherical power (sphere=0) and no astigmatic power (cylinder=0) in the distance portion and an addition of 2.25 dpt for the spectacle wearer in the intended use position. According to section 11.1 of DIN EN ISO 13666:2013-10, a spectacle lens with spherical power is a lens which brings a paraxial pencil of parallel light to a single focus. According to section 12.1 of DIN EN ISO 13666:2013-10, a spectacle lens with astigmatic power is a lens bringing a paraxial pencil of parallel light to two separate line foci mutually at right angles and hence having vertex power in only the two principal meridians. Section 14.2.1 of this standard defines the addition as difference between the vertex power of the near portion and the vertex power of the distance portion.

FIG. 1B shows the mean surface optical power for n=1.600 of the object-side freeform surface of the comparison progressive power spectacle lens of FIG. 1A. The surface curvature increases continuously from top to bottom;

the mean surface power value increases from approximately 5.3 dpt at y=15 mm to approximately 7.0 dpt at y=−25 mm.

FIG. 1C shows the surface astigmatism for n=1.600 of the object-side freeform surface of the comparison progressive power spectacle lens of FIG. 1A.

FIGS. 2A, 2B and 2C show the reproduction of the comparison progressive power spectacle lens using a GRIN material. In this respect, FIG. 2A shows the distribution of the mean spherical power. From the comparison of FIG. 1A and FIG. 2A, it is possible to gather that the power distribution of the two progressive power spectacle lenses is the same. FIG. 2B illustrates the profile of the mean surface optical power and FIG. 2C illustrates the profile of the surface astigmatism of the front surface of the GRIN progressive power spectacle lens embodied according to the disclosure. In order to allow a comparison with FIG. 1B in respect of the mean curvatures and with FIG. 1C in respect of the surface astigmatism, it was not the GRIN material that was used when calculating the mean surface optical power and the surface astigmatism but, like previously, the material with the refractive index of n=1.600.

The mean surface optical power and the surface astigmatism are defined according to Heinz Diepes, Ralf Blendowske: Optik and Technik der Brille; 2nd edition, Heidelberg 2005, page 256.

The comparison of FIGS. 2B and 2C with FIGS. 1B and 1C shows that the form of the freeform surface has changed significantly: The mean surface optical power (calculated with n=1.600) now decreases from top to bottom, i.e., the mean curvature of the surface reduces from top to bottom. The profile of the surface astigmatism no longer exhibits a typical intermediate corridor.

FIG. 3 shows the distribution of the refractive index over the GRIN progressive power spectacle lens according to the disclosure. Here, the refractive index increases from top to bottom from approximately n=1.48 to approximately n=1.75 in the lower region.

FIG. 4A and FIG. 4B represent the effects of using the GRIN material with its specific refractive index distribution and of the design of the freeform surface for this GRIN progressive power spectacle lens on the width of the intermediate corridor in comparison with the standard lens. The FIGS. show the distribution of the residual astigmatic aberration in the beam path for the spectacle wearer, for a spectacle wearer with only a prescription for sphere.

In this example, the intermediate corridor, defined here by the isoastigmatism line of 1 dpt, is widened from 17 mm to 22 mm, i.e., by approximately 30 percent.

FIG. 5A and FIG. 5B show cross sections through the residual astigmatism distributions from FIG. 4A and FIG. 4B. Here, the conventional relationship between increasing power and the lateral increase in the astigmatic aberration induced thereby (similar to the relationship of the mean surface optical power to the surface astigmatism according to Minkwitz's theorem) becomes particularly clear. The increase of the astigmatism in the surroundings of the center of the intermediate corridor (y=0) is significantly lower for the GRIN lens, even though the same power increase is present as in the standard lens. Precisely this increase is explained by Minkwitz's statement in the theory of optics of progressive power lenses.

FIGS. 6A and 6B compare the contour of the front surface of the GRIN progressive power spectacle lens according to the first exemplary embodiment with the contour of the front surface of the comparison progressive power spectacle lens with the aid of a sagittal height representation. FIG. 6B shows the sagittal heights of the front surface of the GRIN progressive power spectacle lens according to the disclosure according to the first exemplary embodiment and, in comparison therewith, FIG. 6A shows the sagittal heights of the front surface of the comparison progressive power spectacle lens.

Second Exemplary Embodiment

All of the following figures correspond in subject matter and sequence to those of the first exemplary embodiment.

FIG. 7A shows the distribution of the mean spherical power in the beam path for the progressive power spectacle wearer for a comparison progressive power spectacle lens made of a standard material (refractive index n=1.600) with an object-side freeform surface. The back side is, again, a spherical surface with a radius of 120 mm and the center of rotation of the eye lies 4 mm above the geometric center of the comparison progressive power spectacle lens at a horizontal distance of 25.8 mm from the back surface. The comparison progressive power spectacle lens has a central thickness of 2.6 mm and a prismatic power 1.0 cm/m base 270°, 2 mm below the geometric center. The back surface is tilted through −8° about the horizontal axis.

The plotted coordinate axes serve to determine points on this surface. On the perpendicular central axis of the comparison progressive power spectacle lens, the power exceeds the 0.00 diopter line at a height of approximately y=6 mm (i.e., the spectacle wearer obtains virtually a power of 0 dpt when gazing horizontally straight-ahead); a power of 2.00 diopters is achieved at approximately y=−14 mm. Accordingly, the lens power increases by 2.00 dpt along this length of 20 mm.

FIG. 7B shows the mean surface optical power for n=1.600 of the object-side freeform surface of the comparison progressive power spectacle lens of FIG. 7A. The surface curvature increases continuously from top to bottom; the mean surface power value increases from 5.00 dpt at y=2 mm to 6.75 dpt at y=−18 mm.

FIG. 7C shows the surface astigmatism for n=1.600 of the object-side freeform surface of the comparison progressive power spectacle lens of FIG. 7A.

FIGS. 8A, 8B, and 8C show the reproduction of the comparison progressive power spectacle lens using a GRIN material (progressive power spectacle lens according to the disclosure). In this respect, FIG. 8A shows the distribution of the mean spherical power. From the comparison of FIGS. 7A and 8A, it is possible to gather that the power increase along the perpendicular central line of the two lenses is the same. FIG. 8B illustrates the profile of the mean surface optical power and FIG. 8C illustrates the profile of the surface astigmatism of the front surface of the GRIN progressive power spectacle lens according to the disclosure. In order to allow a comparison with FIG. 7B in respect of the mean curvatures and with FIG. 7C in respect of the surface astigmatism, it was not the GRIN material that was used during the calculation but, like previously, the material with the refractive index of n=1.600.

The comparison of FIGS. 8B and 8C with FIGS. 7B and 7C shows that the form of the freeform surface has changed significantly: the mean surface optical power (calculated with n=1.600) now decreases from the lens center to the edge in irregular fashion. The profile of the surface astigmatism no longer exhibits a typical intermediate corridor.

FIG. 9 shows the distribution of the refractive index over the spectacle lens. Here, the refractive index increases from approximately 1.60 in the center of the lens to approximately n=1.70 in the lower region.

FIG. 10A and FIG. 10B represent the effects of using the GRIN material with its specific refractive index distribution and of the design of the freeform surface for this GRIN progressive power spectacle lens on the width of the intermediate corridor in comparison with the comparison progressive power spectacle lens. FIG. 10A and FIG. 10B show the distribution of the residual astigmatic aberrations in the beam path for the spectacle wearer, for a spectacle wearer with only a prescription for sphere.

In this exemplary embodiment, the intermediate corridor, defined here by the isoastigmatism line of 1 dpt, is widened from 8.5 mm to 12 mm, i.e., by approximately 41 percent.

FIG. 11A and FIG. 11B show cross sections through the residual astigmatism distributions from FIG. 10A and FIG. 10B. Here, the conventional relationship between increasing power and the lateral increase in the astigmatic aberration induced thereby (similar to the relationship of the mean surface optical power to the surface astigmatism according to Minkwitz's theorem) becomes particularly clear. The increase of the astigmatism in the surroundings of the center of the intermediate corridor (y=−5 mm) is significantly lower for the GRIN progressive power spectacle lens according to the disclosure, even though the same power increase is present as in the comparison progressive power spectacle lens. In a manner analogous to the first exemplary embodiment, there is a significant deviation of the astigmatism gradient of the GRIN progressive power spectacle lens from the behavior predicted by Minkwitz: The intermediate corridor becomes significantly wider.

FIG. 12 compares the contour of the front surface of the GRIN progressive power spectacle lens according to the second exemplary embodiment with the contour of the front surface of the comparison progressive power spectacle lens with the aid of a sagittal height representation. FIG. 12B shows the sagittal heights of the front surface of the GRIN progressive power spectacle lens according to the disclosure according to the second exemplary embodiment and, in comparison therewith, FIG. 12A shows the sagittal heights of the front surface of the comparison progressive power spectacle lens, in each case with respect to a coordinate system tilted through −7.02 about a horizontal axis (i.e., the vertical Y-axis of this system is tilted through −7.02° in relation to the vertical in space).

Third Exemplary Embodiment

All of the following figures correspond in subject matter and sequence to those of the second exemplary embodiment.

The third exemplary embodiment shows two progressive power lenses, in which the convergence movement of the eye when gazing at objects in the intermediate distances and at near objects, which lie straight-ahead in front of the eye of the spectacle wearer, are taken into account. This convergence movement causes the visual points through the front surface of the spectacle lens when gazing on these points not to lie on an exactly perpendicular straight piece, but along a vertical line pivoted toward the nose, the line being referred to as principal line of sight.

Therefore, the center of the near portion is also displaced horizontally in the nasal direction in these examples. The examples have been calculated in such a way that this principal line of sight lies in the intermediate corridor, centrally between the lines on the front surface for which the astigmatic residual aberration is 0.5 dpt (see FIGS. 16A and 16B in this respect).

FIG. 13A shows the distribution of the mean spherical power in the beam path for the progressive power spectacle wearer for a comparison progressive power spectacle lens made of a standard material (refractive index n=1.600) with an object-side freeform surface. The back side is, again, a spherical surface with a radius of 120 mm and the center of rotation of the eye lies 4 mm above the geometric center of the comparison progressive power spectacle lens at a horizontal distance of 25.5 mm from the back surface. The comparison progressive power spectacle lens has a central thickness of 2.5 mm and a prismatic power 1.0 cm/m base 270°, 2 mm below the geometric center. The back surface is tilted in such a way that, when gazing horizontally straight-ahead, the eye-side ray is perpendicular to the back surface.

When gazing horizontally straight-ahead (i.e., for a visual point through the lens of 4 mm above the geometric center), the spectacle wearer receives a mean power of 0 dpt and, when gazing through the point 13 mm below the geometric center and −2.5 mm horizontally in the nasal direction, the spectacle wearer receives a mean power of 2.00 dpt. That is to say, the lens power accordingly increases by approximately 2.00 dpt along a length of 17 mm.

FIG. 13B shows the distribution of the mean surface optical power for a refractive index n=1.600 of the object-side freeform surface of the comparison progressive power spectacle lens of the third exemplary embodiment, which brings about a distribution of the mean power as illustrated in FIG. 13A. The surface curvature increases continuously from top to bottom; the mean surface power value increases from 5.00 dpt at y=approximately 2 mm to 6.50 dpt at y=−12 mm.

FIG. 13C shows the surface astigmatism for n=1.600 of the object-side freeform surface of the comparison progressive power spectacle lens of FIG. 13A.

FIGS. 14A, 14B, and 14C show the reproduction of the comparison progressive power spectacle lens using a GRIN material (progressive power spectacle lens according to the disclosure). In this respect, FIG. 14A shows the distribution of the mean spherical power. From the comparison of FIGS. 13A and 14A, it is possible to gather that the power increase along the principal line of sight in the intermediate corridor is the same. FIG. 14B illustrates the profile of the mean surface optical power and FIG. 14C illustrates the profile of the surface astigmatism of the front surface of the GRIN progressive power spectacle lens according to the disclosure. In order to allow a comparison with FIG. 13B in respect of the mean curvatures and with FIG. 13C in respect of the surface astigmatism, it was not the GRIN material that was used during the calculation but, like previously, the material with the refractive index of n=1.600.

The comparison of FIGS. 13B and 13C with FIGS. 14B and 14C shows that the form of the freeform surface has changed significantly: the mean surface optical power (calculated with n=1.600) now decreases from the lens center to the edge in irregular fashion, in order to increase again in the peripheral regions. The profile of the surface astigmatism no longer exhibits a typical intermediate corridor.

FIG. 15 shows the distribution of the refractive index over the spectacle lens. Here, the refractive index increases from approximately 1.48 in the upper region of the lens to approximately 1.70 at the height of y=−13 in the lower region.

FIGS. 16A and 16B represent the effects of using the GRIN material with its specific refractive index distribution and of the design of the freeform surface for this GRIN progressive power spectacle lens on the width of the intermediate corridor in comparison with the comparison progressive power spectacle lens. FIGS. 16A and 16B show the distribution of the residual astigmatic aberration in the beam path for the spectacle wearer, for a spectacle wearer with only a prescription for sphere.

In this third exemplary embodiment, the intermediate corridor, defined here by the isoastigmatism line of 1 dpt, is widened from 6 mm to 9 mm, i.e., by approximately 50 percent.

FIG. 17A and FIG. 17B show cross sections through the residual astigmatism distributions from FIG. 16A and FIG. 16B. These figures once again elucidate the conventional relationship between increasing power and the lateral increase in the astigmatic aberration induced thereby (similar to the relationship of the mean surface optical power to the surface astigmatism according to Minkwitz's theorem). The increase of the residual astigmatic aberration in the surroundings of the center of the intermediate corridor ($y=-5$ mm) is significantly lower again for the GRIN progressive power spectacle lens according to the disclosure, even though the same power increase is present as in the comparison progressive power spectacle lens.

FIGS. 18A and 18B compare the contour of the front surface of the GRIN progressive power spectacle lens according to the third exemplary embodiment with the contour of the front surface of the comparison progressive power spectacle lens with the aid of a sagittal height representation. FIG. 18B shows the sagittal heights of the front surface of the GRIN progressive power spectacle lens according to the disclosure according to the third exemplary embodiment and, in comparison therewith, FIG. 18A shows the sagittal heights of the front surface of the comparison progressive power spectacle lens, in each case with respect to a plane that is perpendicular to the horizontally straight-ahead direction of view.

Fourth Exemplary Embodiment

All of the following figures correspond in subject matter and sequence to those of the third exemplary embodiment.

The fourth exemplary embodiment shows two progressive power lenses, in which the convergence movement of the eye when gazing at objects in the intermediate distances and at near objects, which lie straight-ahead in front of the eye of the spectacle wearer, are taken into account. This convergence movement cause the visual points through the front surface of the spectacle lens when gazing on these points not to lie on an exactly perpendicular straight piece, but along a vertical line pivoted toward the nose, the line being referred to as principal line of sight.

Therefore, the center of the near portion is also displaced horizontally in the nasal direction in these examples. The examples have been calculated in such a way that this principal line of sight lies in the intermediate corridor, centrally between the lines on the front surface for which the residual astigmatic aberration is 0.5 dpt (see FIGS. 22A and 22B in this respect).

FIG. 19A shows the distribution of the mean spherical power in the beam path for the progressive power spectacle wearer for a comparison progressive power spectacle lens made of a standard material (refractive index $n=1.600$) with an eye-side freeform surface. The front side is a spherical surface with a radius of 109.49 mm and the center of rotation of the eye lies 4 mm above the geometric center of the comparison progressive power spectacle lens at a horizontal distance of 25.1 mm from the back surface. The comparison progressive power spectacle lens has a central thickness of 2.55 mm and a prismatic power 1.5 cm/m base 270°, 2 mm below the geometric center. The pantoscopic tilt is 9° and the face form angle is 5°.

When gazing horizontally straight-ahead (i.e., for a visual point through the lens of 4 mm above the geometric center), the spectacle wearer receives a mean power of 0 dpt and, when gazing through the point 11 mm below the geometric center and $-2.5$ mm horizontally in the nasal direction, the spectacle wearer receives a mean power of 2.50 dpt. That is to say, the lens power accordingly increases by approximately 2.50 dpt along a length of 15 mm.

FIG. 19B shows the distribution of the mean surface optical power for a refractive index $n=1.600$ of the eye-side freeform surface of the comparison progressive power spectacle lens of the fourth exemplary embodiment, which brings about a distribution of the mean power as illustrated in FIG. 19A. The surface curvature increases continuously from top to bottom; the mean surface power value increases from $-5.50$ dpt at $y=$approximately 2 mm to $-3.50$ dpt at $y=-15$ mm.

FIG. 19C shows the surface astigmatism for $n=1.600$ of the eye-side freeform surface of the comparison progressive power spectacle lens of FIG. 19A.

FIGS. 20A, 20B, and 20C show the reproduction of the comparison progressive power spectacle lens using a GRIN material (progressive power spectacle lens according to the disclosure). In this respect, FIG. 20A shows the distribution of the mean spherical power. From the comparison of FIGS. 19A and 20A, it is possible to gather that the power increase along the principal line of sight in the intermediate corridor is the same. FIG. 20B illustrates the profile of the mean surface optical power and FIG. 20C illustrates the profile of the surface astigmatism of the back surface of the GRIN progressive power spectacle lens according to the disclosure. In order to allow a comparison with FIG. 19B in respect of the mean curvatures and with FIG. 19C in respect of the surface astigmatism, it was not the GRIN material that was used during the calculation but, like previously, the material with the refractive index of $n=1.600$.

The comparison of FIGS. 19B and 19C with FIGS. 20B and 20C shows that the form of the freeform surface has changed significantly: both the distribution of the mean surface optical power and the distribution of the surface astigmatism (calculated with $n=1.600$) no longer reveal a typical intermediate corridor.

FIG. 21 shows the distribution of the refractive index over the spectacle lens. Here, the refractive index increases from approximately 1.55 in the upper lateral region of the lens to approximately $n=1.64$ in the lower region.

FIGS. 22A and 22B represent the effects of using the GRIN material with its specific refractive index distribution and of the design of the freeform surface for this GRIN progressive power spectacle lens on the width of the intermediate corridor in comparison with the comparison progressive power spectacle lens. FIGS. 22A and 22B show the distribution of the residual astigmatic aberrations in the beam path for the spectacle wearer, for a spectacle wearer with only a prescription for sphere. The principal line of sight is depicted in both figures.

FIG. 23A and FIG. 23B show cross sections through the residual astigmatism distributions from FIG. 22A and FIG. 22B. These figures once again elucidate the conventional relationship between increasing power and the lateral increase in the astigmatic aberration induced thereby (similar to the relationship of the mean surface optical power to the surface astigmatism according to Minkwitz's theorem). The increase of the residual astigmatic aberration in the surroundings of the center of the intermediate corridor ($y=-4$ mm) is significantly lower again for the GRIN progressive power spectacle lens according to the disclosure, even though the same power increase is present as in the comparison progressive power spectacle lens. In this fourth example, the intermediate corridor, defined here by the isoastigmatism line of 1 dpt, is widened from 4.5 mm to 6 mm, i.e., by approximately 33 percent.

FIGS. 24A and 24B compare the contour of the back surface of the GRIN progressive power spectacle lens according to the fourth exemplary embodiment with the contour of the back surface of the comparison progressive power spectacle lens with the aid of a sagittal height representation. FIG. 24B shows the sagittal heights of the back surface of the GRIN progressive power spectacle lens according to the disclosure according to the fourth exemplary embodiment and, in comparison therewith, FIG. 24A shows the sagittal heights of the back surface of the comparison progressive power spectacle lens, in each case with respect to a plane that is perpendicular to the horizontally straight-ahead direction of view.

Fifth Exemplary Embodiment

The following figures correspond thematically to those concerning the fourth exemplary embodiment.

The fifth exemplary embodiment shows a lens designed for the prescription values of sphere −4 dpt, cylinder 2 dpt, axis 90 degrees. The prescription values stipulated in the prescription serve to correct the visual defects of the spectacle wearer.

As in the fourth exemplary embodiment, in the fifth exemplary embodiment, too, the convergence movement of the eye when gazing at objects in the intermediate distances and at near objects, which lie straight-ahead in front of the eye of the spectacle wearer, are taken into account. This convergence movement causes the visual points through the front surface of the spectacle lens when gazing on these points not to lie on an exactly perpendicular straight piece, but along a vertical line pivoted toward the nose, the line being referred to as principal line of sight.

Therefore, the center of the near portion is also displaced horizontally in the nasal direction in these examples. The examples have been calculated in such a way that this principal line of sight lies in the intermediate corridor, centrally between the lines on the front surface for which the residual astigmatic aberration is 0.5 dpt (see FIG. 27A in this respect).

FIG. 25A shows the distribution of the mean spherical power in the beam path for the progressive power spectacle wearer for a progressive power spectacle lens according to the disclosure using a GRIN material with an eye-side freeform surface. The prescription values of sphere −4 dpt, cylinder 2 dpt, axis 90 degrees have been taken into account in the design. The front side is, again, a spherical surface with a radius of 109.49 mm and the center of rotation of the eye lies 4 mm above the geometric center of the progressive power spectacle lens at a horizontal distance of 25.5 mm from the back surface. The progressive power spectacle lens according to the disclosure has a central thickness of 2.00 mm and a prismatic power 1.5 cm/m base 270°, 2 mm below the geometric center. The pantoscopic tilt is 9° and the face form angle is 5°.

When gazing horizontally straight-ahead (i.e., for a visual point through the lens of 4 mm above the geometric center), the spectacle wearer receives a mean power of 0 dpt and, when gazing through the point 11 mm below the geometric center and −2.5 mm horizontally in the nasal direction, the spectacle wearer receives a mean power of 2.50 dpt. That is to say, the lens power accordingly increases by approximately 2.50 dpt along a length of 15 mm.

FIG. 25B illustrates the profile of the mean surface optical power and FIG. 25C illustrates the profile of the surface astigmatism of the back surface of the GRIN progressive power spectacle lens according to the disclosure of the fifth exemplary embodiment. It was not the GRIN material that was used during the calculation but, like previously, the material with the refractive index of n=1.600.

FIG. 26 shows the distribution of the refractive index over the spectacle lens. Here, the refractive index increases from approximately 1.55 in the upper lateral region of the lens to approximately n=1.64 in the lower region.

FIGS. 27A and 27B show the distribution of the residual astigmatic aberrations in the beam path for the spectacle wearer for a spectacle wearer having the prescription of sphere −4 dpt, cylinder 2 dpt, axis 90 degrees. The principal line of sight is depicted in FIG. 27A. The figures reveal that through the use of the GRIN material with its specific refractive index distribution and also the design of the freeform surface for this GRIN progressive power spectacle lens, even for an astigmatic prescription, it is possible to increase the width of the intermediate corridor in comparison with the comparison progressive power spectacle lens.

FIG. 27B shows the cross section in the center of the intermediate corridor (y=−4 mm) through the residual astigmatism distribution from FIG. 27A. With the same power increase, for the GRIN progressive power spectacle lens according to the disclosure with an astigmatic prescription, the intermediate corridor, defined here by the isoastigmatism line of 1 dpt, is widened from 4.5 mm to 6 mm, i.e., by approximately 33 percent, compared with the comparison progressive power spectacle lens with only a prescription for sphere.

FIGS. 28-1 and 28-2 show the sagittal heights of the back surface of the GRIN progressive power spectacle lens according to the fifth exemplary embodiment with respect to a plane that is perpendicular to the horizontally straight-ahead direction of view.

Sixth Exemplary Embodiment

The essential steps of a method according to the disclosure for planning a GRIN progressive power spectacle lens are sketched out below:

Individual user data or application data of the spectacle wearer are captured in a first step. This includes the capture of (physiological) data that are assignable to the spectacle wearer and the capture of use conditions, under which the spectacle wearer will wear the progressive power spectacles to be planned.

By way of example, the physiological data of the spectacle wearer include the refractive error and the accommodation capability, which are determined by means of a refraction measurement and which are regularly included in the prescription in the form of the prescription values for sphere, cylinder, axis, prism, and base, as well as addition. Furthermore, the pupillary distance and the pupil size, for example, are determined in different light conditions. By way of example, the age of the spectacle wearer is considered; this has an influence on the expected accommodation capability and pupil size. The convergence behavior of the eyes emerges from the pupil distance for different directions of view and object distances.

The use conditions include the seat of the spectacle lenses in front of the eye (usually in relation to the center of rotation of the eyes) and the object distances for different directions of views, at which the spectacle wearer should see in focus. The seat of the spectacle wearer in front of the eye can be determined, for example, by capturing vertex distance, pantoscopic tilt and lateral tilt. These data are included in an object distance model, for which a ray tracing method can be performed.

In a subsequent step, a design plan for the spectacle lens with a multiplicity of evaluation points is set on the basis of these captured data. The design plan comprises intended optical properties for the progressive power spectacle lens at the respective evaluation point. By way of example, the intended properties include the admissible deviation from the prescribed spherical and astigmatic power taking account of the addition, to be precise in the manner distributed over the entire progressive power spectacle lens as predetermined by the arrangement of the spectacle lens in front of the eye and by the underlying distance model.

Furthermore, a plan of surface geometries for the front and back surface and a plan for a refractive index distribution over the entire spectacle lens are set. By way of example, the front surface can be chosen to be a spherical surface and the back surface can be chosen to be a progressive surface. Additionally, both surfaces could initially be chosen as spherical surfaces. In general, the selection of surface geometry for the first plan merely determines the convergence (speed and success) of the applied optimization method below. By way of example, the assumption should be made that the front surface should maintain the spherical form and the back surface receives the form of a progressive surface.

The profile of chief rays through the multiplicity of evaluation points in accordance with the spectacle wearer beam path is determined in a further step. Optionally, it is possible to set a local wavefront for each of the chief rays in the surroundings of the respective chief ray.

In a subsequent step, the aforementioned optical properties of the spectacle lens are ascertained at the evaluation points by determining an influence of the spectacle lens on the beam path of the chief rays and the local wavefronts in the surroundings of the chief ray by means of the respective evaluation point.

In a further step, the plan of the spectacle lens is evaluated depending on the ascertained optical properties and the individual user data. Then, the back surface and the refractive index distribution of the plan of the spectacle lens are modified in view of minimizing a target function, $$F = \sum_m \sum_n W_n^m (T_n^m - A_n^m)^2$$

where $W_n^m$ represents the weighting of the optical property n at the evaluation point m, $T_n^m$ represents the intended value of the optical property n at the evaluation point m and $A_n^m$ represents the actual value of the optical property n at the evaluation point m.

Expressed differently, the local surface geometry of the back surface and the local refractive index of the progressive power spectacle lens is modified in the respective visual beam path through the evaluation points until a termination criterion has been satisfied.

The GRIN progressive power spectacle lens planned in this inventive manner can then be manufactured according to this plan.

The foregoing description of the exemplary embodiments of the invention illustrates and describes the present disclosure. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A product comprising:
    (i) a progressive power spectacle lens;
    (ii) a representation of the progressive power spectacle lens, the representation being stored on a non-transitory data medium; or
    (iii) the non-transitory data medium with a virtual representation of the progressive power spectacle lens,
    wherein the progressive power spectacle lens has:
    a front surface;
    a back surface; and
    a spatially varying refractive index,
    wherein at least one of the front surface or the back surface is configured as a progressive surface,
    wherein the progressive surface is a non-rotationally symmetrical surface having a continuous change in curvature over the entire surface or a part thereof,
    wherein the front surface configured as the progressive surface is a freeform surface having neither point symmetry nor axial symmetry,
    wherein the back surface configured as the progressive surface is the freeform surface having no point symmetry and optionally no axial symmetry,
    wherein the refractive index:
        (a) varies in a first spatial dimension and in a second spatial dimension and is constant in a third spatial dimension, wherein a distribution of the refractive index in the first spatial dimension and the second spatial dimension has neither point symmetry nor axial symmetry,
        (b) varies in the first spatial dimension, the second spatial dimension, and the third spatial dimension, wherein the distribution of the refractive index in the first spatial dimension and the second spatial dimension in all planes perpendicular to the third spatial dimension has neither point symmetry nor axial symmetry, or
        (c) varies in the first spatial dimension, the second spatial dimension, and the third spatial dimension, wherein the distribution of the refractive index has no point symmetry and no axial symmetry.

2. The product as claimed in claim 1, wherein the third spatial dimension in case (a) extends in a direction which:
    differs by not more than 5° from a zero viewing direction during use as intended, or
    differs by not more than 10° from the zero viewing direction during use as intended, or
    differs by not more than 20° from the zero viewing direction during use as intended, or differs by not more than 5° from a principal viewing direction during use as intended, or differs by not more than 10° from the principal viewing direction during use as intended, or differs by not more than 20° from the principal viewing direction during use as intended, or differs by not more than 5° from a direction of a normal vector of the front surface in a geometric center of the progressive power spectacle lens, or differs by not more than 10° from the direction of the normal vector of the front surface in the geometric center of the progressive power spectacle lens, or differs by not more than 20° from the direction of the normal vector of the front surface in the geometric center of the progressive power spectacle lens, or differs by not more than 5° from a direction of a normal vector at a prismatic measurement point, or differs by not more than 10° from the direction of the normal vector at the prismatic measurement point, or differs by not more than 20° from the direction of the normal vector at the prismatic measurement point, or differs by not more than 5° from the direction of a normal vector at a centration point, or differs by not more than 10° from the direction of the normal vector at the centration point, or differs by not more than 20° from the direction of the normal vector at the centration point.

3. The product as claimed in claim 1, wherein at least one of:
   (i) the front surface configured as the freeform surface has a maximum of an absolute value of a mean curvature of the front surface in an intermediate corridor,
   (ii) the back surface configured as the freeform surface has a minimum of an absolute value of the mean curvature of the back surface in the intermediate corridor,
   (iii) the back surface has a spherical, rotationally symmetrically aspheric, or toric surface geometry or has two planes of symmetry and the front surface configured as the freeform surface has the maximum of the absolute value of the mean curvature of the front surface in the intermediate corridor,
   (iv) the front surface has the spherical, rotationally symmetrically aspheric, or toric surface geometry or has the two planes of symmetry and the back surface configured as the freeform surface has the minimum of the absolute value of the mean curvature of the back surface in the intermediate corridor,
   (v) the back surface is not the freeform surface and the front surface configured as the freeform surface has the maximum of the absolute value of the mean curvature of the front surface in the intermediate corridor, or
   (vi) the front surface is not the freeform surface and the back surface configured as the freeform surface has the minimum of the absolute value of the mean curvature of the back surface in the intermediate corridor.

4. The product as claimed in claim 1, further comprising:
   (i) a representation, stored on a non-transitory data medium, of a predetermined arrangement of the progressive power spectacle lens in front of an eye of a progressive power spectacle wearer, for whom the progressive power spectacle lens is intended; or
   (ii) the non-transitory data medium with data concerning the predetermined arrangement of the progressive power spectacle lens in front of the eye of the progressive power spectacle wearer, for whom the progressive power spectacle lens is intended, wherein the progressive power spectacle lens has a distribution of a spherical equivalent for the predetermined arrangement of the progressive power spectacle lens in front of the eye of the progressive power spectacle wearer, for whom the progressive power spectacle lens is intended, and wherein the progressive power spectacle lens has an intermediate corridor with a width and the refractive index of the progressive power spectacle lens varies in space such that the width of the intermediate corridor of the progressive power spectacle lens, at least in a section or over the entire length of the intermediate corridor, is greater than the width of the intermediate corridor in the section or over the entire length of the intermediate corridor of a comparison progressive power spectacle lens with a same distribution of the spherical equivalent in a same arrangement of the comparison progressive power spectacle lens in front of the eye of the progressive power spectacle wearer, but with a spatially non-varying refractive index.

5. The product as claimed in claim 4, wherein the section is selected from the group consisting of:
   a horizontal section;
   a section at half addition;
   a horizontal section at the half addition;
   a horizontal section at 25% of the addition;
   a horizontal section at 75% of the addition;
   the horizontal section at the half addition and the horizontal section at the 25% of the addition;
   the horizontal section at the half addition and the horizontal section at the 75% of the addition; and
   the horizontal section at the half addition and the horizontal section at the 25% of the addition and the horizontal section at the 75% of the addition.

6. The product as claimed in claim 4, further comprising at least one of:
   (i) a representation, stored on a non-transitory data medium, of a residual astigmatism distribution for a predetermined arrangement of the progressive power spectacle lens in front of an eye of the progressive power spectacle wearer, for whom the progressive power spectacle lens is intended;
   (ii) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;
   (iii) a representation, stored on the non-transitory data medium, of a prescription and an object distance model for the predetermined arrangement of the progressive power spectacle lens in front of the eye of a progressive power spectacle wearer, for whom the progressive power spectacle lens is intended;
   (iv) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;
   (v) the non-transitory data medium with data concerning the residual astigmatism distribution for the predetermined arrangement of the progressive power spectacle lens in front of the eye of the progressive power spectacle wearer, for whom the progressive power spectacle lens is intended;

(vi) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;

(vii) the non-transitory data medium with data concerning the prescription and the object distance model for the predetermined arrangement of the progressive power spectacle lens in front of the eye of a progressive power spectacle wearer, for whom the progressive power spectacle lens is intended; and (viii) the non-transitory data medium with data concerning the distribution of the spherical equivalent for the predetermined arrangement of the progressive power spectacle lens in front of the eye of the progressive power spectacle wearer, for whom the progressive power spectacle lens is intended, wherein the progressive power spectacle lens has a distance portion and a near portion, and wherein the width of the intermediate corridor corresponds to a dimension transverse to a longitudinal direction of the intermediate corridor extending between the distance portion and near portion, within which the absolute value of the residual astigmatism lies below a predetermined limit value, which is selected from the group consisting of:

(a) the limit value lies in the range between 0.25 dpt and 1.5 dpt,
(b) the limit value lies in the range between 0.25 dpt and 1.0 dpt,
(c) the limit value lies in the range between 0.25 dpt and 0.75 dpt,
(d) the limit value lies in the range between 0.25 dpt and 0.6 dpt, and
(e) the limit value lies in the range between 0.25 dpt and 0.5 dpt,
(f) or the limit value is 0.5 dpt.

7. The product as claimed in claim 1, further comprising:
(i) a representation, stored on a non-transitory data medium, of a predetermined arrangement of the progressive power spectacle lens in front of an eye of a progressive power spectacle wearer, for whom the progressive power spectacle lens is intended, or
(ii) a non-transitory data medium with data concerning a predetermined arrangement of the progressive power spectacle lens in front of the eye of a progressive power spectacle wearer, for whom the progressive power spectacle lens is intended, wherein the progressive power spectacle lens has a distribution of a spherical equivalent for the predetermined arrangement of the progressive power spectacle lens in front of the eye of the progressive power spectacle wearer, for whom the progressive power spectacle lens is intended, and at least one of:
(iii) a representation, stored on a non-transitory data medium, of a residual astigmatism distribution for the predetermined arrangement of the progressive power spectacle lens in front of the eye of the progressive power spectacle wearer, for whom the progressive power spectacle lens is intended;
(iv) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;
(v) a representation, stored on the non-transitory data medium, of a prescription and an object distance model for the predetermined arrangement of the progressive power spectacle lens in front of the eye of a progressive power spectacle wearer, for whom the progressive power spectacle lens is intended;
(vi) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;
(vii) the non-transitory data medium with data concerning the residual astigmatism distribution for the predetermined arrangement of the progressive power spectacle lens in front of the eye of the progressive power spectacle wearer, for whom the progressive power spectacle lens is intended;
(viii) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;
(ix) the non-transitory data medium with data concerning the prescription and the object distance model for the predetermined arrangement of the progressive power spectacle lens in front of the eye of a progressive power spectacle wearer, for whom the progressive power spectacle lens is intended; or
(x) the non-transitory data medium with data concerning the distribution of the spherical equivalent for the predetermined arrangement of the progressive power spectacle lens in front of the eye of the progressive power spectacle wearer, for whom the progressive power spectacle lens is intended, wherein the refractive index of the progressive power spectacle lens varies in space such that the maximum value of the residual astigmatism of the progressive power spectacle lens is less than the maximum value of the residual astigmatism of a comparison progressive power spectacle lens with a same distribution of the spherical equivalent with a same arrangement of the comparison progressive power spectacle lens in front of the eye of the progressive power spectacle wearer, but with a spatially non-varying refractive index.

8. The product as claimed in claim 1, further comprising:
(i) a representation, stored on a non-transitory data medium, of a predetermined arrangement of the progressive power spectacle lens in front of an eye of a progressive power spectacle wearer, for whom the progressive power spectacle lens is intended, or
(ii) the non-transitory data medium with data concerning a predetermined arrangement of the progressive power spectacle lens in front of an eye of a progressive power spectacle wearer, for whom the progressive power spectacle lens is intended, wherein the progressive power spectacle lens has a distribution of a spherical equivalent (W) for the predetermined arrangement of the progressive power spectacle lens in front of the eye of the progressive power spectacle wearer, for whom the progressive power spectacle lens is intended, and at least one of:

(iii) a representation, stored on a non-transitory data medium, of a residual astigmatism distribution for the predetermined arrangement of the progressive power spectacle lens in front of the eye of the progressive power spectacle wearer, for whom the progressive power spectacle lens is intended;

(iv) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;

(v) a representation, stored on the non-transitory data medium, of a prescription and an object distance model for the predetermined arrangement of the progressive power spectacle lens in front of the eye of a progressive power spectacle wearer, for whom the progressive power spectacle lens is intended;

(vi) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;

(vii) the non-transitory data medium with data concerning the residual astigmatism distribution for the predetermined arrangement of the progressive power spectacle lens in front of the eye of the progressive power spectacle wearer, for whom the progressive power spectacle lens is intended;

(viii) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;

(ix) the non-transitory data medium with data concerning the prescription and the object distance model for the predetermined arrangement of the progressive power spectacle lens in front of the eye of a progressive power spectacle wearer, for whom the progressive power spectacle lens is intended; or (x) the non-transitory data medium with data concerning the distribution of the spherical equivalent for the predetermined arrangement of the progressive power spectacle lens in front of the eye of the progressive power spectacle wearer, for whom the progressive power spectacle lens is intended, wherein the progressive power spectacle lens has an intermediate corridor and a principal line of sight, and wherein the refractive index of the progressive power spectacle lens varies in space, and a residual astigmatism value $A_{res,lim}$ has a value selected from the group consisting of:

(a) the residual astigmatism value $A_{res,lim}$ lies in the range between 0.25 dpt and 1.5 dpt, (b) the residual astigmatism value $A_{res,lim}$ lies in the range between 0.25 dpt and 1.0 dpt, (c) the residual astigmatism value $A_{res,lim}$ lies in the range between 0.25 dpt and 0.75 dpt, (d) the residual astigmatism value $A_{res,lim}$ lies in the range between 0.25 dpt and 0.6 dpt, and (e) the residual astigmatism value $A_{res,lim}$ lies in the range between 0.25 dpt and 0.5 dpt, or (f) the residual astigmatism value $A_{res,lim}$ is 0.5 dpt, and wherein on a horizontal section at a narrowest point of the intermediate corridor or for a horizontal section through a point on the principal line of sight at which the half addition is achieved, the following relationship applies within a region with a horizontal distance of 10 mm on both sides of the principal line of sight:

$$B > c \times \frac{A_{res,lim}}{grad\ W}$$

wherein grad W describes the power gradient of the spherical equivalent in the direction of the principal line of sight of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{res} \leq A_{res,lim}$, where c is a constant selected from the group consisting of:

(a) 1.0<c,
(b) 1.1<c,
(c) 1.2<c, and
(d) 1.3<c.

9. A product comprising:

(i) a progressive power spectacle lens;

(ii) a representation of the progressive power spectacle lens, the representation being stored on a non-transitory data medium; or (iii) the non-transitory data medium with a virtual representation of the progressive power spectacle lens, wherein the progressive power spectacle lens has:

a front surface;

a back surface; and a spatially varying refractive index, wherein at least one of the front surface or the back surface is configured as a progressive surface, wherein the progressive surface is a non-rotationally symmetrical surface having a continuous change in curvature over the entire surface or a part thereof, wherein the at least one of the front surface or the back surface configured as the progressive surface is a freeform surface, wherein the progressive power spectacle lens is made from a substrate having no individual layers, the substrate having at least one of a front surface coating on the front surface of the substrate or a back surface coating on the back surface of the substrate and including one or more individual layers, wherein a difference between a spherical equivalent measured at each point on the front surface of the progressive power spectacle lens with the front surface coating or the back surface coating and the spherical equivalent measured at each corresponding point on the front surface of a comparison progressive power spectacle lens without front surface coating and without back surface coating but with an identical substrate is less than a difference value selected from the group consisting of:

(a) the difference value is less than 0.001 dpt,
(b) the difference value is less than 0.002 dpt,
(c) the difference value is less than 0.003 dpt, and
(d) the difference value is less than 0.004 dpt.

10. The product as claimed in claim 9, wherein at least one of the freeform surfaces has no point symmetry and no axial symmetry or wherein at least one of the freeform surfaces has no point symmetry and no axial symmetry and no rotational symmetry and no symmetry with respect to a plane of symmetry.

11. The product as claimed in claim 9, wherein:
  (a) the refractive index varies only in a first spatial dimension and in a second spatial dimension and is constant in a third spatial dimension, wherein a distribution of the refractive index in the first spatial dimension and the second spatial dimension has neither point symmetry nor axial symmetry,
  (b) the refractive index varies in the first spatial dimension and in the second spatial dimension and in the third spatial dimension, wherein a distribution of the refractive index in the first spatial dimension and the second spatial dimension in all planes perpendicular to the third spatial dimension has neither point symmetry nor axial symmetry, or
  (c) the refractive index varies in the first spatial dimension and in the second spatial dimension and in the third spatial dimension, wherein a distribution of the refractive index has no point symmetry and no axial symmetry.

12. The product as claimed in claim 11, wherein the third spatial dimension in case (a) extends in a direction which:
  differs by not more than 5° from a zero viewing direction during use as intended, or
  differs by not more than 10° from the zero viewing direction during use as intended, or
  differs by not more than 20° from the zero viewing direction during use as intended, or
  differs by not more than 5° from a principal viewing direction during use as intended, or
  differs by not more than 10° from the principal viewing direction during use as intended, or
  differs by not more than 20° from the principal viewing direction during use as intended, or
  differs by not more than 5° from a direction of a normal vector of the front surface in a geometric center of the progressive power spectacle lens, or
  differs by not more than 10° from the direction of the normal vector of the front surface in the geometric center of the progressive power spectacle lens, or
  differs by not more than 20° from the direction of the normal vector of the front surface in the geometric center of the progressive power spectacle lens, or
  differs by not more than 5° from a direction of a normal vector at a prismatic measurement point, or
  differs by not more than 10° from the direction of the normal vector at the prismatic measurement point, or
  differs by not more than 20° from the direction of the normal vector at the prismatic measurement point, or
  differs by not more than 5° from a direction of a normal vector at a centration point, or differs by not more than 10° from the direction of the normal vector at the centration point, or
  differs by not more than 20° from the direction of the normal vector at the centration point.

13. The product as claimed in claim 9, wherein the progressive power spectacle lens comprises an intermediate corridor and wherein at least one of:
  (i) the front surface configured as the freeform surface has a mean curvature with a maximum in the intermediate corridor,
  (ii) the back surface configured as the freeform surface has the mean curvature with a minimum in the intermediate corridor,
  (iii) the back surface has a spherical, rotationally symmetrically aspheric, or toric surface geometry and the front surface configured as the freeform surface has the maximum of the absolute value of the mean curvature of the front surface in the intermediate corridor,
  (iv) the front surface has a spherical, rotationally symmetrically aspheric, or toric surface geometry and the back surface configured as the freeform surface has the minimum of the absolute value of the mean curvature of the back surface in the intermediate corridor,
  (v) the back surface is not configured as the freeform surface and the front surface configured as the freeform surface has the maximum of the absolute value of the mean curvature of the front surface in the intermediate corridor, or
  (vi) the front surface is not configured as the freeform surface and the back surface configured as the freeform surface has the minimum of the absolute value of the mean curvature of the back surface in the intermediate corridor.

14. The product as claimed in claim 9, further comprising:
  (i) a representation, stored on a non-transitory data medium, of a predetermined arrangement of the progressive power spectacle lens in front of an eye of a progressive power spectacle wearer, for whom the progressive power spectacle lens is intended, or
  (ii) the non-transitory data medium with data concerning a predetermined arrangement of the progressive power spectacle lens in front of an eye of a progressive power spectacle wearer,
  wherein the progressive power spectacle lens has a distribution of a spherical equivalent for the predetermined arrangement of the progressive power spectacle lens in front of the eye of the progressive power spectacle wearer, for whom the progressive power spectacle lens is intended,
  wherein the progressive power spectacle lens has an intermediate corridor with a width, and
  wherein the refractive index of the progressive power spectacle lens varies in space such that the width of the intermediate corridor of the progressive power spectacle lens, at least in a section or over the entire length of the intermediate corridor, is greater than the width of the intermediate corridor of a comparison progressive power spectacle lens with a same distribution of the spherical equivalent in a same arrangement of the comparison progressive power spectacle lens in front of the eye of the progressive power spectacle wearer, but with a spatially non-varying refractive index.

15. The product as claimed in claim 14, wherein the section is selected from the group consisting of:
  a horizontal section,
  a section at half addition,
  a horizontal section at the half addition,
  the horizontal section at the half addition and a horizontal section at 25% of the addition,
  the horizontal section at the half addition and a horizontal section at 75% of the addition, and
  the horizontal section at the half addition and the horizontal section at 25% of the addition and the horizontal section at 75% of the addition.

16. The product as claimed in claim 14, further comprising at least one of:
   (i) a representation, stored on a non-transitory data medium, of a residual astigmatism distribution for the predetermined arrangement of the progressive power spectacle lens in front of an eye of the progressive power spectacle wearer, for whom the progressive power spectacle lens is intended;
   (ii) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;
   (iii) a representation, stored on the non-transitory data medium, of a prescription and an object distance model for the predetermined arrangement of the progressive power spectacle lens in front of the eye of a progressive power spectacle wearer, for whom the progressive power spectacle lens is intended;
   (iv) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;
   (v) the non-transitory data medium with data concerning the residual astigmatism distribution for the predetermined arrangement of the progressive power spectacle lens in front of the eye of the progressive power spectacle wearer, for whom the progressive power spectacle lens is intended;
   (vi) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;
   (vii) the non-transitory data medium with data concerning the prescription and the object distance model for the predetermined arrangement of the progressive power spectacle lens in front of the eye of a progressive power spectacle wearer, for whom the progressive power spectacle lens is intended; and
   (viii) the non-transitory data medium with data concerning the distribution of the spherical equivalent for the predetermined arrangement of the progressive power spectacle lens in front of the eye of the progressive power spectacle wearer, for whom the progressive power spectacle lens is intended,
   wherein the progressive power spectacle lens has a distance portion and a near portion, and
   wherein the width of the intermediate corridor corresponds to a dimension transverse to a longitudinal direction of the intermediate corridor extending between the distance portion and the near portion, within which the absolute value of the residual astigmatism lies below a predetermined limit value, which is selected from the group consisting of:
   (a) the limit value lies in the range between 0.25 dpt and 1.5 dpt,
   (b) the limit value lies in the range between 0.25 dpt and 1.0 dpt,
   (c) the limit value lies in the range between 0.25 dpt and 0.75 dpt,
   (d) the limit value lies in the range between 0.25 dpt and 0.6 dpt, and
   (e) the limit value lies in the range between 0.25 dpt and 0.5 dpt, or
   (f) the limit value is 0.5 dpt.

17. The product as claimed in claim 9, further comprising:
   (i) a representation, stored on a data medium, of a predetermined arrangement of the progressive power spectacle lens in front of an eye of a progressive power spectacle wearer, for whom the progressive power spectacle lens is intended; or
   (ii) a data medium with data concerning a predetermined arrangement of the progressive power spectacle lens in front of an eye of a progressive power spectacle wearer,
   wherein the progressive power spectacle lens has a distribution of a spherical equivalent for the predetermined arrangement of the progressive power spectacle lens in front of the eye of the progressive power spectacle wearer, for whom the progressive power spectacle lens is intended; and at least one of:
   (iii) a representation, stored on a non-transitory data medium, of a residual astigmatism distribution for the predetermined arrangement of the progressive power spectacle lens in front of the eye of the progressive power spectacle wearer, for whom the progressive power spectacle lens is intended;
   (iv) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;
   (v) a representation, stored on the non-transitory data medium, of a prescription and an object distance model for the predetermined arrangement of the progressive power spectacle lens in front of the eye of a progressive power spectacle wearer, for whom the progressive power spectacle lens is intended;
   (vi) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;
   (vii) the non-transitory data medium with data concerning the residual astigmatism distribution for the predetermined arrangement of the progressive power spectacle lens in front of the eye of the progressive power spectacle wearer, for whom the progressive power spectacle lens is intended;
   (viii) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;
   (ix) the non-transitory data medium with data concerning the prescription and the object distance model for the predetermined arrangement of the progressive power spectacle lens in front of the eye of a progressive power spectacle wearer, for whom the progressive power spectacle lens is intended; or
   (x) the non-transitory data medium with data concerning the distribution of the spherical equivalent for the predetermined arrangement of the progressive power spectacle lens in front of the eye of the progressive power spectacle wearer, for whom the progressive power spectacle lens is intended, wherein the refractive index of the progressive power spectacle lens varies in space such that a maximum value of the residual astigmatism of the progressive power spectacle lens is less than the maximum value of the residual astigmatism of a comparison progressive power spectacle lens with a same distribution of the spherical equivalent a same arrangement of the comparison progressive power spectacle lens in front of the eye of the progressive power spectacle wearer, but with a spatially non-varying refractive index.

18. The product as claimed in claim 9, further comprising:
(i) a representation, stored on the non-transitory data medium, of a predetermined arrangement of the progressive power spectacle lens in front of an eye of a progressive power spectacle wearer, for whom the progressive power spectacle lens is intended, or
(ii) the non-transitory data medium with data concerning the predetermined arrangement of the progressive power spectacle lens in front of an eye of a progressive power spectacle wearer, wherein the progressive power spectacle lens has a distribution of a spherical equivalent (W) for the predetermined arrangement of the progressive power spectacle lens in front of the eye of the progressive power spectacle wearer, for whom the progressive power spectacle lens is intended;

and at least one of:
(iii) a representation, stored on the non-transitory data medium, of a residual astigmatism distribution for the predetermined arrangement of the progressive power spectacle lens in front of the eye of the progressive power spectacle wearer, for whom the progressive power spectacle lens is intended;
(iv) a representation, stored on the non-transitory data medium, of an astigmatic power distribution, required for a full correction, for the predetermined arrangement of the progressive power spectacle lens in front of the eye of the progressive power spectacle wearer, for whom the progressive power spectacle lens is intended;
(v) a representation, stored on the non-transitory data medium, of a prescription and an object distance model for the predetermined arrangement of the progressive power spectacle lens in front of the eye of a progressive power spectacle wearer, for whom the progressive power spectacle lens is intended;
(vi) a representation, stored on the non-transitory data medium, of a distribution of the spherical equivalent for the predetermined arrangement of the progressive power spectacle lens in front of the eye of the progressive power spectacle wearer, for whom the progressive power spectacle lens is intended;
(vii) the non-transitory data medium with data concerning the residual astigmatism distribution for the predetermined arrangement of the progressive power spectacle lens in front of the eye of the progressive power spectacle wearer, for whom the progressive power spectacle lens is intended;
(viii) the non-transitory data medium with data concerning the astigmatic power distribution, required for the full correction, for the predetermined arrangement of the progressive power spectacle lens in front of the eye of the progressive power spectacle wearer, for whom the progressive power spectacle lens is intended;
(ix) the non-transitory data medium with data concerning the prescription and the object distance model for the predetermined arrangement of the progressive power spectacle lens in front of the eye of a progressive power spectacle wearer, for whom the progressive power spectacle lens is intended; and
(x) the non-transitory data medium with data concerning the distribution of the spherical equivalent for the predetermined arrangement of the progressive power spectacle lens in front of the eye of the progressive power spectacle wearer, for whom the progressive power spectacle lens is intended, wherein the progressive power spectacle lens comprises an intermediate corridor and a principal line of sight, and wherein the refractive index of the progressive power spectacle lens varies in space in such a way that for a predetermined residual astigmatism value $A_{res,lim}$ of the group consisting of:
(a) the residual astigmatism value $A_{res,lim}$ lies in the range between 0.25 dpt and 1.5 dpt,
(b) the residual astigmatism value $A_{res,lim}$ lies in the range between 0.25 dpt and 1.0 dpt,
(c) the residual astigmatism value $A_{res,lim}$ lies in the range between 0.25 dpt and 0.75 dpt,
(d) the residual astigmatism value $A_{res,lim}$ lies in the range between 0.25 dpt and 0.6 dpt, and
(e) the residual astigmatism value $A_{res,lim}$ lies in the range between 0.25 dpt and 0.5 dpt, or
(f) the residual astigmatism value $A_{res,lim}$ is 0.5 dpt wherein on a horizontal section at the narrowest point of the intermediate corridor or for a horizontal section through the point on the principal line of sight at which the half addition is achieved, the following relationship applies within a region with a horizontal distance of 10 mm on both sides of the principal line of sight:

$$B > c \times \frac{A_{res,lim}}{grad\ W}$$

wherein grad W is a power gradient of the spherical equivalent of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{res} \leq A_{res,lim}$, and wherein c is a constant selected from the group consisting of:
(g) 1.0<c,
(h) 1.1<c,
(i) 1.2<c, and
(j) 1.3<c.

19. A computer-implemented method for designing a progressive power spectacle lens with a front surface, a back surface, and a spatially varying refractive index, wherein at least one of the front surface or the back surface is configured as a progressive surface, the method comprising:
calculating optical properties of the progressive power spectacle lens with ray tracing at a plurality of evaluation points at which visual rays pass through the progressive power spectacle lens;
setting at least one intended optical property for the progressive power spectacle lens at a respective evaluation point, designing a representation of the progressive power spectacle lens by setting a local surface geometry of the progressive surface and a local refractive index of the progressive power spectacle lens in a respective visual beam path through the evaluation points;

modifying the representation of the progressive power spectacle lens by approximating the at least one intended optical property of the progressive power spectacle lens, wherein the modifying includes modifying the representation of the local surface geometry of the progressive surface and the local refractive index of the progressive power spectacle lens in the respective visual beam path through the evaluation points, and wherein the at least one intended optical property includes an intended residual astigmatism of the progressive power spectacle lens;

freely modifying the progressive surface in one spatial dimension or in two spatial dimensions; and freely modifying the local refractive index in at least two spatial dimensions.

20. The method as claimed in claim 19, wherein the progressive surface is modified such that a freeform surface arises which has neither a point symmetry nor an axial symmetry, and wherein the local refractive index is modified such that:
(a) the refractive index varies only in a first spatial dimension and in a second spatial dimension and is constant in a third spatial dimension, wherein a distribution of the refractive index in the first spatial dimension and the second spatial dimension has neither point symmetry nor axial symmetry;
(b) the refractive index varies in a first spatial dimension and in a second spatial dimension and in a third spatial dimension, wherein the distribution of the refractive index in the first spatial dimension and the second spatial dimension in all planes perpendicular to the third spatial dimension has neither point symmetry nor axial symmetry; or
(c) the refractive index varies in a first spatial dimension and in a second spatial dimension and in a third spatial dimension, wherein the distribution of the refractive index in the progressive power spectacle lens has no point symmetry and no axial symmetry.

21. The method as claimed in claim 19, wherein the at least one intended optical property of the progressive power spectacle lens is derived from:
(i) a corresponding intended optical property for a progressive power spectacle lens with a spatially non-varying refractive index, and/or
(ii) a corresponding optical property of a progressive power spectacle lens with a spatially non-varying refractive index, or wherein the intended residual astigmatism of the progressive power spectacle lens is derived from:
(iii) an intended residual astigmatism for a progressive power spectacle lens with a spatially non-varying refractive index, and/or
(iv) a residual astigmatism of a progressive power spectacle lens with a spatially non-varying refractive index.

22. The method as claimed in claim 21, wherein the at least one intended optical property of the progressive power spectacle lens in a central intermediate portion between distance portion and the near portion is reduced vis-à-vis
(i) the corresponding intended optical property for the progressive power spectacle lens with a spatially non-varying refractive index or
(ii) the corresponding optical property of the progressive power spectacle lens with a spatially non-varying refractive index; or wherein the intended residual astigmatism of the progressive power spectacle lens in a central intermediate portion between distance portion and near portion is reduced vis-à-vis
(iii) the intended residual astigmatism for the progressive power spectacle lens with a spatially non-varying refractive index, or
(iv) the residual astigmatism of the progressive power spectacle lens with a spatially non-varying refractive index.

23. The method as claimed in claim 22, wherein the intended residual astigmatism of the progressive power spectacle lens in a central intermediate portion between distance portion and near portion is reduced in a region around the principal line of sight, wherein the region comprises a horizontal distance on both sides, the horizontal distance being selected from the group consisting of:
(a) 5 mm from the principal line of sight,
(b) 10 mm from the principal line of sight, and
(c) 20 mm from the principal line of sight.

24. The method as claimed in claim 19, further comprising:
minimizing a target function $$F = \sum_m \sum_n W_n^m (T_n^m - A_n^m)^2$$

wherein $W_n^m$ represents a weighting of the optical property n at the evaluation point m, $T_n^m$ represents an intended value of the optical property n at the evaluation point m, and $A_n^m$ represents an actual value of the optical property n at the evaluation point m.

25. The method as claimed in claim 19, wherein an intended residual astigmatism is predetermined for at least one evaluation point, the intended residual astigmatism being less than the theoretically achievable residual astigmatism at the at least one corresponding evaluation point on a comparison progressive power spectacle lens with the same distribution of the spherical equivalent and the same arrangement of the comparison progressive power spectacle lens in front of the eye of the progressive power spectacle wearer, but with a spatially non-varying refractive index, and wherein modifying the representation of the local surface geometry of the progressive surface and of the local refractive index of the progressive power spectacle lens in the respective visual beam path through the evaluation points is only terminated if the residual astigmatism at the at least one evaluation point, achieved for the designed progressive power spectacle lens, is less than the theoretically achievable residual astigmatism at the at least one corresponding evaluation point on the comparison progressive power spectacle lens.

26. The method as claimed in claim 19, wherein modifying the representation of the local surface geometry of the progressive surface and of the local refractive index of the progressive power spectacle lens in the respective visual beam path through the evaluation points is implemented with the stipulation that the maximum value of the residual astigmatism of the progressive power spectacle lens is less than the maximum value of the residual astigmatism of a comparison progressive power spectacle lens with a same distribution of the spherical equivalent and a same arrangement of the comparison progressive power spectacle lens in front of the eye of the progressive power spectacle wearer, but with a spatially non-varying refractive index.

27. The method as claimed in claim 19, wherein designing the progressive power spectacle lens results in a progressive power spectacle lens corresponding to a product comprising:
   (i) a progressive power spectacle lens;
   (ii) a representation of the progressive power spectacle lens, the representation being stored on a non-transitory data medium; or
   (iii) the non-transitory data medium with a virtual representation of the progressive power spectacle lens,
   wherein the progressive power spectacle lens has:
   a front surface;
   a back surface; and
   a spatially varying refractive index,
   wherein at least one of the front surface or the back surface is configured as a progressive surface,
   wherein the progressive surface is a non-rotationally symmetrical surface having a continuous change in curvature over the entire surface or a part thereof,
   wherein the front surface configured as the progressive surface is a freeform surface having neither point symmetry nor axial symmetry,
   wherein the back surface configured as the progressive surface is the freeform surface having no point symmetry and optionally no axial symmetry,
   wherein the refractive index:
      (a) varies in a first spatial dimension and in a second spatial dimension and is constant in a third spatial dimension, wherein a distribution of the refractive index in the first spatial dimension and the second spatial dimension has neither point symmetry nor axial symmetry,
      (b) varies in the first spatial dimension, the second spatial dimension, and the third spatial dimension, wherein the distribution of the refractive index in the first spatial dimension and the second spatial dimension in all planes perpendicular to the third spatial dimension has neither point symmetry nor axial symmetry, or
      (c) varies in the first spatial dimension, the second spatial dimension, and the third spatial dimension, wherein the distribution of the refractive index has no point symmetry and no axial symmetry.

28. A computer program stored on a non-transitory computer readable medium and having program code for carrying out the method as claimed in claim 19 when the computer program is loaded on a computer and/or executed on a computer.

29. The computer-readable medium comprising the computer program as claimed in claim 28.

30. A method for producing a progressive power spectacle lens as claimed in claim 1, the method comprising:
   an additive manufacturing step.

31. A method for producing a progressive power spectacle lens, comprising:
   performing the method as claimed in claim 19, and
   manufacturing the progressive power spectacle lens.

32. The method as claimed in claim 31, wherein the progressive power spectacle lens is manufactured using an additive method.

33. A computer comprising a processor and a non-transitory memory in which the computer program as claimed in claim 28 is stored, the computer being configured to carry out a method comprising:
   calculating optical properties of the progressive power spectacle lens with ray tracing at a plurality of evaluation points at which visual rays pass through the progressive power spectacle lens;
   setting at least one intended optical property for the progressive power spectacle lens at a respective evaluation point,
   designing a representation of the progressive power spectacle lens by setting a local surface geometry of the progressive surface and a local refractive index of the progressive power spectacle lens in a respective visual beam path through the evaluation points;
   modifying the representation of the progressive power spectacle lens by approximating the at least one intended optical property of the progressive power spectacle lens, wherein the modifying includes modifying the representation of the local surface geometry of the progressive surface and the local refractive index of the progressive power spectacle lens in the respective visual beam path through the evaluation points, and wherein the at least one intended optical property includes an intended residual astigmatism of the progressive power spectacle lens;
   freely modifying the progressive surface in one spatial dimension or in two spatial dimensions; and
   freely modifying the local refractive index in at least two spatial dimensions.

* * * * *

UNITED STATES PATENT AND TRADEMARK OFFICE
CERTIFICATE OF CORRECTION

PATENT NO. : 11,372,264 B2
APPLICATION NO. : 16/932814
DATED : June 28, 2022
INVENTOR(S) : Gerhard Kelch, Christoph Menke and Helmut Wietschorke Page 1 of 1

It is certified that error appears in the above-identified patent and that said Letters Patent is hereby corrected as shown below:

In the Specification

In Column 4, Line 22, change "shitanoki" to – Shitanoki –
In Column 11, Line 18, change "Optik and Technik" to – Optik und Technik –
In Column 11, Line 19, change "Fachveroffentlichung" to – Fachveröffentlichung –
In Column 24, Line 15, change "Koppen" to – Köppen –
In Column 24, Line 16, change "Progressivglasern" to – Progressivgläsern –
In Column 24, Line 59, change "Koppen" to – Köppen –
In Column 24, Line 60, change "Progressivglasern" to – Progressivgläsern –
In Column 26, Line 53, change "Koppen" to – Köppen –
In Column 26, Line 54, change "Progressivglasern" to – Progressivgläsern –
In Column 29, Line 40, change "multij et or polyj et" to – multijet or polyjet –
In Column 37, Line 24, change "Optik and Technik" to – Optik und Technik –

Signed and Sealed this
First Day of November, 2022

Katherine Kelly Vidal
*Director of the United States Patent and Trademark Office*